United States Patent
Park et al.

(10) Patent No.: US 11,343,812 B2
(45) Date of Patent: May 24, 2022

(54) RADIO RESOURCE ALLOCATION FOR ACCESS LINK

(71) Applicant: Comcast Cable Communications, LLC, Philadelphia, PA (US)

(72) Inventors: Kyungmin Park, Herndon, VA (US); Esmael Dinan, McLean, VA (US); Hua Zhou, Herndon, VA (US); Alireza Babaei, Fairfax, VA (US); Hyoungsuk Jeon, Centreville, VA (US); Ali Cirik, Herndon, VA (US); Kai Xu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 81 days.

(21) Appl. No.: 16/672,116

(22) Filed: Nov. 1, 2019

(65) Prior Publication Data

US 2020/0145967 A1    May 7, 2020

Related U.S. Application Data

(60) Provisional application No. 62/754,560, filed on Nov. 1, 2018.

(51) Int. Cl.
*H04W 4/00* (2018.01)
*H04W 72/04* (2009.01)

(52) U.S. Cl.
CPC .............................. *H04W 72/042* (2013.01)

(58) Field of Classification Search
CPC . H04W 28/00; H04W 28/0268; H04W 72/00; H04W 72/04; H04W 72/042; H04W 72/10; H04W 72/1242; H04W 72/1247
See application file for complete search history.

(56) References Cited

U.S. PATENT DOCUMENTS

| 2008/0279145 A1* | 11/2008 | Boariu | H04W 72/1231 370/329 |
| 2009/0017756 A1* | 1/2009 | Tsfaty | H04W 52/0238 455/41.2 |
| 2012/0034865 A1 | 2/2012 | Seki | |

(Continued)

FOREIGN PATENT DOCUMENTS

WO    WO-2009088169 A1 *    7/2009    ........ H04W 72/1257

OTHER PUBLICATIONS

3GPP TS 23.501 V15.2.0 (Jun. 2018); Technical Specification; 3rd Generation Partnership Project; Technical Specification Group Services and System Aspects; System Architecture for the 5G System; Stage 2 (Release 15).

(Continued)

*Primary Examiner* — Matthew W Genack
(74) *Attorney, Agent, or Firm* — Banner & Witcoff, Ltd.

(57) ABSTRACT

Wireless communication techniques are described. An access node/device may transmit, to another access node/device, data corresponding to a wireless device. The access node/device may transmit the data along with downlink resource information indicating a radio resource. The other access node/device may use the radio resource to transmit the data to the wireless device. The access node/device may transmit one or more preemption indications to one or more other communication devices to preempt any other transmissions in the radio resource.

20 Claims, 45 Drawing Sheets

(56) References Cited

U.S. PATENT DOCUMENTS

| | | | | |
|---|---|---|---|---|
| 2014/0004850 | A1* | 1/2014 | Kwon | H04W 68/02 455/423 |
| 2015/0373607 | A1* | 12/2015 | Zhu | H04W 76/12 370/331 |
| 2019/0223024 | A1* | 7/2019 | Mackenzie | H04L 5/0035 |
| 2020/0053747 | A1* | 2/2020 | Bharadwaj | H04W 72/1242 |

OTHER PUBLICATIONS

3GPP TS 23.502 V15.2.0 (Jun. 2018); Technical Specification; 3rd Generation Partnership Project; Technical Specification Group Services and System Aspects; Procedures for 5G System; Stage 2 (Release 15).
3GPP TR 23.725 V0.3.0 (Jul. 2018); Technical Report; 3rd Generation Partnership Project; Technical Specification Group Services and System Aspects; Study on Enhancement of Ultra-Reliable Low-Latency Communication (URLLC) support in the 5G Core Network (5GC) (Release 16).
"3GPP TS 29.281 V15.3.0 (Jun. 2018); Technical Specification; 3rd Generation Partnership Project; Technical Specification Group Core Network and Terminals; General Packet Radio System (GPRS) Tunnelling Protocol User Plane (GTPv1-U) (Release 15)".
3GPP TS 36.331 V15.2.2 (Jun. 2018); Technical Specification; 3rd Generation Partnership Project; Technical Specification Group Radio Access Network; Evolved Universal Terrestrial Radio Access (E-UTRA); Radio Resource Control (RRC); Protocol specification (Release 15).
3GPP TS 37.324 V15.0.0 (Jun. 2018); Technical Specification; 3rd Generation Partnership Project; Technical Specification Group Radio Access Network; E-UTRA and NR; Service Data Adaptation Protocol (SDAP) specification (Release 15).
3GPP TS 37.340 V15.2.0 (Jun. 2018); Technical Specification; 3rd Generation Partnership Project; Technical Specification Group Radio Access Network; Evolved Universal Terrestrial Radio Access (E-UTRA) and NR; Multi-connectivity; Stage 2 (Release 15).
3GPP TS 38.323 V15.2.0 (Jun. 2018); Technical Specification; 3rd Generation Partnership Project; Technical Specification Group Radio Access Network; NR; Packet Data Convergence Protocol (PDCP) specification (Release 15).
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
3GPP TS 38.401 V15.2.0 (Jun. 2018); Technical Specification; 3rd Generation Partnership Project; Technical Specification Group Radio Access Network; NG-RAN; A3rchitecture description (Release 15).
3GPP TS 38.413 V15.0.0 (Jun. 2018); Technical Specification; 3rd Generation Partnership Project; Technical Specification Group Radio Access Network; NG-RAN; NG Application Protocol (NGAP) (Release 15).
3GPP TS 38.423 V15.0.0 (Jun. 2018); Technical Specification; 3rd Generation Partnership Project; Technical Specification Group Radio Access Network; NG-RAN; Xn application protocol (XnAP) (Release 15).
3GPP TS 38.425 V15.2.0 (Jun. 2018); Technical Specification; 3rd Generation Partnership Project; Technical Specification Group Radio Access Network; NG-RAN; NR user plane protocol (Release 15).
3GPP TS 38.473 V15.2.1 (Jul. 2018); Technical Specification; 3rd Generation Partnership Project; Technical Specification Group Radio Access Network; NG-RAN; F1 application protocol (F1AP) (Release 15).
3GPP TR 38.804 V14.0.0 (Mar. 2017); Technical Report; 3rd Generation Partnership Project; Technical Specification Group Radio Access Network; Study on New Radio Access Technology; Radio Interface Protocol Aspects (Release 14).
M. Polese et al., "End-to-End Simulation of Integrated Access and Backhaul at mmWaves," InterDigital Communications, Inc., 2018.
M. Bagnulo, "Threat Analysis for TCP Extensions for Multipath Operation with Multiple Addresses," Internet Engineering Task Force RFC6181, Mar. 2011.
A. Ford et al., "Architectural Guidelines for Multipath TCP Development," Internet Engineering Task Force RFC6182, Mar. 2011.
C. Raiciu et al., "Coupled Congestion Control for Multipath Transport Protocols," Internet Engineering Task Force RFC6356, Oct. 2011.
A. Ford et al., "TCP Extensions for Multipath Operation with Multiple Addresses," Internet Engineering Task Force RFC6824, Jan. 2013.
M. Scharf et al., "Multipath TCP (MPTCP) Application Interface Considerations," Internet Engineering Task Force RFC6897, Mar. 2013.
M. Bagnulo et al., "Analysis of Residual Threats and Possible Fixes for Multipath TCP (MPTCP)," Internet Engineering Task Force RFC7430, Jul. 2015.
O. Bonaventure et al., "Use Cases and Operational Experience with Multipath TCP," Internet Engineering Task Force RFC8041, Jan. 2017.
S2-186419 3GPP TSG-SA WG2 Meeting #128, Vilnius, Lithuania, Jul. 2-6, 2018, Source: Ericsson, Title: An overview of the IETF DetNet activity.
S2-186420 3GPP TSG-SA WG2 Meeting #128, Vilnius, Lithuania, Jul. 2-6, 2018, Source: Ericsson, Title: Anchor change for Ethernet PDU Sessions.
S2-186421 3GPP TSG-SA WG2 Meeting #128, Vilnius, Lithuania, Jul. 2-6, 2018, Source: Ericsson, Title: Updates to Solution #1 on Redundant user plane paths based on dual connectivity.
S2-186422 3GPP TSG-SA WG2 Meeting #128, Vilnius, Lithuania, Jul. 2-6, 2018, Source: Ericsson, Title: Updates to solution #2 on Multiple UEs per device for user plane redundancy.
S2-186431 3GPP TSG-SA WG2 Meeting #128, Vilnius, Lithuania, Jul. 2-6, 2018, Source: Qualcomm Incorporated, Title: Support for VLAN ID learning to enable IEEE 802.1CB (Frame Replication and Elimination for Reliability) combined with IEEE 802.1Q.
S2-186482 3GPP TSG-SA WG2 Meeting #128, Vilnius, Lithuania, Jul. 2-6, 2018, Source: Huawei, HiSilicon, Title: Solution for KI#3: AF Response to UP Path Management Event Notifications.
S2-186483 3GPP TSG-SA WG2 Meeting #128, Vilnius, Lithuania, Jul. 2-6, 2018, Source: Huawei, HiSilicon, Title: Update of solution#3 and solution#4.
S2-186484 3GPP TSG-SA WG2 Meeting #128, Vilnius, Lithuania, Jul. 2-6, 2018, Source: Huawei, HiSilicon, Title: Update of solution#5.
S2-186516 3GPP TSG-SA WG2 Meeting #128, Vilnius, Lithuania, Jul. 2-6, 2018, Source: OPPO, Title: Updating for solution#5 in FS_URLLC.
S2-186525 3GPP TSG-SA WG2 Meeting #128, Vilnius, Lithuania, Jul. 2-6, 2018, Source: Sony, Title: Solution for Key Issue 5.
S2-186721 3GPP TSG-SA WG2 Meeting #128, Vilnius, Lithuania, Jul. 2-6, 2018, Source: Samsung, Title: Solution for establishing N3 and N9 tunnels for redundant transmission.
S2-186722 3GPP TSG-SA WG2 Meeting #128, Vilnius, Lithuania, Jul. 2-6, 2018, Source: Samsung, Title: Update the solution #4.
S2-186802 3GPP TSG-SA WG2 Meeting #128, Vilnius, Lithuania, Jul. 2-6, 2018, Source: Nokia, Nokia Shanghai Bell, Title: Solution for 5G URLLC in 5G System.
S2-186926 3GPP TSG-SA WG2 Meeting #128, Vilnius, Lithuania, Jul. 2-6, 2018, Source: Lenovo, Motorola Mobility, Title: Solution for KI 1#: Redundant Transmission in core network for URLLC service.
Mar. 20, 2020—European Extended Search Report—EP 19206723.9.
R1-1804755 3GPP TSG-RAN WG1 #92bis, Sanya, China, Apr. 16-20, 2018, Source: Intel Corporation, Title: Overview on RAN1 related issues in IAB.
R1-1717970 3GPP TSG-RAN WG1 Meeting #90bis, Prague, CZ, Oct. 9-13, 2017, Source: LG Electronics, Title: Remaining issues on pre-emption indication for downlink.
R1-1806957 3GPP TSG-RAN WG1 Meeting #93, Busan, Korea, May 21-25, 2018, Source: Sequans Communications, Title: On enhancements for eMBB/URLLC multiplexing in DL.

(56) References Cited

OTHER PUBLICATIONS

R1-1810675 3GPP TSG-RAN WG1 Meeting #94bis, Chengdu, China, Oct. 8-12, 2018, Source: Nokia, Nokia Shanghai Bell, Title: Resource allocation/coordination between Parent BH and Child links.
Nov. 9, 2021—European Office Action—EP 19206723.9.

* cited by examiner

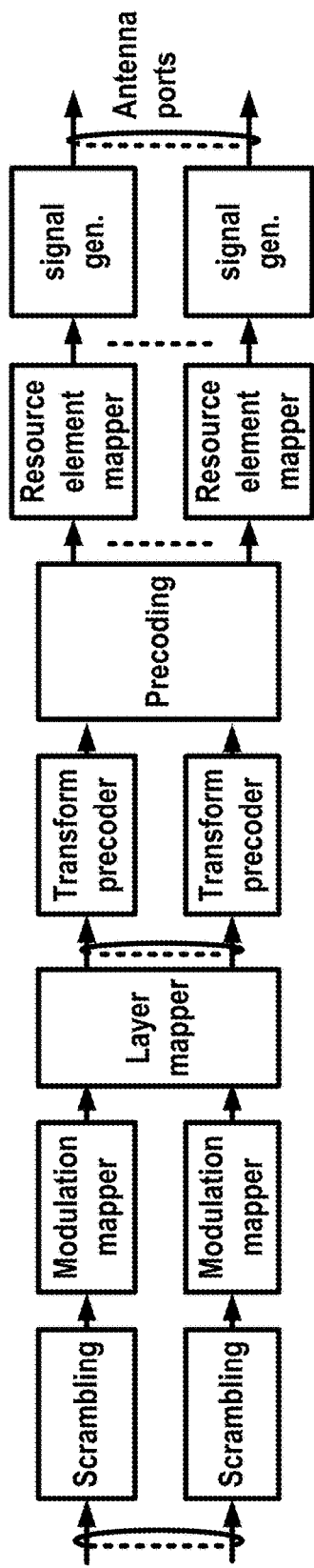
FIG. 4A
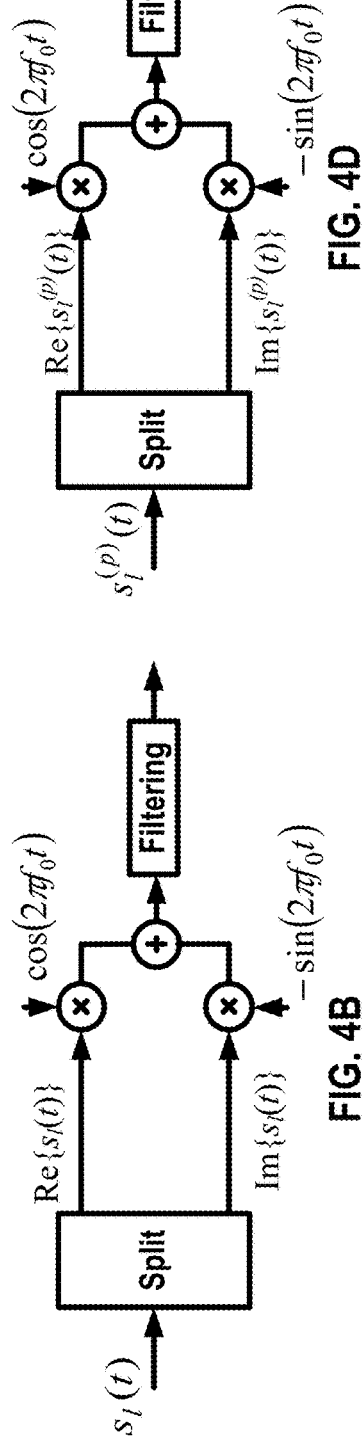
FIG. 4B
FIG. 4D
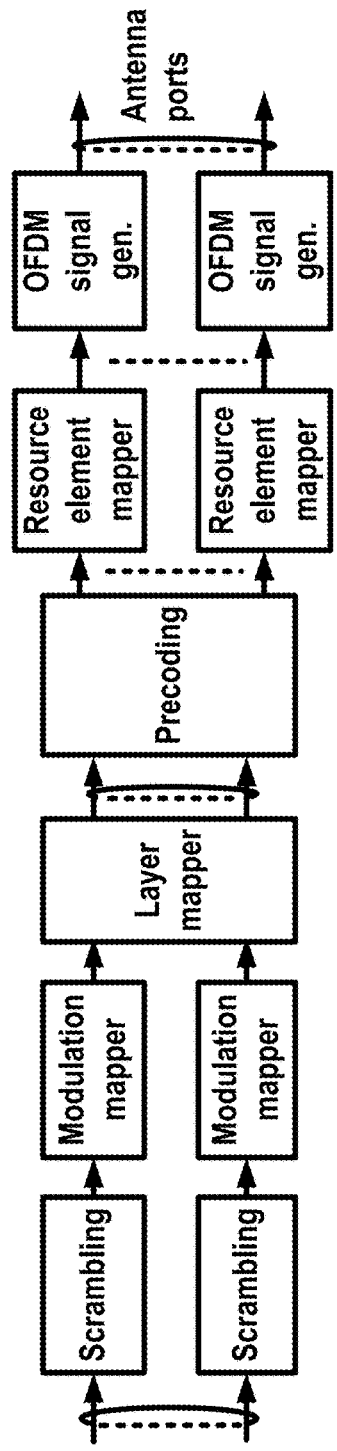
FIG. 4C

Wireless Device and IAB-node operate in SA

Wireless device operates in NSA while IAB-node operates in SA

UE and IAB-node operate in NSA

Example of architecture 1a

Example of architecture 1b

Example of architecture 2a

Example of architecture 2b

Example of architecture 2c

Alternative 1 of architecture 1a

Alternative 2 of architecture 1a

Alternative 3 of architecture 1a

Alternative 4 of architecture 1a

Alternative of architecture 1b

Alternative group 1

Alternative group 2

RADIO RESOURCE ALLOCATION FOR ACCESS LINK

CROSS-REFERENCE TO RELATED APPLICATIONS

This application claims the benefit of U.S. Provisional Application No. 62/754,560, titled "Radio Resource Allocation for Access Link" and filed on Nov. 1, 2018. The above-referenced application is hereby incorporated by reference in its entirety.

BACKGROUND

A communication network may comprise multiple nodes. A node may receive, from another device/node, data intended for yet another device/node. A device/node may determine to forward the data to another device/node. However, the device/node may not have resources available for sending the data to the other device/node. This may result in a latency associated with sending data to the other device/node.

SUMMARY

The following summary presents a simplified summary of certain features. The summary is not an extensive overview and is not intended to identify key or critical elements.

A wireless communication network may comprise a plurality of devices/nodes, such as a child device/node, a first access device/node, a second access device/node, and/or any other quantity of devices/nodes. The wireless communication network may comprise, for example, an integrated access and backhaul (IAB) system. An access node (e.g., a first access node or any other access node) may determine that data, intended for another device/node (e.g., a wireless device/node), corresponds to a priority service (e.g., ultra reliable low latency communications, or any other service or type of communications). The access node may assign, based on determining that the data corresponds to the priority service, radio resources to another access node (e.g., a second access node or any other access node). The access node (e.g., first access node) may send, to the other access node (e.g., second access node) which may receive, data for another device/node (e.g., wireless device/node). The access node (e.g., first access node) may send the data, to the other access node (e.g., second access node), with downlink resource information indicating the radio resources. The other access node (e.g., second access node) may send the data to the other device/node (e.g., wireless device/node), based on the downlink resource information. Sending the downlink resource information with the data may reduce latency, for example, by enabling the other access node (e.g., second access node) to receive a resource assignment without requiring the other access node (e.g., second access node) to send a request (e.g., to the first access node) for such resources. The access node (e.g., first access node may) send one or more preemption indications to one or more other devices/nodes (e.g., one or more access nodes, wireless devices, etc.). The one or more preemption indications may preempt at least one transmission, from the one or more other devices/nodes, in the radio resources. Preemption of the at least one transmissions may reduce collisions within the communication network and/or increase transmission reliability. Preemption of the at least one transmissions may enable the wireless device to receive data that may correspond to a priority service with reduced latency and/or increased reliability.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

DETAILED DESCRIPTION

Figure 1:
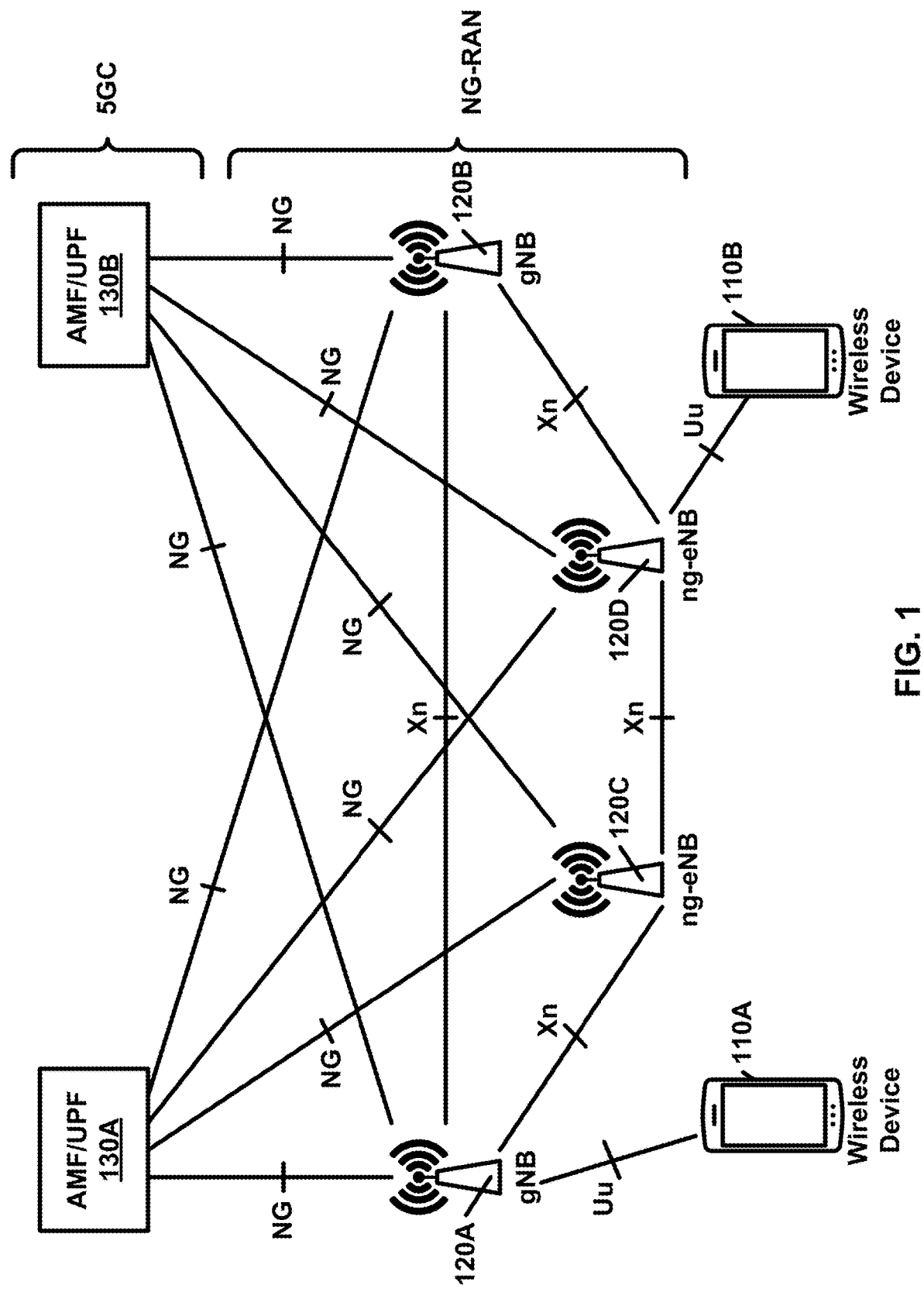
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to resource management for wireless communications.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
ADAPT Adaptation Layer
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BH RLC Backhaul Radio Link Control
BPSK Binary Phase Shift Keying
BWP Bandwidth Part
CA Carrier Aggregation
CC Component Carrier
CCCH Common Control CHannel
CDMA Code Division Multiple Access
CE Control Element
CLI Cross Link Interference
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CRI CSI-RS resource indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
L-GW Local Gateway
LCID Logical Channel Identifier
LCG ID Logical Channel Group Identifier
LI Layer Indicator
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node
MT Mobile Termination
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OAM Operation, Administration, and Management
OFDM Orthogonal Frequency Division Multiplexing
PBCH Physical Broadcast CHannel
PCC Primary Component Carrier
PCCH Paging Control CHannel
PCell Primary Cell
PCH Paging Channel
PCFICH Physical Control Format Indicator Channel
PDCCH Physical Downlink Control CHannel
PDCP Packet Data Convergence Protocol
PDSCH Physical Downlink Shared CHannel PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RNTI Radio Network Temporary Identifier
RRC Radio Resource Control
RRM Radio Resource Management
RS Reference Signal
RSRP Reference Signal Received Power
SCC Secondary Component Carrier
SCell Secondary Cell
SCG Secondary Cell Group
SCPTM Single Cell Point-to-Multipoint
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SRB Signaling Radio Bearer
SRS Sounding Reference Signal
SS Synchronization Signal
SSB Synchronization Signal Block
SSBRI Synchronization Signal Block Resource Indicator
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission Reception Point
TTI Transmission Time Interval
UCI Uplink Control Information
UE User Equipment
UL Uplink
UL-SCH Uplink Shared CHannel
UPF User Plane Function
UPGW User Plane Gateway
URLLC Ultra-Reliable Low-Latency Communication
V2X Vehicle-to-everything
VHDL VHSIC Hardware Description Language
VRB Virtual Resource Block
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
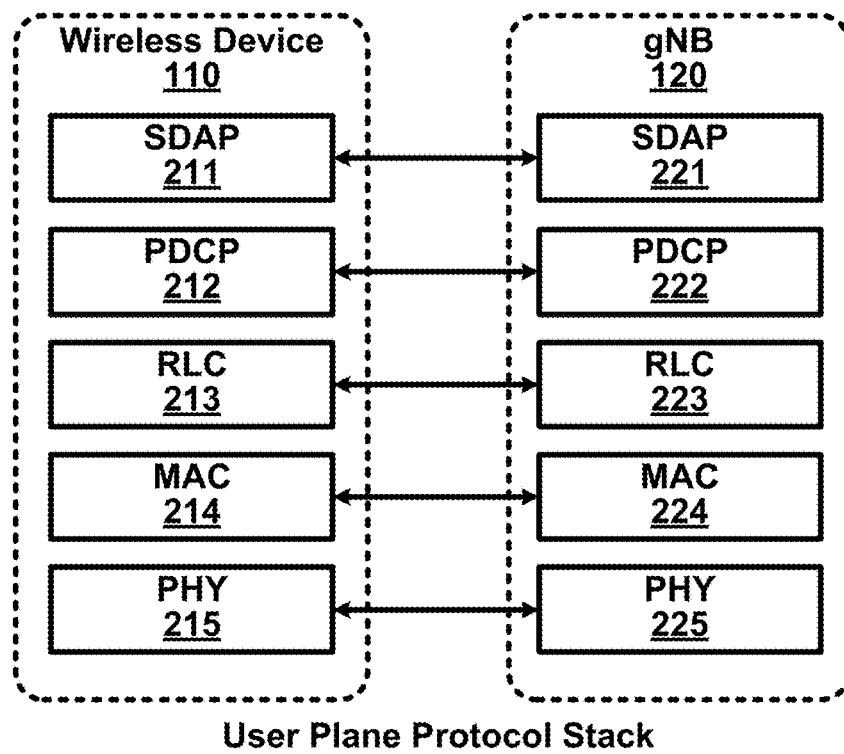
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
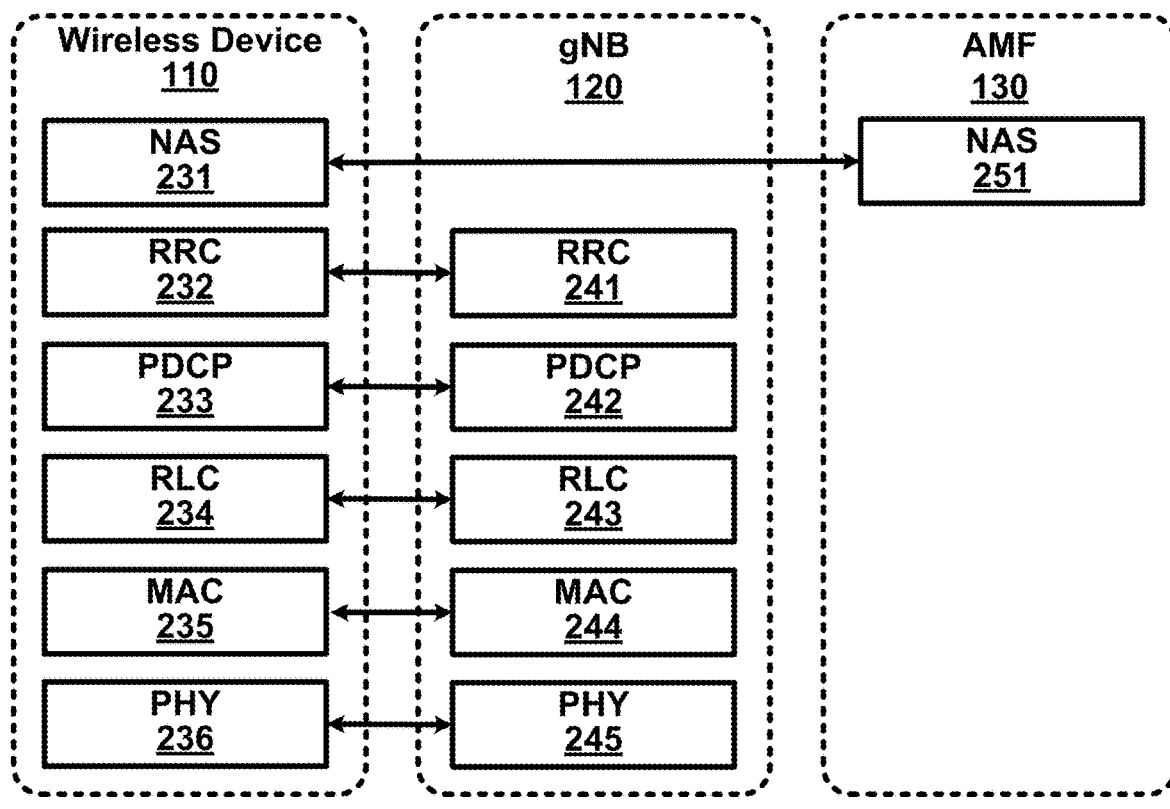
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
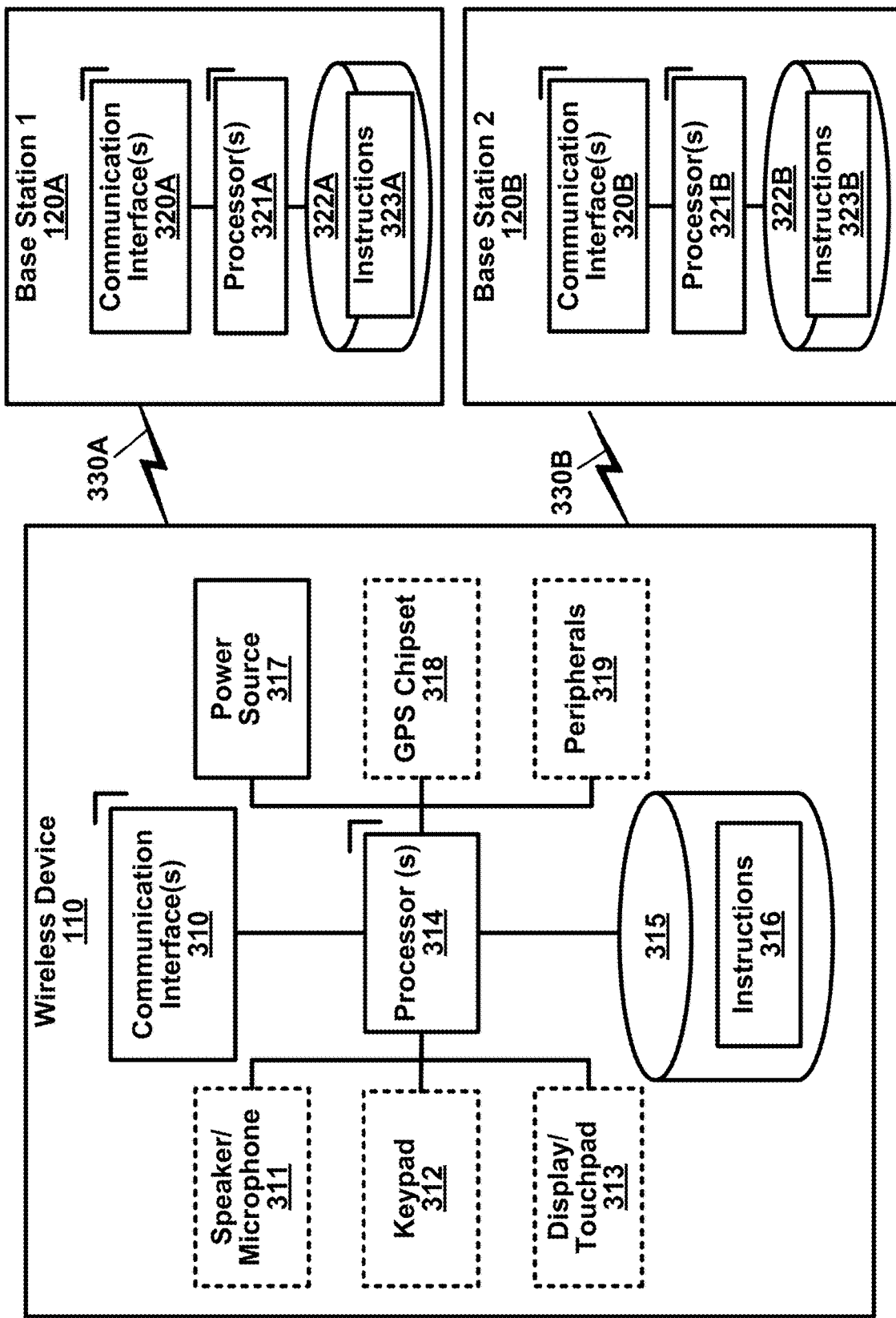
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signalling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
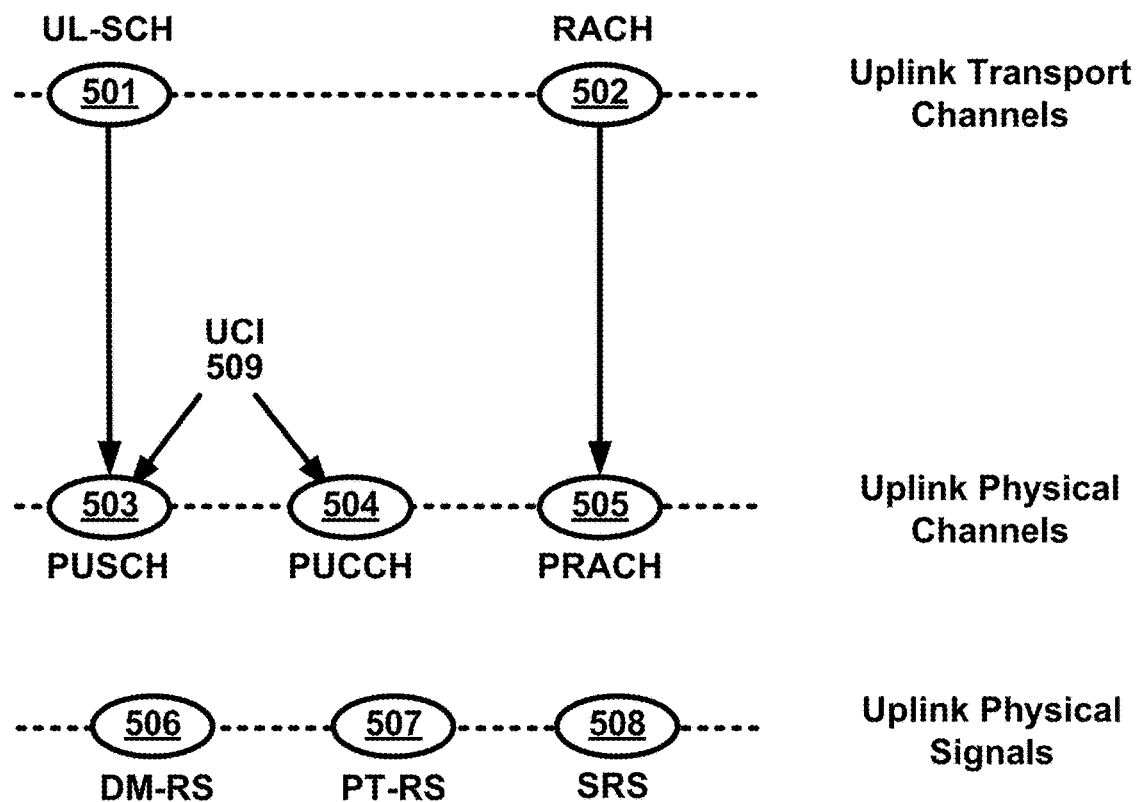
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
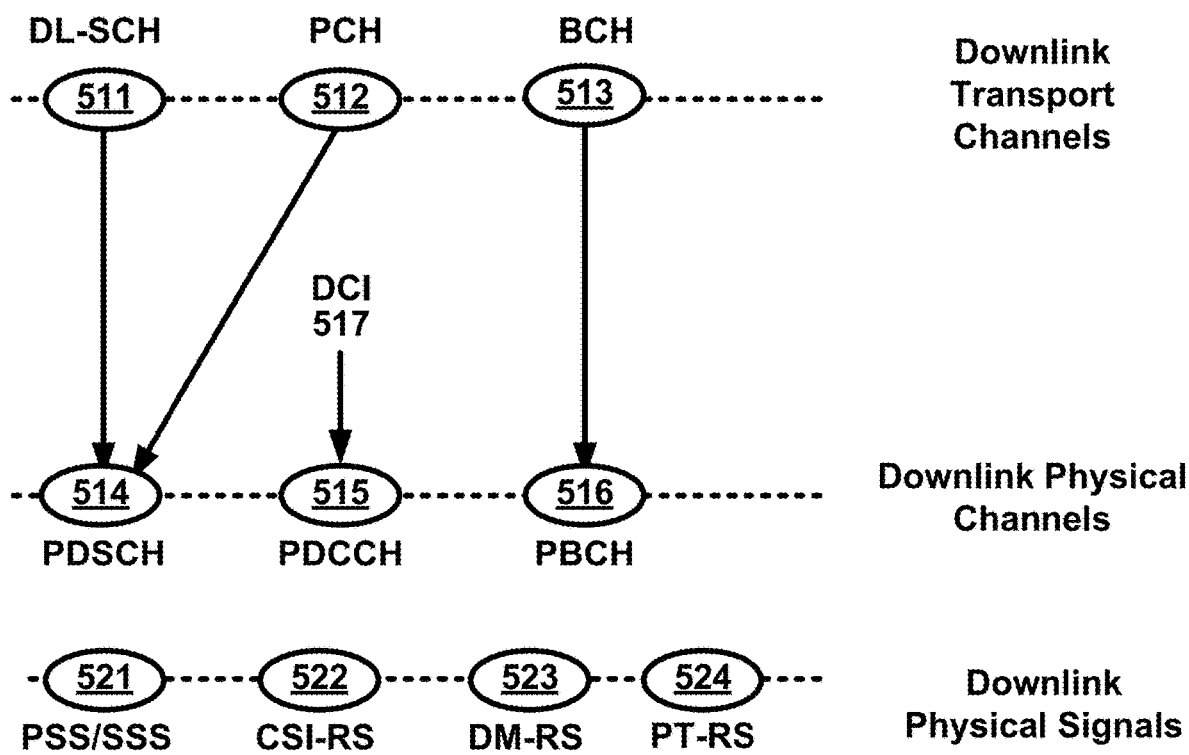
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
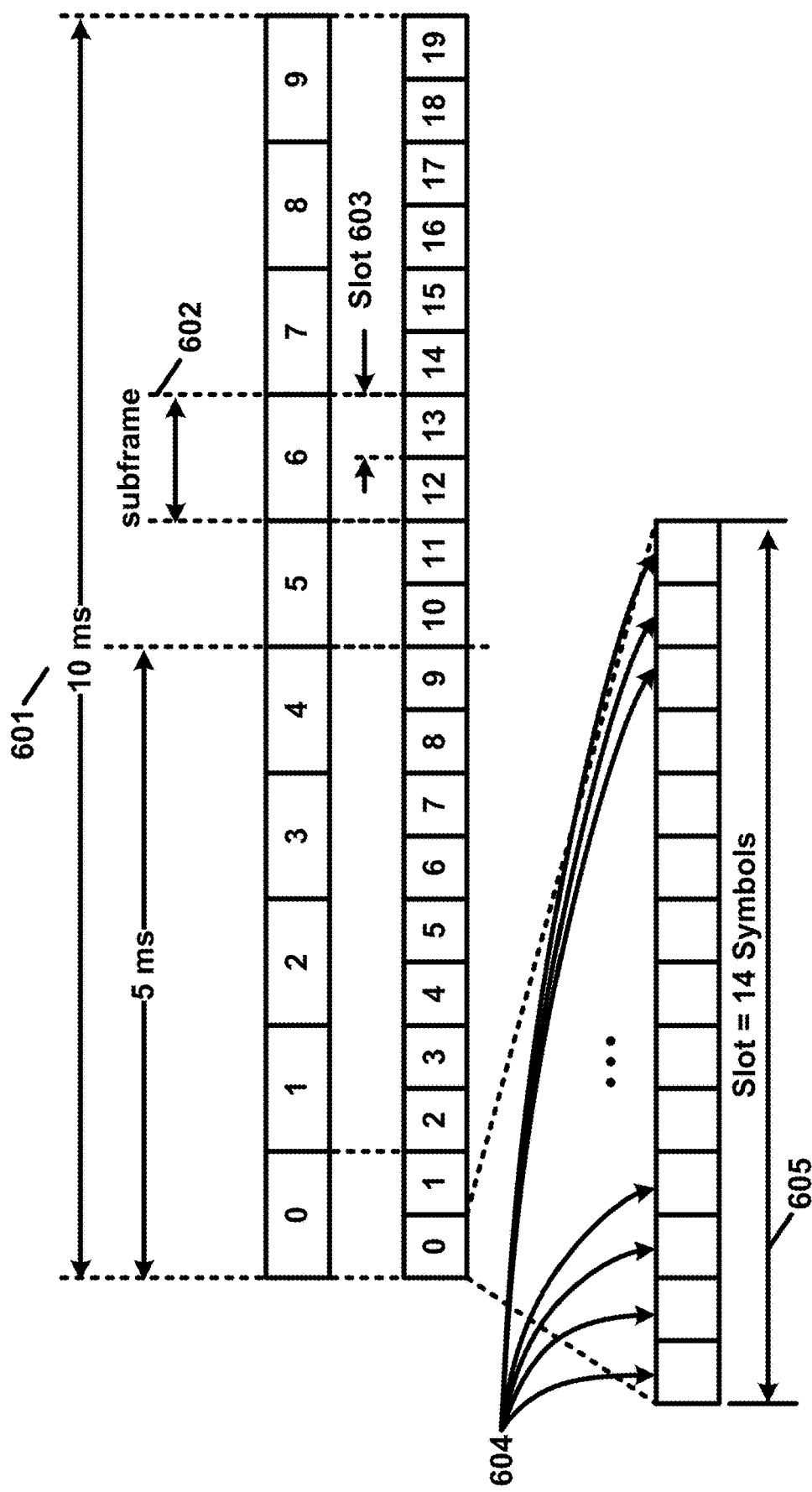
FIG. 6 shows an example frame structure for a carrier.

FIG. 6 shows an example frame structure for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
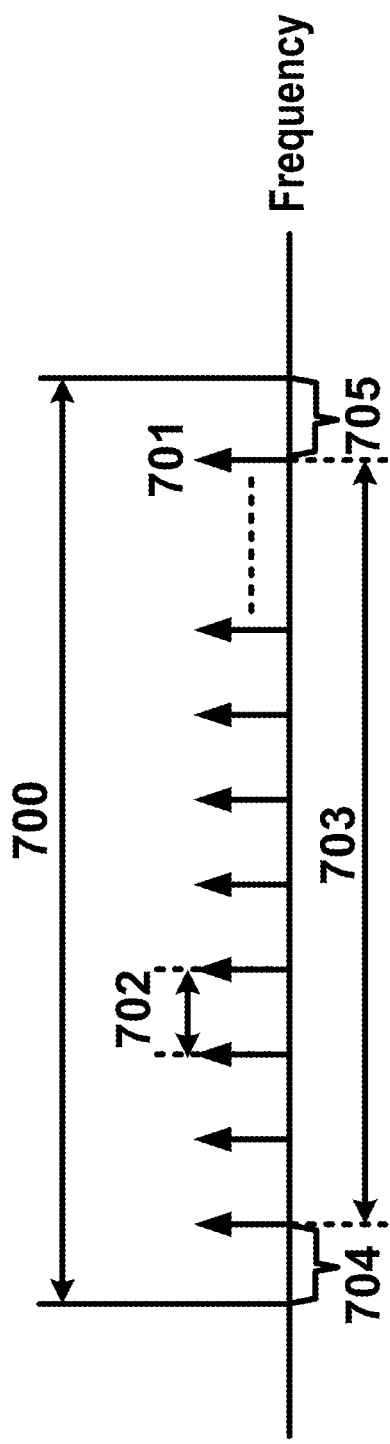
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
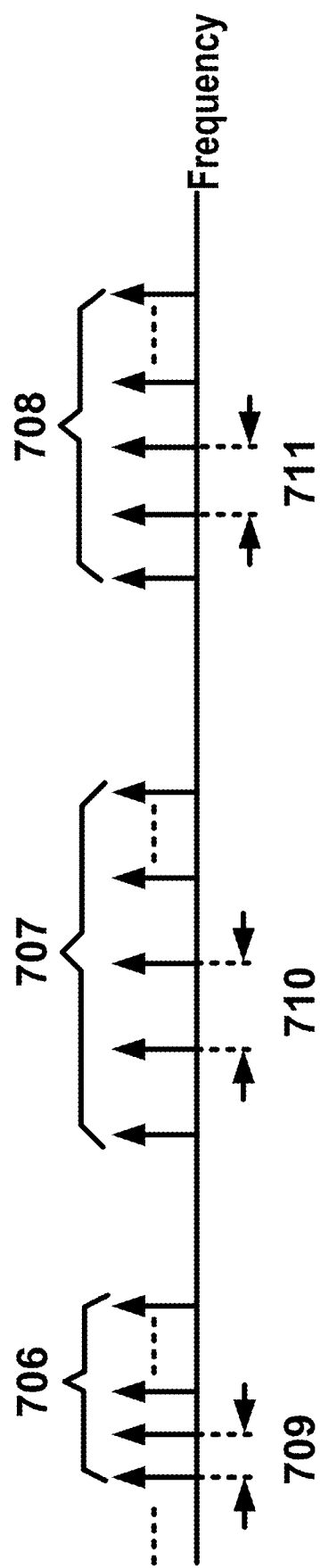

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
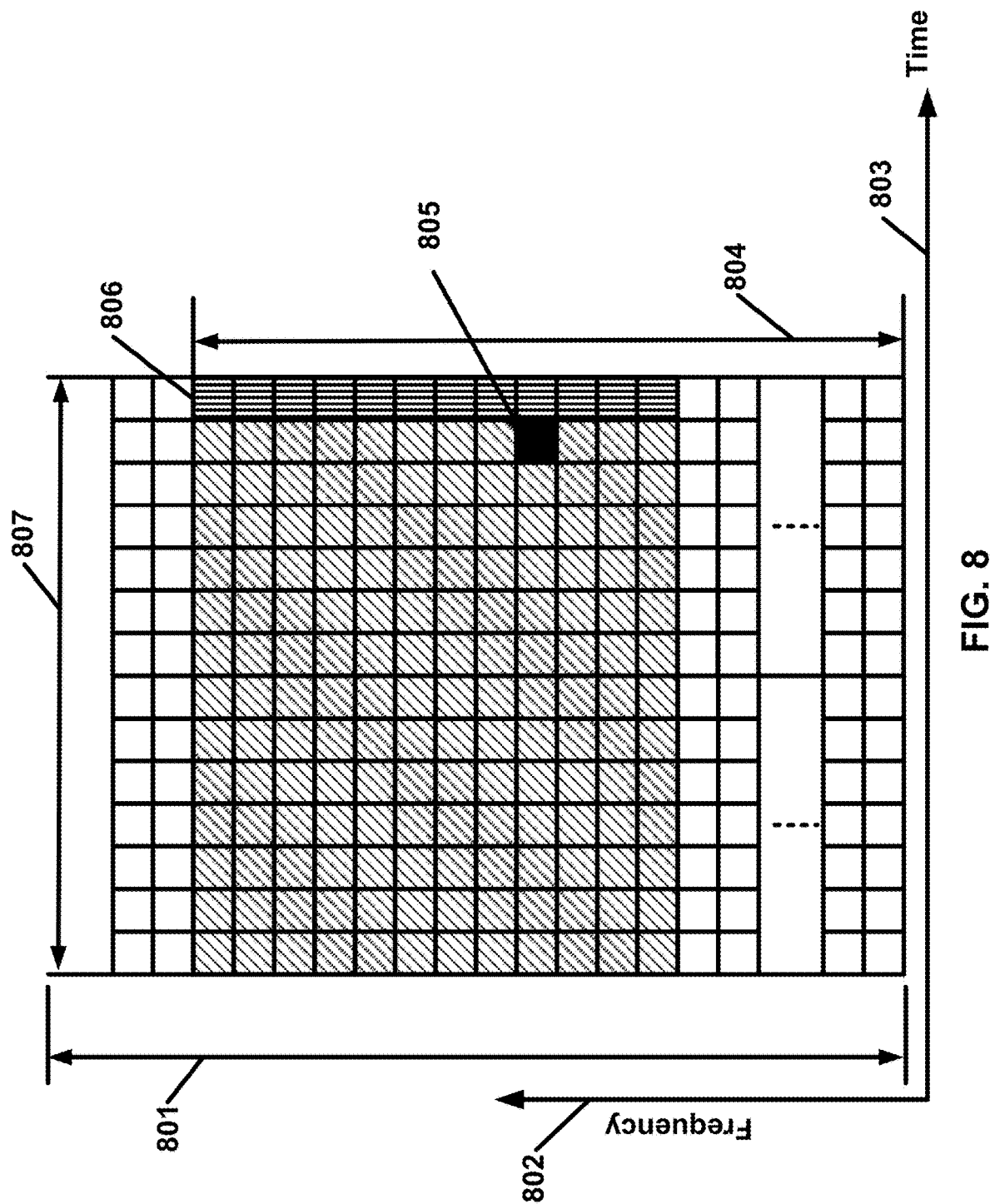
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
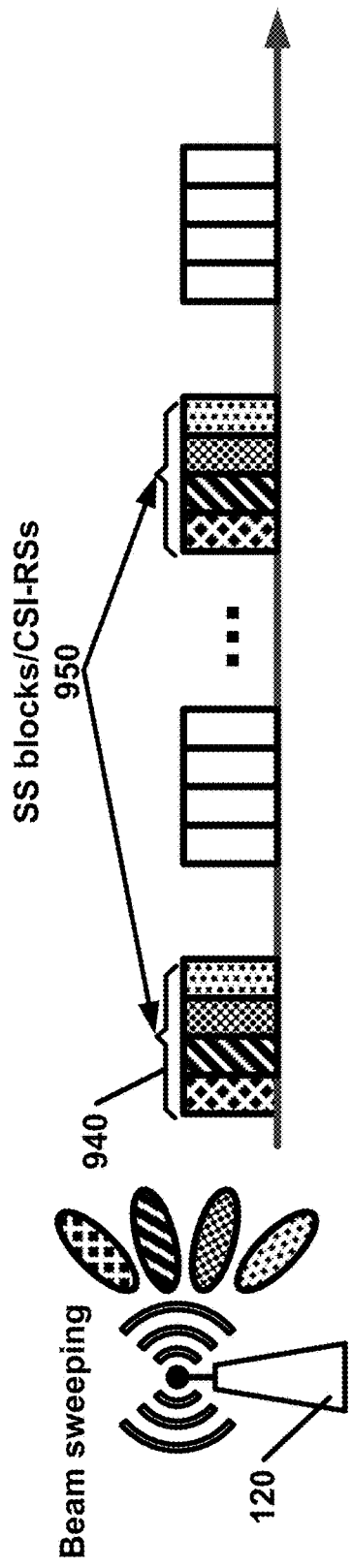
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
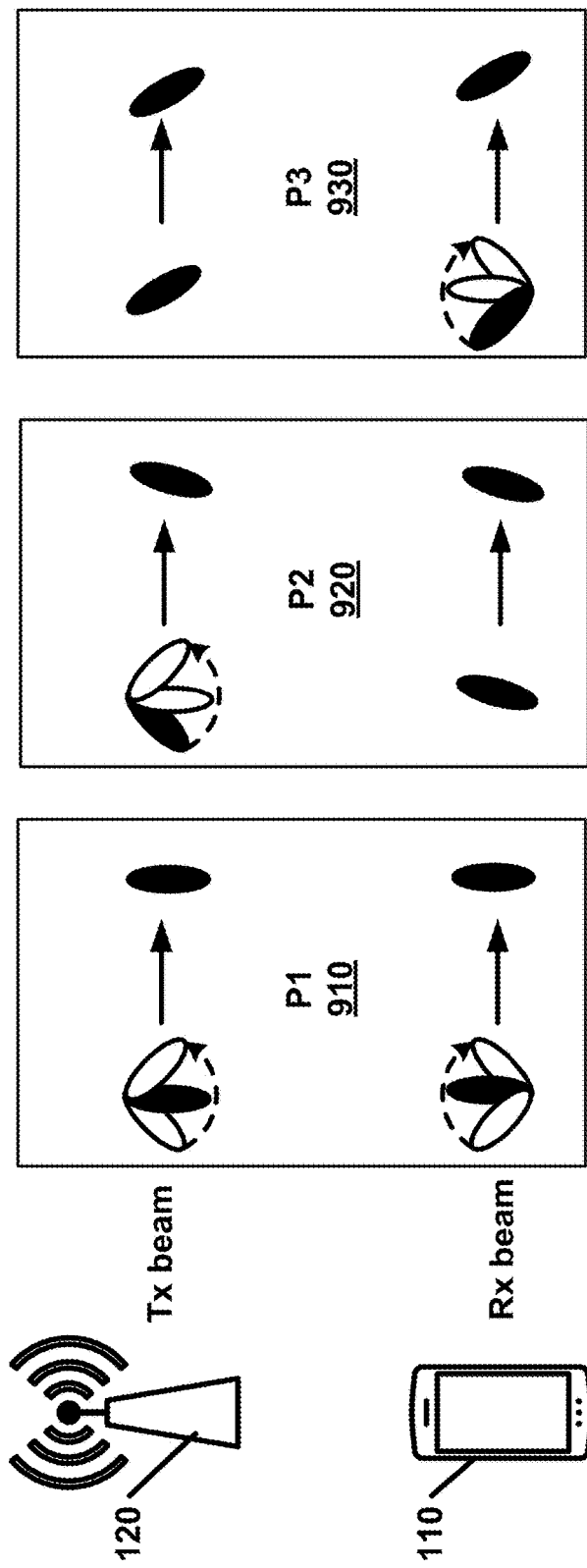
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
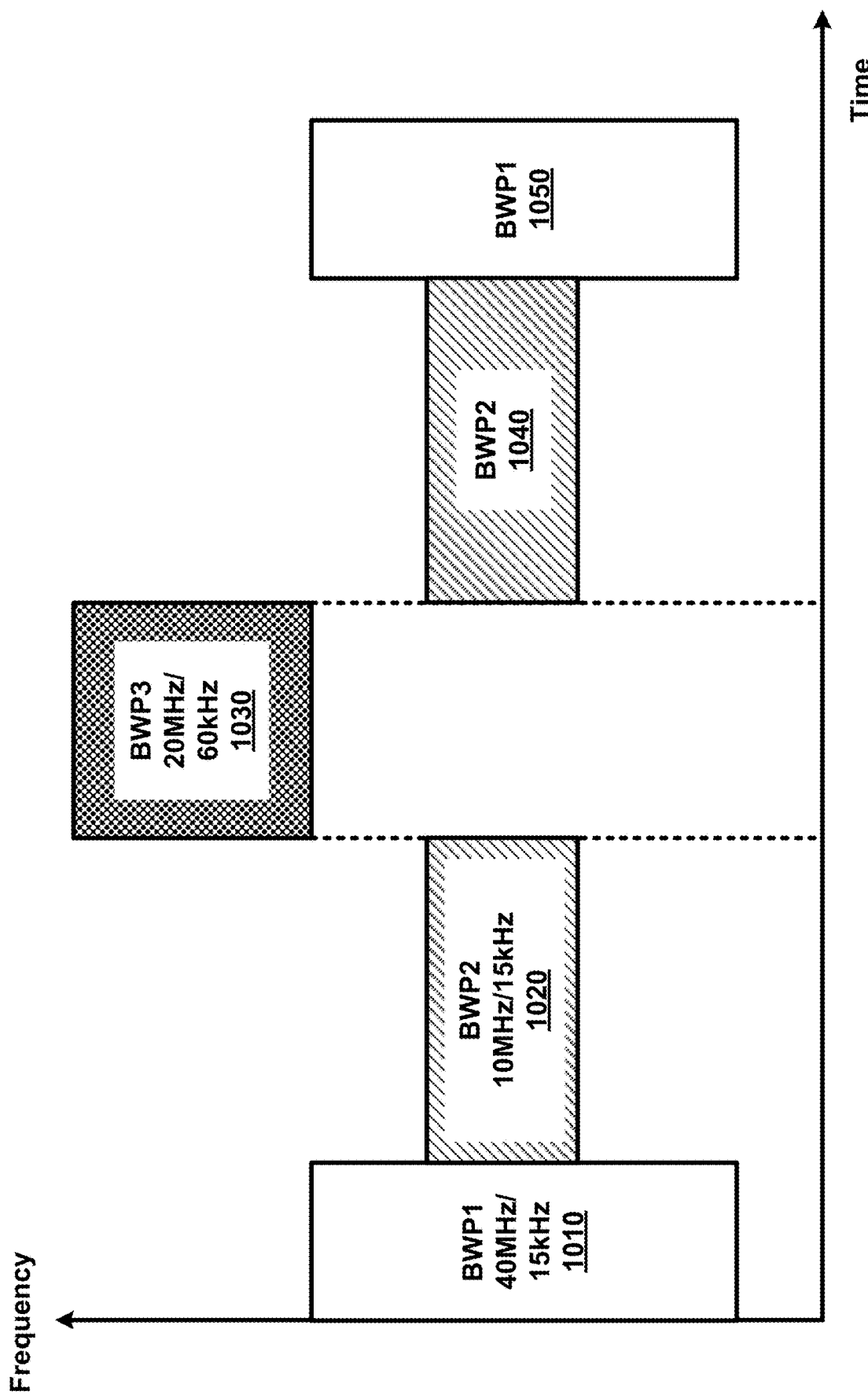
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP. BWPs are described as example resources. Any wireless resource may be applicable to one or more procedures described herein.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may refrain from configuring a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided with a default DL BWP, a default BWP may be an initial active DL BWP. A default BWP may not be configured for one or more wireless devices. A first (or initial) BWP may serve as a default BWP, for example, if a default BWP is not configured.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
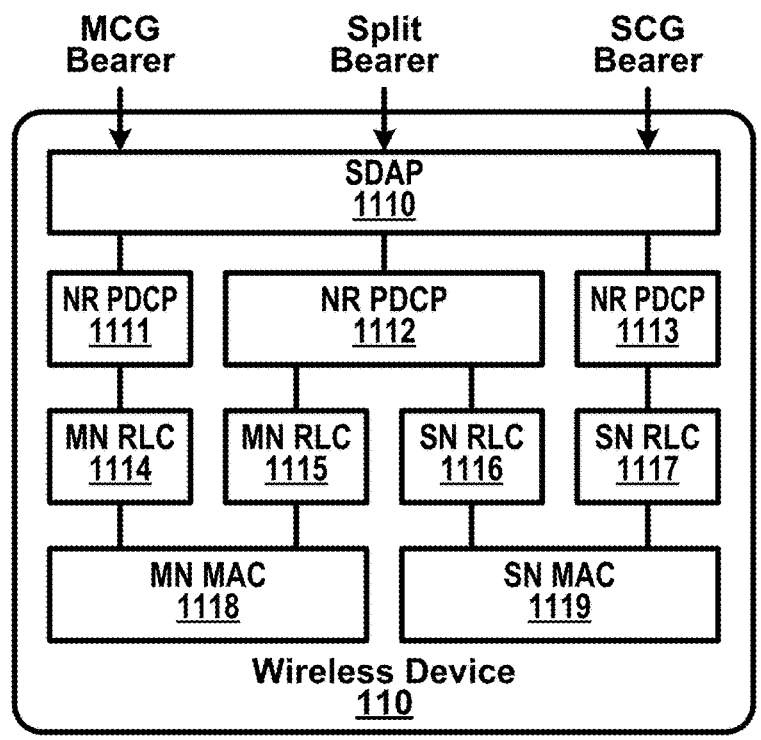
FIG. 11A and FIG. 11B show examples of multi connectivity.
Figure 11B:
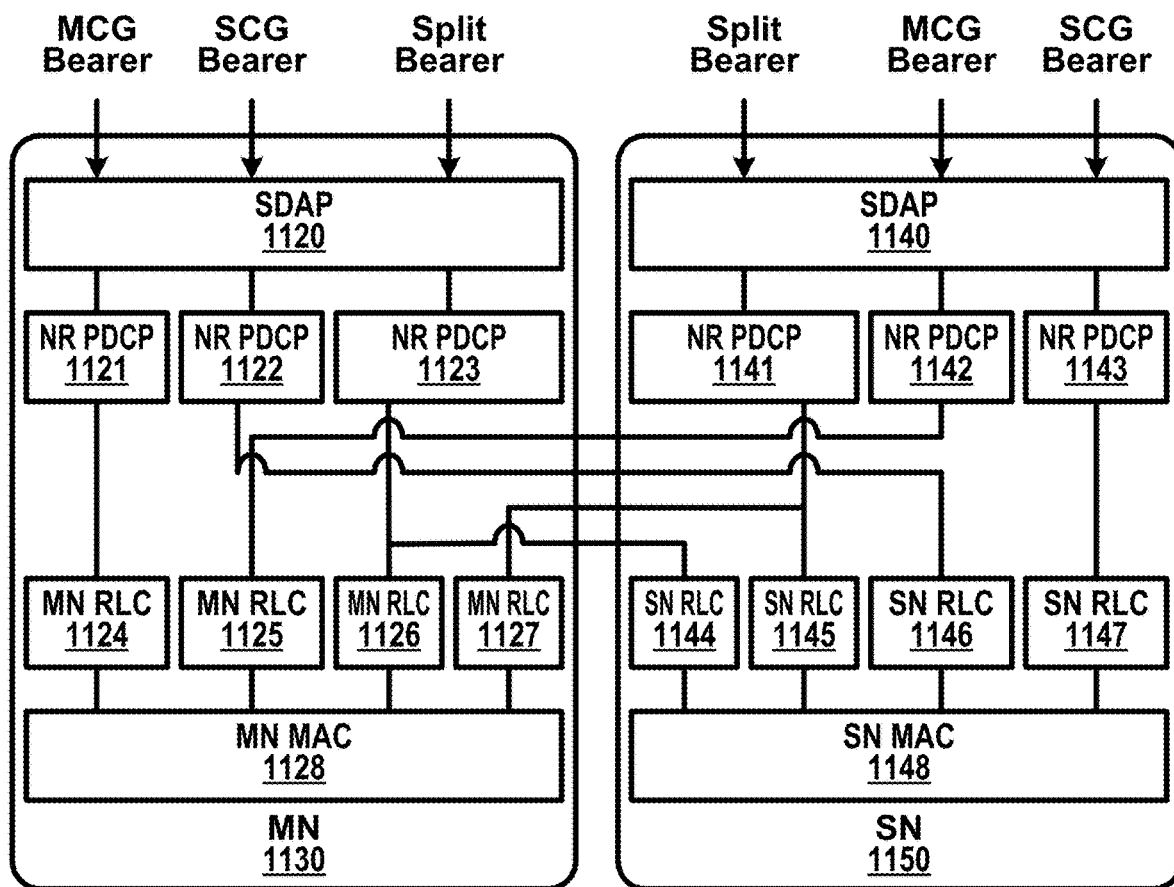

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain Radio Resource Management (RRM) measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
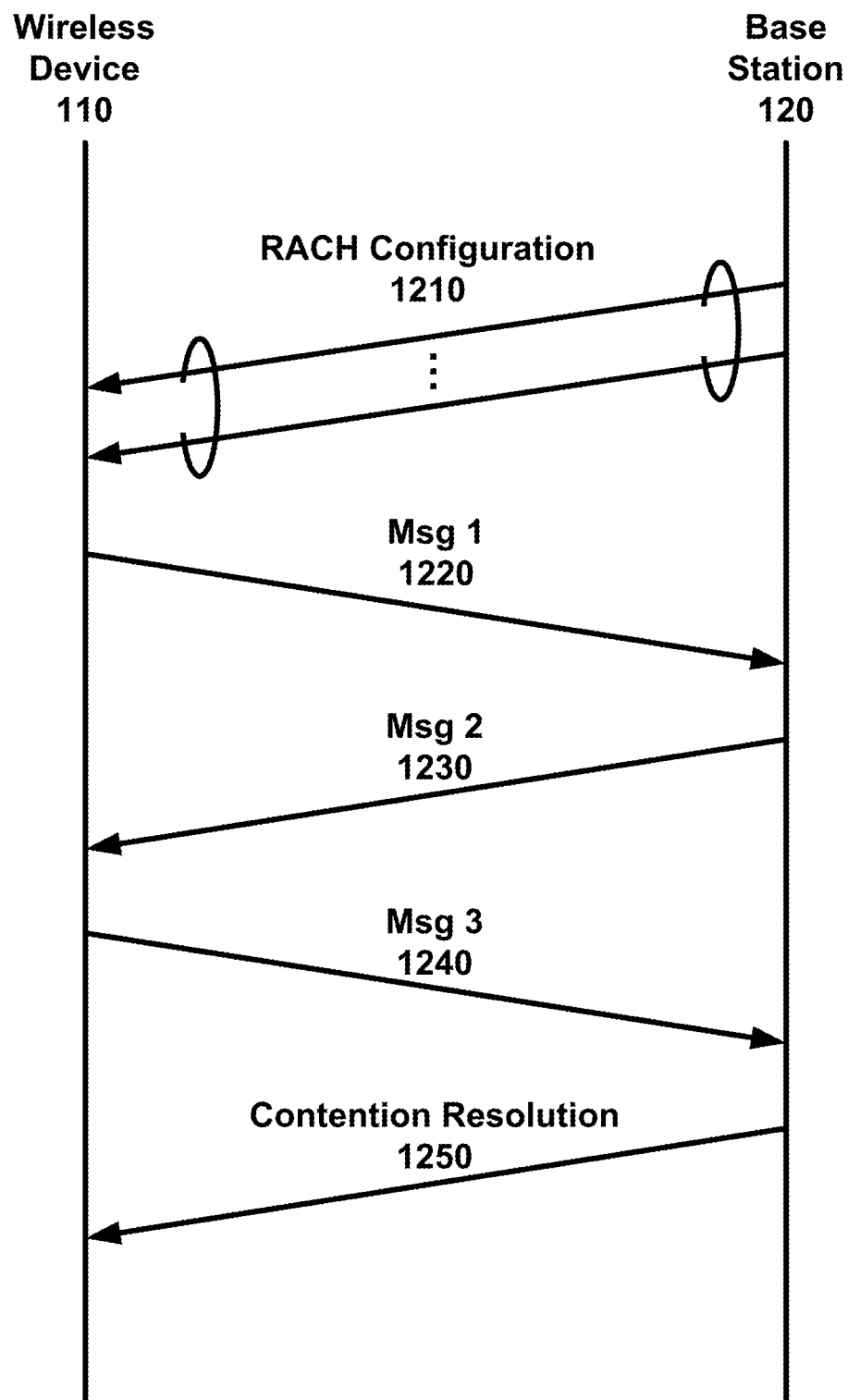
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery procedure and corresponding PRACH resource(s) (e.g., if any), a time window to monitor RA response(s), a time window to monitor response(s) on a beam failure recovery procedure, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery procedure associated with at least one of SS blocks and/or CSI-RSs. A wireless device may select a random access preamble index corresponding to a selected SS block or a CSI-RS from a set of one or more random access preambles for a beam failure recovery procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
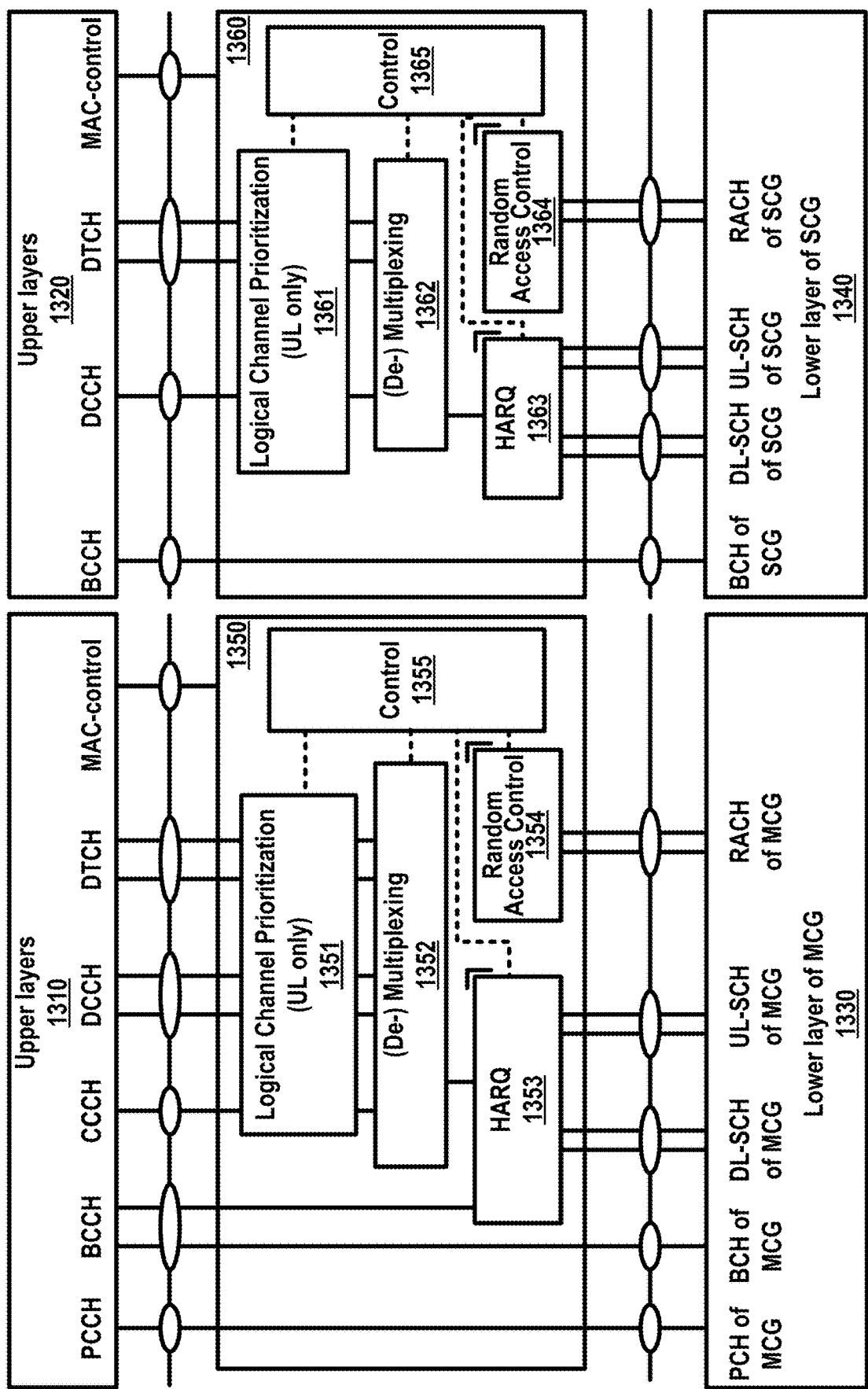
FIG. 13 shows example medium access control (MAC) entities.

FIG. 13 shows an example structure for MAC entities. A wireless device may be configured to operate in a multi-connectivity mode. A wireless device in RRC_CON- NECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
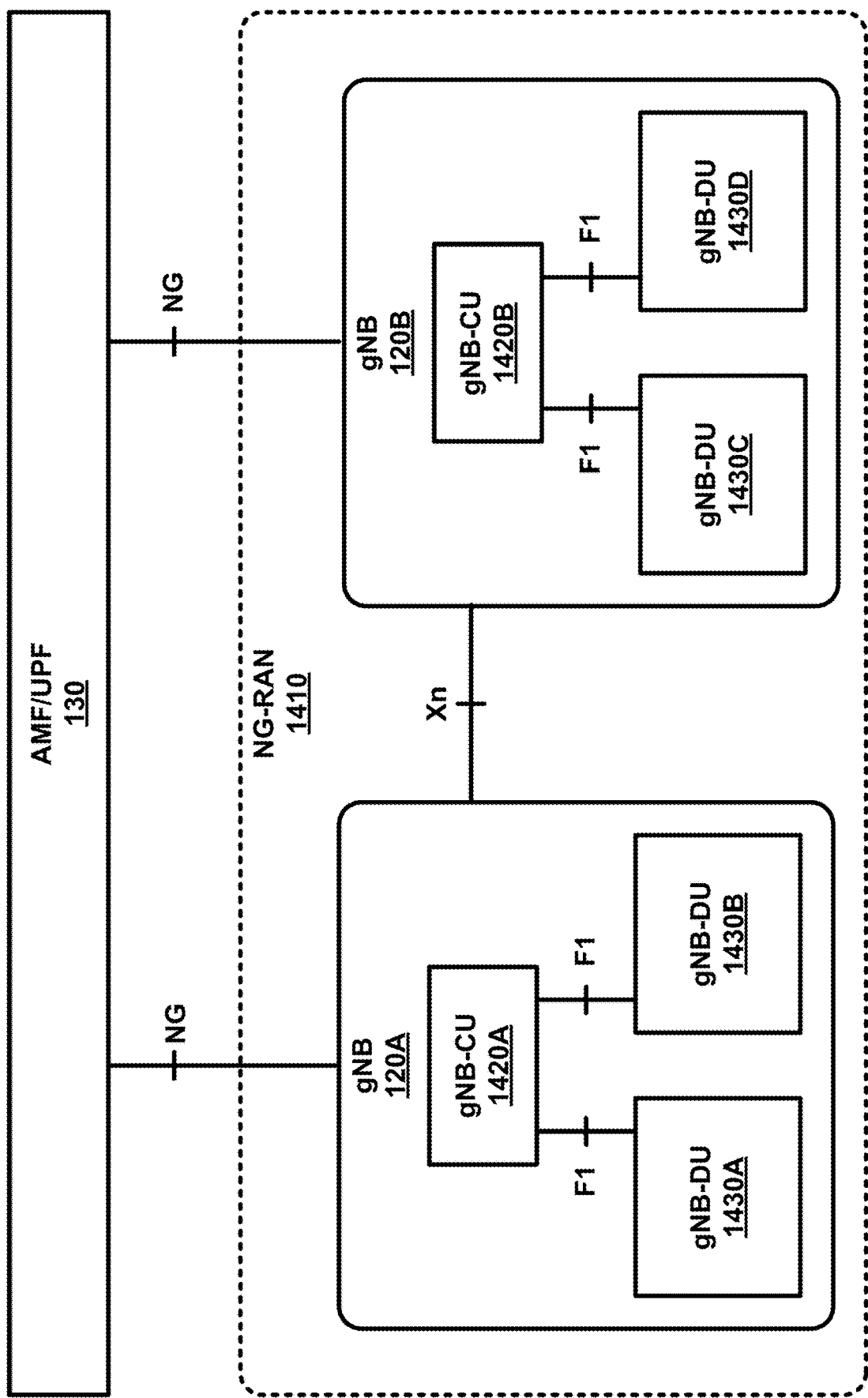
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
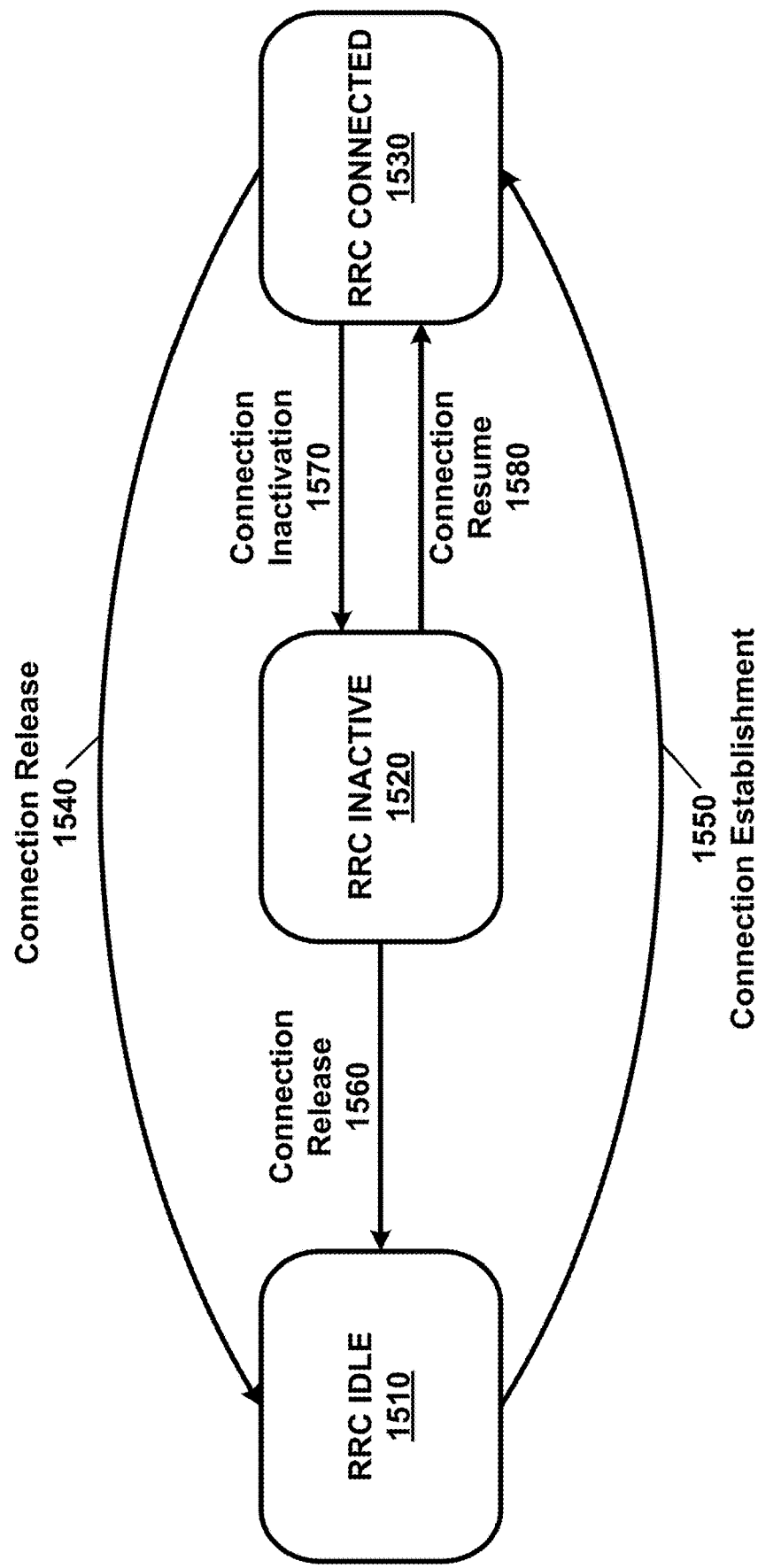
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

One or more Radio resources may comprise (e.g., may be partitioned between) a backhaul link (e.g. radio link between a parent node and an IAB-node) and/or an access link (e.g. radio link between an IAB-node and a wireless device in a wireless communication system. A backhaul link may also be referred to as a parent link. An access link may be referred to as a child link. The radio resources may be partitioned, for example, based on a time division multiplexing (TDM), a frequency division multiplexing (FDM), and/or space division multiplexing (SDM) (e.g. spatial multiplexing). An IAB-node may or may not have radio resources for data transmission, for example, depending on a timing of transmission attempt. An IAB-node may have to wait for an assigned radio resource, for example, if radio resources are partitioned based on a TDM (e.g. time slot-based resource partitioning). An IAB-node may not have radio resources for data transmission, for example, if the radio resources are occupied for higher priority data transmission (e.g., in TDM, FDM, and/or SDM).

Data transmission latency of an device/node may increase, for example, if the device/node has no available radio resource for data transmission and the device/node has data to transmit. The device/node may have to wait for a next available radio resource for the data transmission. At least some mechanisms (e.g., based on multiplexing) may increase packet transmission latency and packet loss rate. At least some resource allocation mechanisms may decrease service quality and packet transmission reliability.

Priority services, such as services that may be sensitive to timing and/or reliabilities, may use communication protocols that may facilitate high quality transmission, reception, and/or data processing with low latencies and/or low error rate. The priority services may correspond to applications such as self-driving automobiles, industrial IoT devices, remote surgery facilities, drone control systems, interactive gaming services, etc. Various communication protocols (e.g., 5G NR URLLC services) may be integrated with various mechanisms described herein for improved transmission quality and reliability.

A node (e.g., a node in a wireless communication network) may comprise at least one node, such as a child node, a first access node, a second access, a third access node, and/or any other access node (e.g., any quantity of access nodes). An access node (e.g., a first access node, or any other access node) may be, for example, an IAB-node, an IAB-donor (e.g., an IAB-donor node), a base station, a gNB, a gNB-DU (e.g., a gNB-DU for a wireless device), a gNB-CU (e.g., a gNB-CU for a child node), an eNB, a MT, and/or any other device or devices. An access node (e.g., a second access node, or any other access node) may be, for example, a parent node of another access node (e.g., a first access node, or any other access node), an IAB-node, an IAB-donor, a base station, a gNB, a gNB-CU (e.g., a gNB-CU for an access node, such as a first access node or any other access node, and/or for a wireless device), a gNB-DU (e.g., a gNB-DU for a first access node, such as an MT for a second access node), an MT, and/or any other device or devices. An access node (e.g., a third access node, or any other access node) may be, for example, an IAB-donor of another access node, such as an IAB-donor of: a first access node, a second access node, any other access node, a wireless device, a base station, a gNB, a gNB-CU, an eNB, and/or any other device or devices. A child node may be, for example, a child node of any node, such as a child node of: a first access node, a second access node, a third access node, any other access node, a wireless device, an IAB-node, an IAB-donor, an MT, and/or any other device or devices.

An IAB-node may be at least one of: an access node (e.g., a first access node and/or any other access node), an intermediate network node, an IAB-donor, a base station, a gNB, a gNB-DU, an eNB, a relay node, a wireless device, a mobile termination (MT), a UE, an access point, and/or the like. An IAB-donor may be at least one of: an access node (e.g., a second access node and/or any other access node), a parent node, a base station, a gNB, a gNB-CU, an eNB, a relay donor node, IAB-node, an access point, and/or the like. A wireless device may be at least one of: a UE, an IAB-node, an IAB-donor, a relay node, an MT, a base station, a gNB, a child node, and/or the like. A base station may be at least one of: a parent node, an IAB-donor, an IAB-node, a second access node, a gNB, a gNB-CU control plane (gNB-CU-CP), a gNB-CU user plane (gNB-CU-UP), an eNB, a radio network controller (RNC), an access point, a relay node, an access node (AN), a radio access network (RAN), and/or the like.

As described herein, performance may be improved (e.g., latency may be reduced, reliability may be increased, error rate may be reduced, packet loss rate and/or packet transmission latency may be reduced, etc.) for wireless communications, such as for priority services. Resource allocation by a second access node, to a first accessnode, for access link data transmissions (e.g., data transmission via an access link between a first access node and a child node of the first access node) may be improved. Packet transmission latency may be reduced, for example, by supporting a more efficient resource grant by a second access node, to a first access node. A second access node may dynamically provide (e.g., send, transmit, etc.) a resource grant to a first access node, for example, with a transmission of low latency data for a wireless device. The first access node may use the resource grant to transmit the low latency data to the wireless device via a child link (e.g., access link). The child link may be based on the resource grant. The resource grant may not need a request (e.g., buffer status request, scheduling request, etc.) from the first access node to the second access node. The second access node may transmit the resource grant without receiving the request from the first access node.

Communication networks (e.g, in an IAB communication system) may support a wireless backhaul connection for an access network node (e.g., distributed unit, gNB-DU, base station, gNB, IAB-node, relay node, mobile relay node, RAN node, and/or the like). An IAB-node may indicate a RAN node that may support wireless access to wireless devices and/or may wirelessly backhaul access traffic. An IAB-donor may indicate a RAN node which may provide a wireless device's interface to a core network and/or may provide wireless backhauling functionality to IAB nodes.

As described herein, a communication network may enable flexible and/or very dense deployment of cells without causing a correspondingly proportionate increase in density of the transport network proportionately. Various deployment scenarios may include support for outdoor small cell deployments, indoor deployment, and/or mobile relays (e.g., on vehicles such as buses and/or trains). A communication network may support physically fixed relays and/or mobile relays.

In-band and/or out-of-band backhauling with respect to an access link may be supported, for example, in a network deployment. In-band backhauling may comprise scenarios in which access and backhaul link at least partially overlap in a frequency domain. The overlap may create half-duplexing or interference constraints. Half-duplexing constraints and/or interference constraints of in-band backhauling may result in a device/node not transmitting and receiving simultaneously on both links. Tighter interworking between access and backhaul in compliance with half-duplexing and interference constraints may be required, for example, in in-band backhauling deployments. Out-of-band scenarios may not pose half-duplexing constraints and/or interference constraints, in at least some examples.

In-band IAB scenarios may support TDM, FDM, and/or SDM of access and backhaul links, for example, subject to half-duplex constraint at a IAB node. In-band IAB scenario may support full duplex solutions. Out-of-band IAB scenarios may be supported using the same set of RAN features designed for in-band scenarios.

Wireless communications may support access and backhaul in different frequency spectrums (e.g., above-6 GHz and/or sub-6 GHz spectrums). Wireless communications may support backhauling of access traffic over same RAT backhaul links. Wireless communications may support inter-RAT operation for backhauling and access.

Wireless devices may transparently connect to an IAB-node via a same RAT. IAB architectures required for a first RAT access over a second RAT backhaul may be supported.

Wireless communications may support stand-alone (SA) and/or non-stand-alone (NSA) deployments. IAB-based relaying of a wireless device's secondary cell group (SCG) path may be supported for NSA. IAB-based relaying of a wireless device's master cell group (MCG) path be supported.

An IAB node may operate in SA mode and/or NSA mode. Wireless communications may support EN-DC and SA option 2. Wireless communications may support EN-DC and SA option 2 for wireless devices and IAB-nodes may be supported. Wireless communications may support NSA deployment options and/or combinations of SA and NSA.

Wireless communications described herein may support SA and/or NSA for an access link. Relaying may be applied, for example, to a RAN node and/or an NSA access link. Wireless communications may support both NSA and SA for a backhaul link. Wireless communications may support backhaul traffic over a radio interface. Wireless communications may support EN-DC for NSA access and backhaul links. Layer 2 (L2) and layer 3 (L3) relay architectures may be supported, for example, for IAB implementation.

Multi-hop backhauling may provide more range extension than single hop backhauling. Multi-hop backhauling may be beneficial, for example, for frequency bands that may have a limited range (e.g., above-6 GHz frequencies). Multi-hop backhauling may enable backhauling around obstacles (e.g. buildings in urban environment). Multi-hop backhauling may be used for in-clutter deployments. A quantity (e.g., number) of hops in an IAB deployment may depend on various factors (e.g., frequency, cell density, propagation environment, and/or traffic load). The factors may vary over timeFlexibility in hop count may be desirable in such scenarios (e.g., from an architecture perspective).

Scalability issues may limit performance and/or increase signaling load, for example, with an increasing quantity of hops. Rendering scalability to be dependent on hop count may negatively affect system performances. An IAB system may support multiple backhaul hops. An IAB system may not limit on the number of backhaul hops. Wireless communications described herein may support scalability in hop-count. A single hop may be considered (e.g. interpreted as) as a special case of multiple backhaul hops.

Wireless backhaul links may be vulnerable to blockage. Moving objects (e.g., vehicles), seasonal variations (e.g., changes in foliage), and/or infrastructure changes (e.g. new constructions or buildings) may cause changes in a channel state of a backhaul, and may even cause failure in the backhaul link. Traffic variations, for example, may create uneven load distribution on wireless backhaul links that may lead to local link and/or node congestion. Physically stationary IAB-nodes may be affected because of vulnerability in wireless backhaul links.

Topology adaptation (e.g., adaptive routing) may refer to procedures that may autonomously reconfigure a backhaul network under various circumstances without discontinuing services for wireless devices. The circumstances may include, but are not limited to, blockage and/or local congestion. Wireless communications described herein may support topology adaptation for physically fixed relays to enable robust operation. Topology adaptation may be used to mitigate blockage and/or load variation on backhaul links.

IAB-related features such as IAB-node integration and/or topology adaptation may affect core network operations, in at least some scenarios. IAB features may create additional core-network signaling load. An amount of signaling load of core network nodes may depend on an architecture of an IAB system.

Time synchronization between IAB nodes may be implemented, for example, to support a TDD system and/or some other features that may require network synchronization. Wireless communications described herein may support implementations for network synchronization. Various implementations may comprise, for example, in-band wireless backhauling and/or multi-hop backhauling.

IAB architectures may comprise mobile-termination (MT) functions, gNB-DU functions, gNB-CU functions, UPF, AMF and SMF, as well as corresponding interfaces NR Uu (e.g., between MT and gNB), F1, NG, X2 and N4. An IAB architecture may be configured, for example, based on modifications and/or enhancements to these and/or other functions and interfaces. A MT function may be correspond to a component of a mobile equipment (e.g. a wireless device, a UE, etc.). An MT may correspond to a function residing on an IAB-node. The MT may terminate radio interface layers of a backhaul Uu interface toward an IAB-donor and/or other IAB-nodes.

Figure 16:
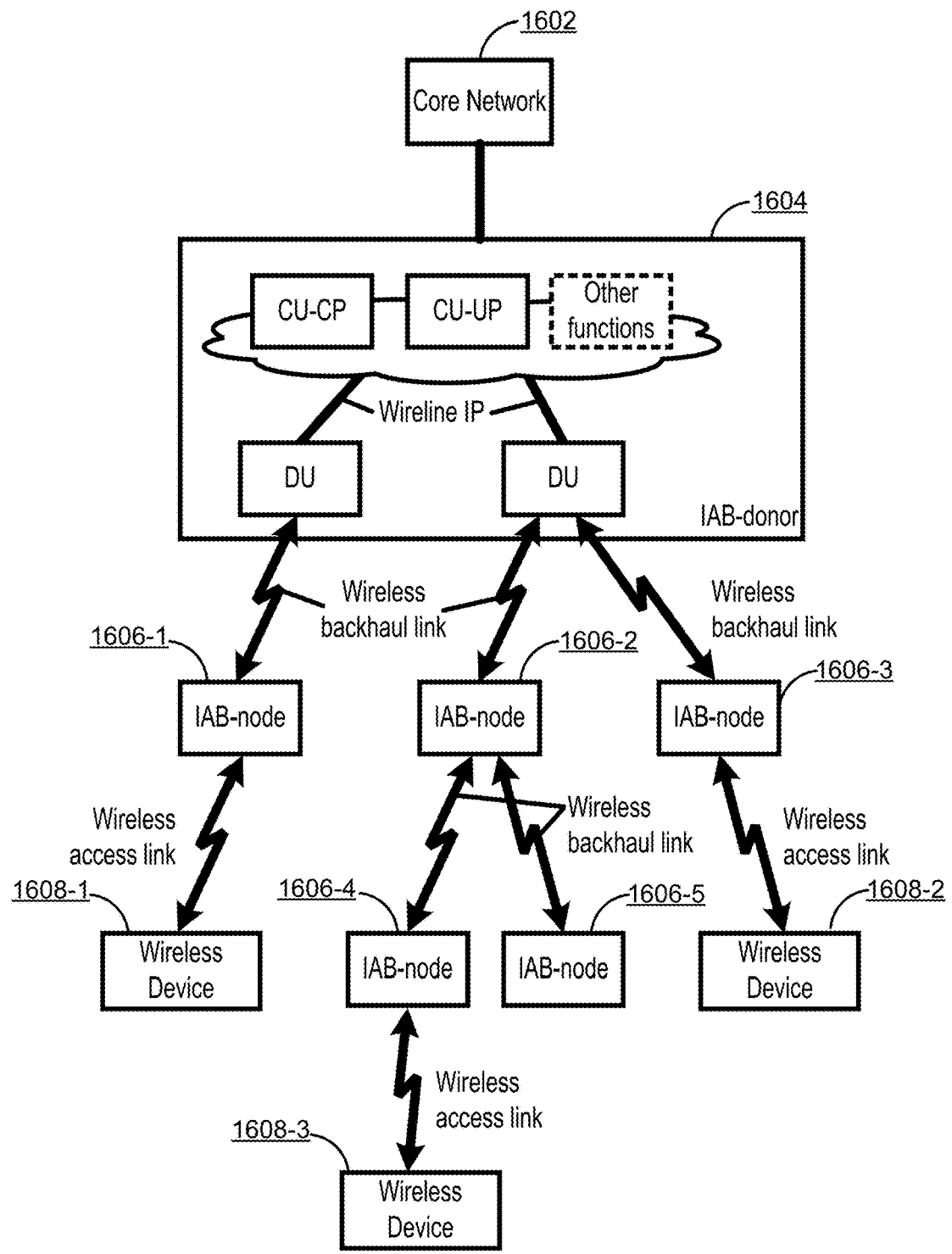
FIG. 16 shows an example integrated access and backhaul (IAB) system.

FIG. 16 shows an example communication network. The communication network may be in a standalone mode. The communication network may comprise an IAB-donor 1604 and multiple IAB-nodes 1606. The IAB-donor 1604 may be a single logical node that may comprise a set of functions (e.g., gNB-DU, gNB-CU-CP, gNB-CU-UP and/or potentially other functions). The IAB-donor 1604 may be split according to these functions. At least some of the functions may be collocated and/or non-collocated. Some functions associated with the IAB-donor 1604 may be moved outside of the IAB-donor 1604 donor. Wireless devices 1608 may be linked to the IAB nodes 1606.

An IAB node may operate in an SA mode and/or in an NSA mode. An IAB-node may use different links for backhauling, for example, if the IAB-node is operating in an NSA mode. A wireless device, connecting to an IAB-node, for example, may choose an operation mode that may be different from the IAB-node. A wireless device may connect to a core network that may be a different type than an IAB-node to which the wireless device may be connected. (Enhanced) Dedicated core network ((e)Decor) and/or slicing may be used for core network selection. IAB-nodes operating in NSA-mode may be connected to the same or to different base stations. Wireless devices operating in an NSA-mode may connect to same or to base stations different from an IAB-node to which the wireless devices may be connected.

Figure 17A:
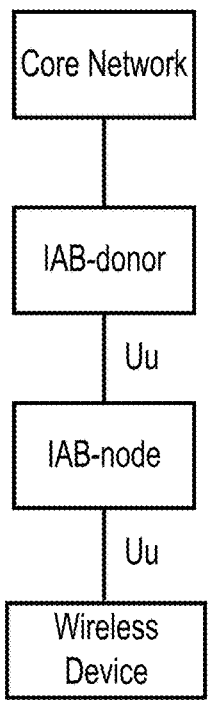
FIGS. 17A, 17B, and 17C show example IAB configurations.
Figure 17B:
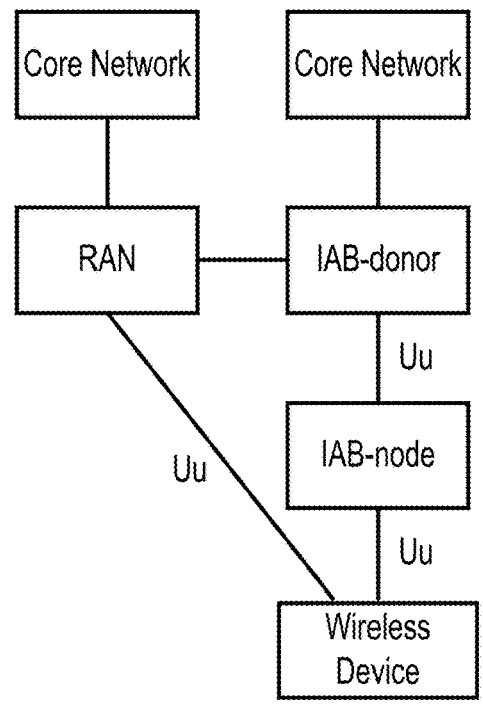
Figure 17C:
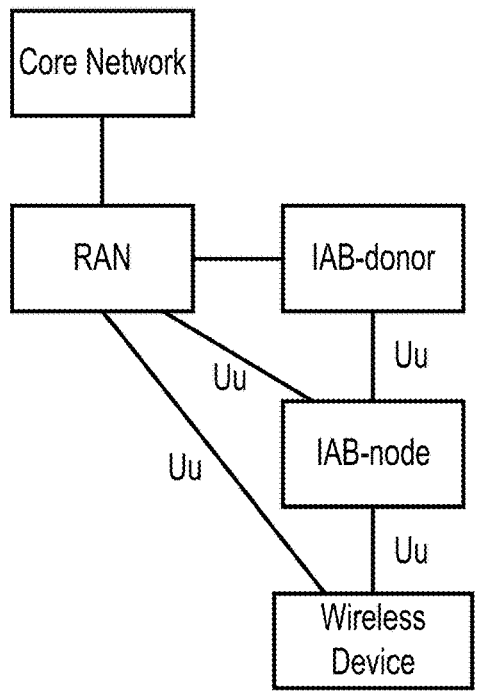

FIGS. 17A, 17B, and 17C show example IAB configurations. The example IAB configurations correspond to operations in SA-mode and/or NSA-mode with core network(s). FIG. 17A shows a wireless device and an IAB-node operating in an SA mode. The wireless device and the IAB node may have one corresponding parent node (e.g., IAB-donor). FIG. 17B shows a wireless device operating in an NSA mode, and an IAB-node operating in an SA mode. The wireless device, for example, may have multiple parent nodes (e.g., RAN and/or IAB-node). The IAB-node may have one parent node (e.g., IAB-donor). FIG. 17C shows a wireless device and an IAB-node operating in an NSA mode. The wireless device and the IAB-node may have multiple corresponding parent nodes.

IAB multi-hop designs may differ based on modifications with respect to interfaces and/or additional functionality that may be required. Some IAB multi-hop designs may be modified, for example, to provide for multi-hop forwarding functionality. Example architectures may be divided into two or more architecture groups (e.g., architecture group 1 and architecture group 2).

Architecture group 1 may comprise architectures 1a and/or 1b. The architecture 1a and/or 1b may leverage a CU/DU split architecture. Architecture 1a may comprise backhauling of F1-U using an adaptation layer and/or a GTP-U combined with an adaptation layer. Architecture 1a may use hop-by-hop forwarding across intermediate node(s) using an adaptation layer for operation with a core network. Architecture 1a may use PDN-connection-layer routing for operation with other core networks (e.g., other RAT, EPC). Architecture 1b may comprise backhauling of F1-U on an access node using a GTP-U/UDP/IP. Architecture 1b may use hop-by-hop forwarding across intermediate node(s) using an adaptation layer.

Architecture group 2 may comprise architectures 2a, 2b, and/or 2c. Architecture 2a may comprise backhauling of F1-U or NG-U on an access node using a GTP-U/UDP/IP. Architecture 2a may use hop-by-hop forwarding across intermediate node using PDU-session-layer routing. Architecture 2b may comprise backhauling of F1-U or NG-U on an access node using a GTP-U/UDP/IP. Architecture 2b may use hop-by-hop forwarding across intermediate node(s) using a GTP-U/UDP/IP nested tunneling. Architecture 2c may comprise backhauling of F1-U or NG-U on an access node using GTP-U/UDP/IP. Architecture 2c may use hop-by-hop forwarding across intermediate node(s) using a GTP-U/UDP/IP/PDCP nested tunneling.

Figure 18:
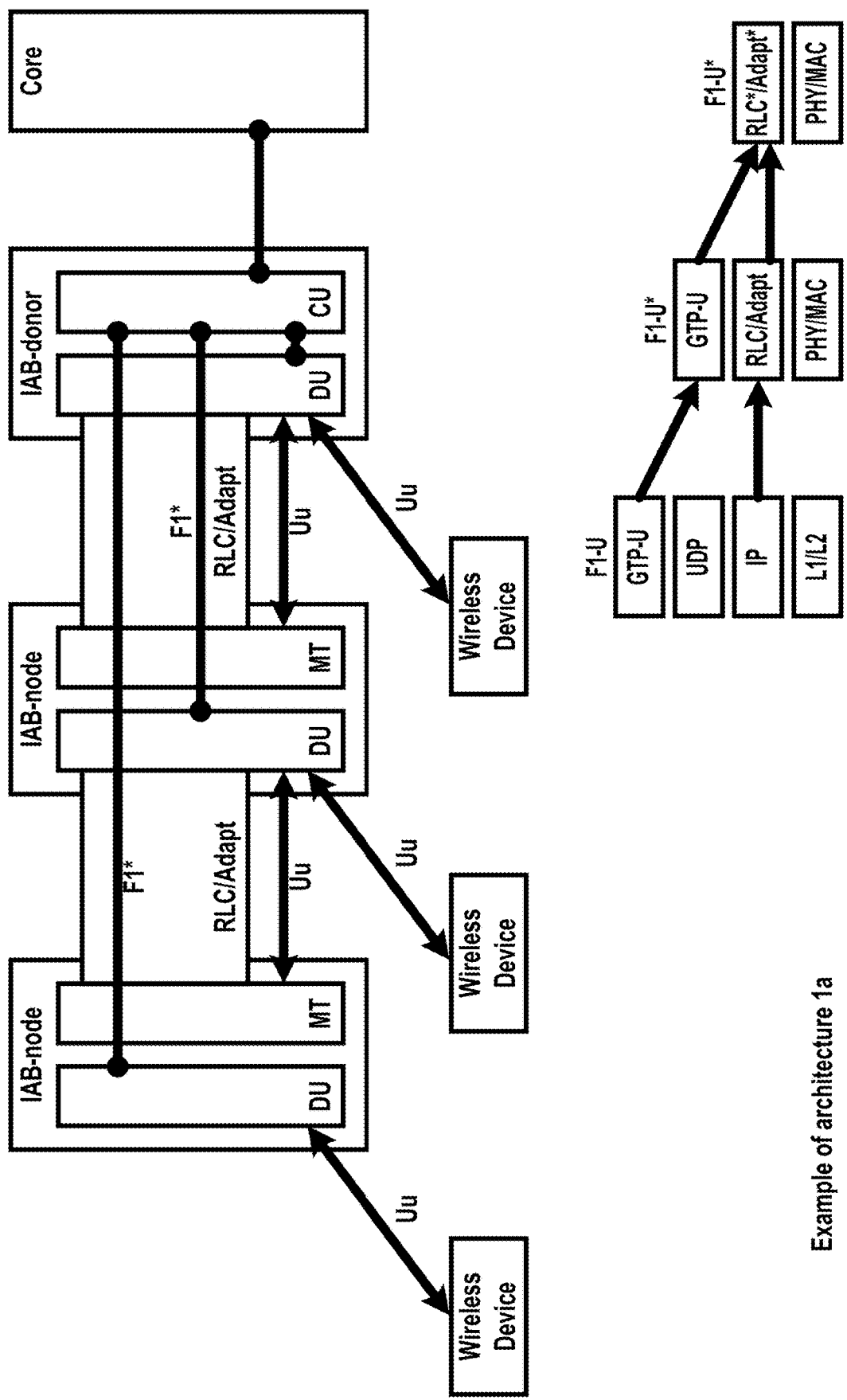
FIG. 18 shows an example IAB architecture.

Architecture 1a may leverage a CU/DU-split architecture. FIG. 18 shows an example IAB architecture (e.g., architecture 1a) corresponding to a two-hop chain of IAB-nodes underneath an IAB-donor. An IAB-node and/or a wireless device may connect, in an SA-mode, to a core network node (e.g. AMF, UPF, SMF, MME, SGW). An IAB node may comprise a DU and/or an MT. An IAB-node may connect, for example, via the MT, to an upstream IAB-node and/or to an IAB-donor. An IAB-node may establish, for example, via the DU, RLC-channels to wireless devices and/or to MTs of downstream IAB-nodes. An RLC-channel may refer to a modified RLC* channel An IAB node may connect to more than one upstream IAB-node and/or IAB-donor.

A donor (e.g., IAB-donor), for example, in architecture 1a, may hold a DU to support wireless devices and/or MTs of downstream IAB-nodes. An IAB-donor may hold a CU for DUs of IAB-nodes and/or for its own DU. Different CUs may serve DUs of IAB-nodes. A DU on an IAB-node may connect to a CU in an IAB-donor using a modified form of F1 (e.g., F1*). F1*-U may operate over RLC channels on a wireless backhaul between an MT on a serving IAB-node and a DU on a donor. An F1*-U transport channel between MT and DU on a serving IAB-node, and/or between DU and CU on a donor may be configured. An adaptation layer may be added. The adaptation layer may hold routing information and/or enable hop-by-hop forwarding. An adaptation layer may replace an IP functionality of an F1-stack. F1*-U may carry a GTP-U header for end-to-end association between a CU and a DU. Information carried via a GTP-U header may be included in an adaptation layer.

An RLC may apply, for example, in architecture 1a, ARQ on an end-to-end connection and/or hop-by-hop. F1*-U protocol stacks may be used. RLC* may refer to enhancements of RLC. An MT of IAB-node may sustain NAS connectivity to a core network node (e.g., AMF, SMF, MME, and/or the like core node). An MT of an IAB-node may sustain NAS connectivity for example, for authentication of an IAB-node. An MT of IAB-node may sustain a PDU session via a core network node (e.g., UPF, SGW, PGW, and/or the like core node). An MT of an IAB-node may sustain a PDU session, for example, to provide an IAB-node with connectivity to an operation, administration, and management (OAM) entity. An MT may be dual-connected with various networks (e.g., gNB, eNB, RNC, core network). IAB-node's MT may sustain a PDN connection with core network, for example, to provide the IAB-node with connectivity to an OAM entity. Protocol translation between F1* and F1 (e.g., in examples where an IAB-donor may be split) may be supported.

Figure 19:
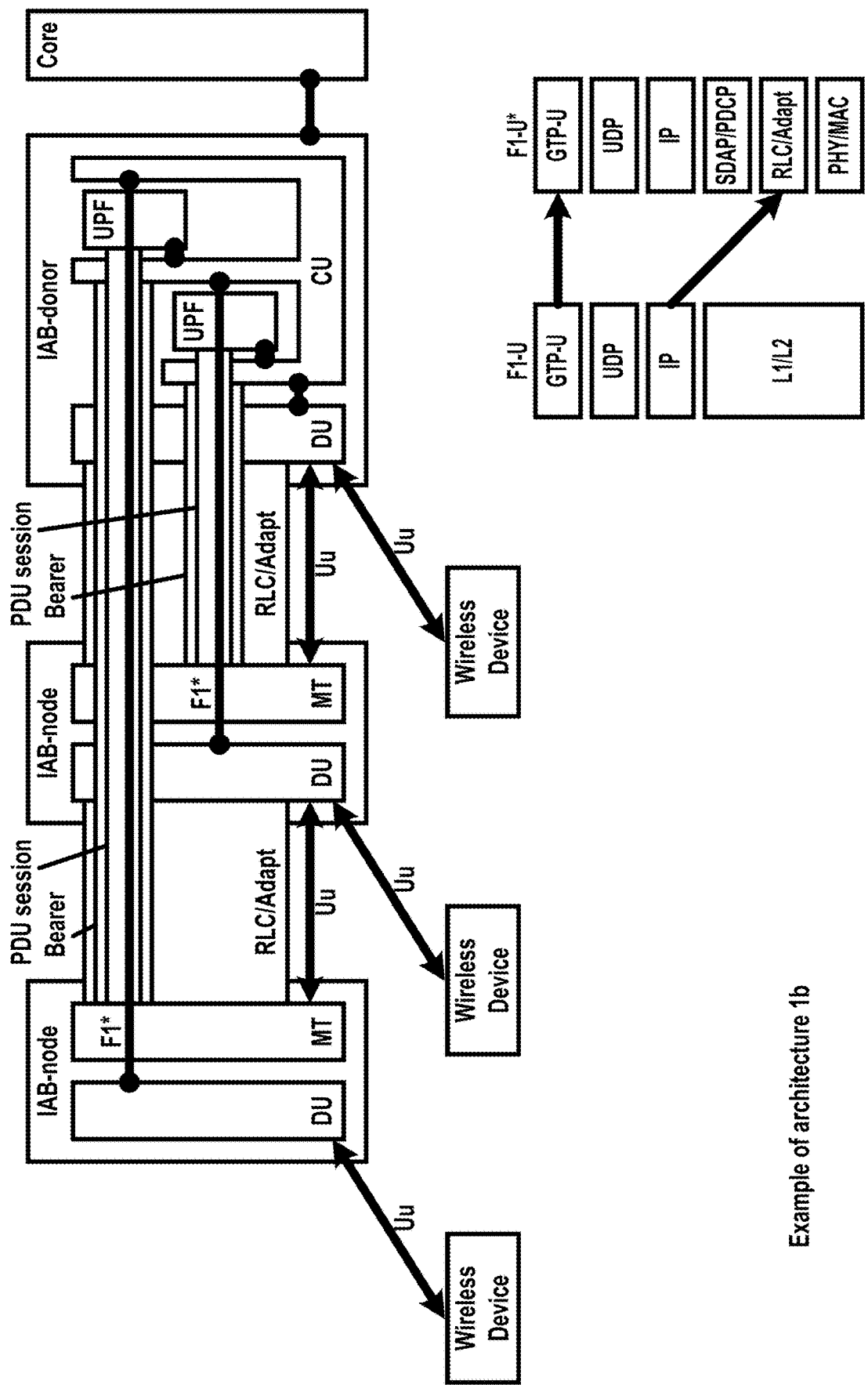
FIG. 19 shows an example IAB architecture.

Architecture 1b may leverage a CU/DU-split architecture. FIG. 19 shows an example IAB architecture (e.g., architecture 1b) corresponding to a two-hop chain of IAB-nodes underneath an IAB-donor. An IAB-donor may hold one logical CU. An IAB-node may connect to more than one upstream IAB-node and/or IAB-donor. An IAB-node and/or an IAB-donor in architecture 1b may hold the same functions as corresponding IAB node and/IAB-donor in architecture 1a. A backhaul link may establish an RLC-channel in a manner similar to architecture 1a. An adaptation layer may be inserted to enable hop-by-hop forwarding of F1*.

An MT on an IAB-node, for example, in architecture 1b, may established a PDU session with a UPF residing on a donor (IAB-donor). MT's PDU session may carry F1* for a collocated DU. A PDU session may provide a point-to-point link between CU and DU. PDCP-PDUs of F1* may be forwarded via an adaptation layer on intermediate hops. An F1*-U protocol stack may be used. An MT may be dual-connected with various networks (e.g. gNB, eNB, RNC, core network), for example, for NSA operation with core network. IAB-node's MT may sustain a PDN connection with a local gateway (L-GW) that resides on the donor.

Figure 20:
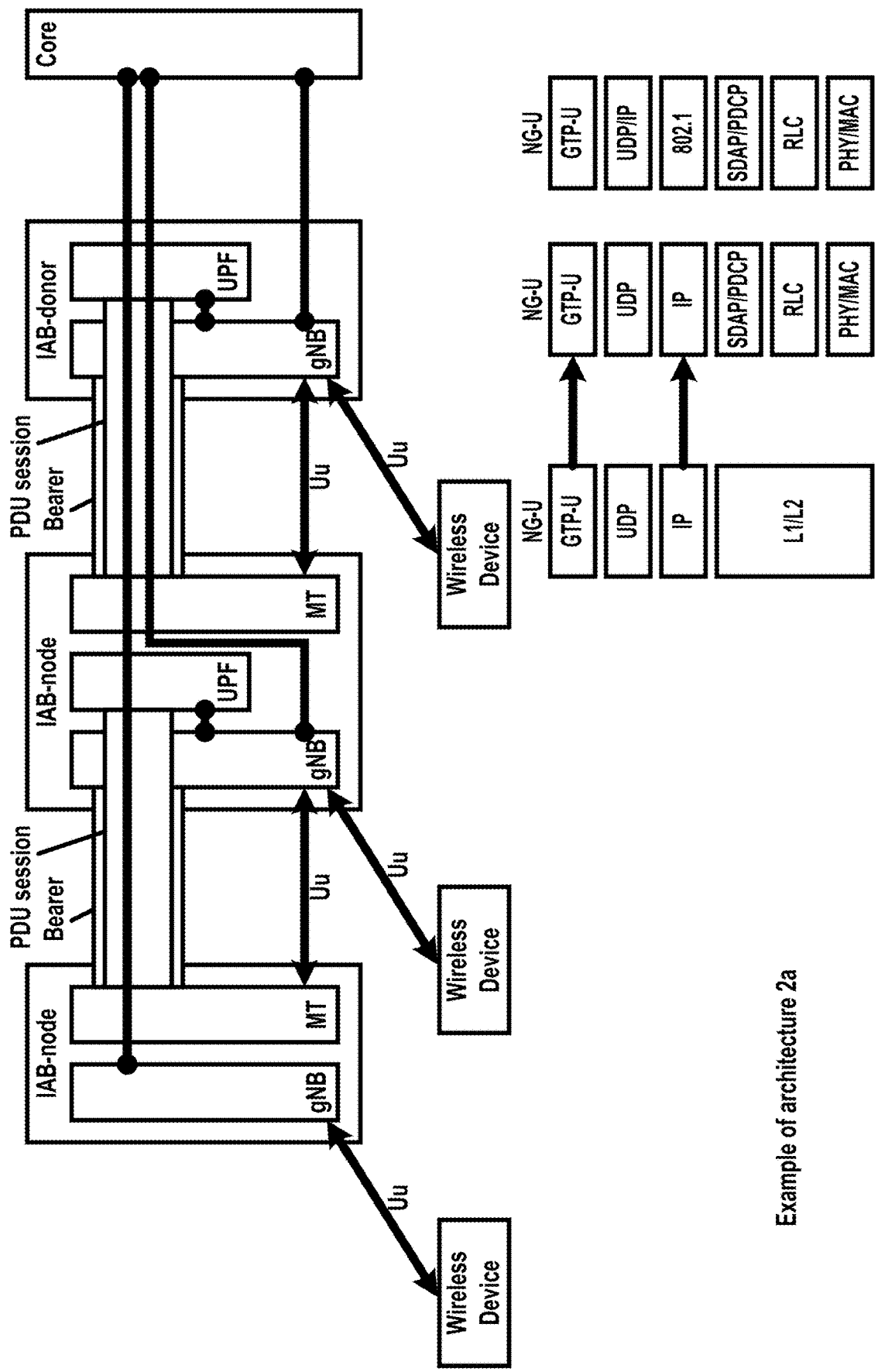
FIG. 20 shows an example IAB architecture.

FIG. 20 shows an example IAB architecture (e.g., architecture 2a), in which a wireless device and/or IAB-node may use SA-mode with core network. An IAB-node may hold an MT to establish a Uu link with a base station (e.g., a gNB) on a parent IAB-node and/or a base station (e.g., a gNB) on an IAB-donor. An MT may sustain a PDU session with a UPF that may by collocated with a base station via a Uu link. An independent PDU session may be created on a backhaul link (e.g., hop-by-hop). An IAB-node may support a routing function to forward data between PDU sessions of adjacent links. A routing function may create a forwarding plane across a wireless backhaul. A forwarding plane may support IP and/or Ethernet, for example, based on PDU session type. An IP layer may be established on top, for example, if the PDU session type corresponds to Ethernet. An IAB-node may obtain IP connectivity to a wireline backhaul network. An IAB-node may connect to more than one upstream IAB-node and/or IAB-donor.

IP-based interfaces (e.g. NG, Xn, F1, N4, etc.), for example, in architecture 2a, may be carried over a forwarding plane. An IAB-node (e.g., serving a wireless device) may comprise a DU for access links, for example, for F1 interfaces. An IAB-node (e.g., serving a wireless device) may comprise a base station (e.g., a gNB) and/or UPF for backhaul links, for example, for F1 interfaces. A CU for access links may reside in or beyond an IAB Donor. An NG-U protocol stack for IP-based PDU session type and/or for Ethernet-based PDU-session type may be used. A PDCP-based protection on a hop may not be required, for example, if an IAB-node holds a DU for UE-access. This may be because end user data may be protected using end to end PDCP between a wireless device and a CU. An MT may be dual-connected with various networks (e.g. gNB, eNB, RNC, core network), for example, for NSA operation with core network. An IAB-node's MT may sustain a PDN-connection with an L-GW residing on a parent IAB-node and/or an L-GW residing on an IAB-donor. IP-based interfaces (e.g. NG, Xn, S1, S5, X2, etc.) may be carried over a forwarding plane.

Figure 21:
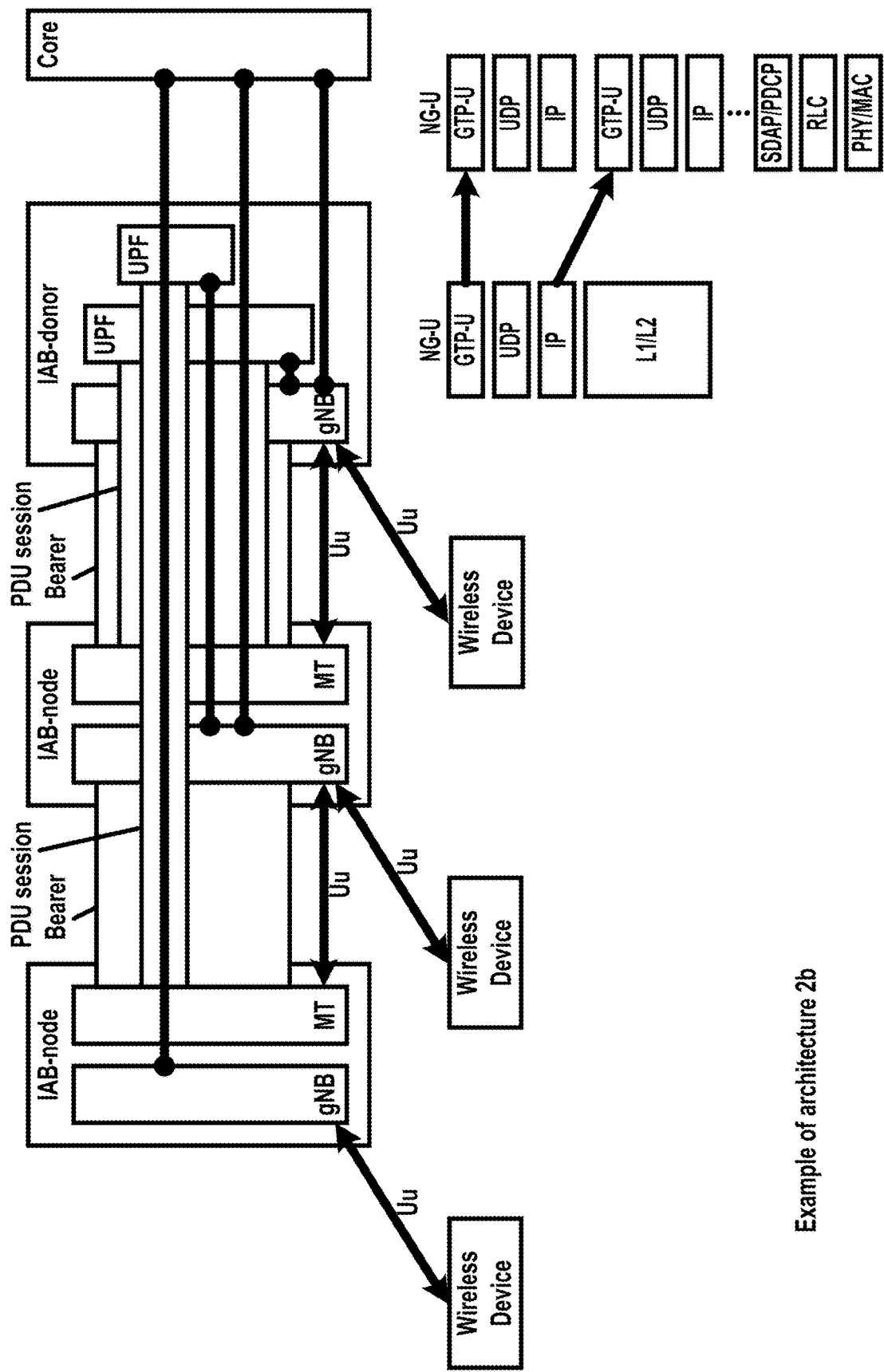
FIG. 21 shows an example IAB architecture.

FIG. 21 shows an example IAB architecture (e.g., architecture 2b). An IAB-node, in architecture 2b, may hold an MT to establish a Uu link with a base station (e.g., gNB) on a parent IAB-node, and/or a base station (e.g., a gNB) on an IAB-donor. An MT may sustain a PDU session with a UPF, for example, via a Uu link. A UPF may be located at an IAB-donor. Tunneling may be used for forward PDUs across upstream IAB-nodes. Forwarding across multiple hops may create a stack of nested tunnels. An IAB-node may obtain IP-connectivity to a wireline backhaul network. IP-based interfaces (e.g., NG, Xn, F1, N4, etc.) may be carried over a forwarding IP plane. A protocol stack for NG-U (e.g. S1-U) may be used. An IAB node may connect to more than one upstream IAB-node and/or IAB-donor. An MT may be dual-connected with various networks (e.g. gNB, eNB, RNC, core network), for example, for NSA operation with core network. IAB-node's MT may sustain a PDN-connection with an L-GW residing on an IAB-donor.

Figure 22:
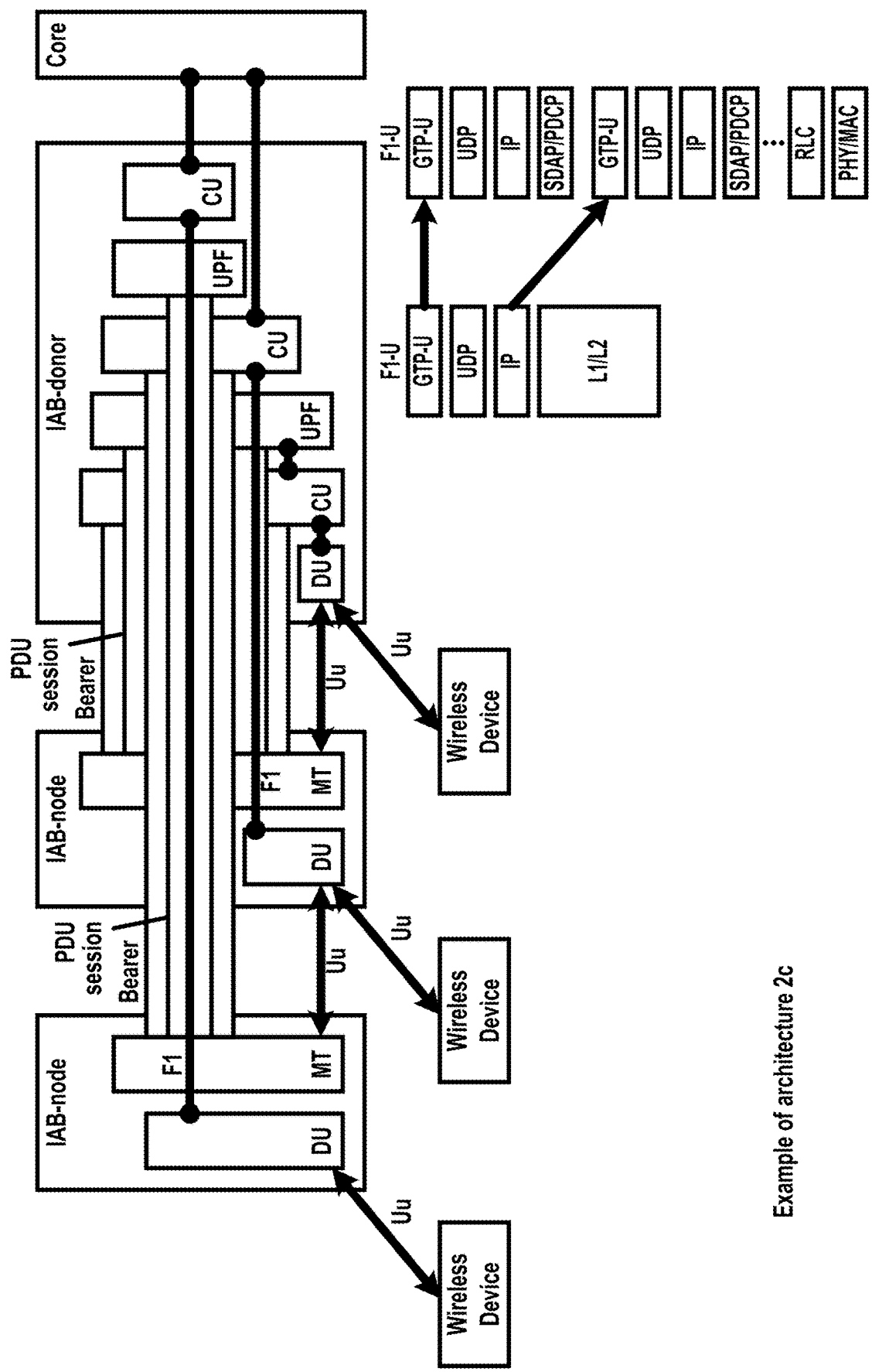
FIG. 22 shows an example IAB architecture.

FIG. 22 shows an example IAB architecture (e.g., architecture 2c). Architecture 2c may leverage a DU-CU split. An IAB-node may hold an MT. The MT may sustain an RLC-channel with a DU on a parent IAB-node and/or with a DU on an IAB-donor. An IAB donor may hold a CU and/or a UPF for IAB-node's DU. An MT on an IAB-node may sustain a Uu link with a CU and/or a PDU session with a UPF on a donor (e.g., IAB-donor). Tunneling may be used for forwarding on intermediate nodes. Forwarding across multiple hops may create a stack of nested tunnels. An IAB-node may obtain IP-connectivity to a wireline backhaul network. A tunnel may comprise an SDAP/PDCP layer. IP-based interfaces (e.g., NG, Xn, F1, N4, etc.) may be carried over a forwarding plane. A protocol stack for NG-U (e.g. S1-U) may be used. An IAB node may connect to more than one upstream IAB-node and/or IAB-donor. An MT may be dual-connected with networks (e.g. gNB, eNB, RNC, core network), for example, for NSA operation with core network. IAB-node's MT may sustain a PDN-connection with an L-GW residing on an IAB-donor.

An IAB node may follow the same initial access procedure as a wireless device. The initial access procedure may comprise a cell search, system information (SI) acquisition, and/or random access. The initial access procedure may be used to initially set up a connection with a parent IAB-node and/or an IAB-donor. SSB and/or CSI-RS based RRM measurement may be supported for IAB-node discovery and/or measurement. An inter-IAB-node discovery procedure, for example, subject to half-duplex constraint and/or multi-hop topologies, may be supported. The inter-IAB-node discovery procedure may be configured to avoid conflicting SSB configurations among IAB-nodes and/or for enabling feasibility of CSI-RS based IAB-node discovery. IAB-donor and IAB-node may share the same and/or separate cell ID(s). An IAB-node may elect to use the same cell ID or may elect to use a different cell ID, for example, if a cell ID may be is used by another IAB-node. Feasibility of sharing the same cell ID by an IAB-donor and an IAB-node may depend on IAB architectures. Mechanisms for multiplexing of RACH transmissions from wireless devices and/or RACH transmissions from IAB-nodes may be supported.

Measurements on multiple backhaul links may be supported, for example, for link management and/or route selection. A communication network may support detection and/or measurement of candidate backhaul links (e.g., after initial access), for example, to support a half-duplex constraint in an IAB-node. Detection and/or measurement of candidate backhaul links may utilize resources that may be orthogonal, in time, to those used by access wireless devices for cell detection and/or measurement. A communication network may (e.g., to support detection and measurement of candidate backhaul links) support at least one of: TDM of SSBs (e.g. depending on hop order, cell ID, etc.), SSB muting across IAB-nodes, multiplexing of SSBs for access wireless devices and IABs within a half-frame and/or across half-frames, additional IAB-node discovery signal which may be TDMed with SSB transmissions (e.g., CSI-RS), use of off-raster SSBs, different transmission periodicity for backhaul link detection and/or measurement compared to the periodicity used by access wireless devices, and/or the like. Coordination mechanisms for different solutions may be supported. The coordination mechanisms may comprise mechanisms for coordination of reference signal (RS) transmission and/or coordination of measurement occasions for IAB-nodes. Enhancements of SMTC and/or CSI-RS configurations, to support RRM measurement for IAB-nodes, may be considered.

An IAB-node may support mechanisms for detecting and/or recovering from backhaul link failure. Enhancements to RLM RS and/or associated procedures for IAB may be supported.

Mechanisms for route switching and/or transmission and/or reception on multiple backhaul links simultaneously (e.g., multi-TRP operation and/or intra-frequency dual connectivity) may be supported. Feasibility of such mechanisms may depend on IAB architectures.

Downlink IAB node transmissions may be scheduled by an IAB-node. Downlink IAB node transmissions may comprise transmission on backhaul links from an IAB-node to child IAB-nodes that are served by the IAB-node. Downlink IAB node transmissions may comprise transmissions on access links from an IAB-node to wireless devices that are served by the IAB-node. Uplink IAB transmission may be scheduled by a parent IAB-node or an IAB-donor. Uplink IAB transmissions may comprise transmissions, on a backhaul link, from an IAB-node to a parent IAB-node of the IAB node. Uplink IAB transmissions may comprise transmissions, on a backhaul link, from an IAB-node to an IAB-donor.

Communication networks described herein may support TDM, FDM, and/or SDM between access links and backhaul links at an IAB-node (e.g., subject to a half-duplex constraint). Mechanisms for TDM, FDM, and/or SDM multiplexing of access and/or backhaul traffic across multiple hops may consider an IAB node half-duplex constraint.

Communication networks may support mechanisms for orthogonal partitioning of time slots and/or frequency resources between access and backhaul links. Communication networks may support orthogonal partitioning mechanisms across one and/or multiple hops. Communication networks may provide utilization of different DL slot configurations and/or UL slot configurations for access and backhaul links. Communication networks may support DL and/or UL power control enhancements and/or timing requirements, for example, to allow intra-panel FDM and/or SDM of backhaul and access links. Communication networks may provide interference management (e.g., cross-link interference management).

Communication networks may support, for example, scheduling coordination, resource allocation, and/or route selection across IAB-nodes, IAB-donors and/or multiple backhaul hops. Semi-static (e.g., on a timescale of RRC signaling) mechanisms may be supported for resource coordination between IAB-nodes. Resource coordination may comprise coordination of frequency resources, time resources (e.g., in terms of slot and/or slot format), spatial resources, etc. Communication networks may support distributed and/or centralized resource coordination mechanisms. Communication networks may support various resource granularities for required signaling (e.g., TDD configuration pattern). IAB-nodes and/or IAB-donors may exchange information of L1 and/or L3 measurements. IAB-nodes and/or IAB-donors may exchange topology related information (e.g., hop order), for example, based on a backhaul link physical layer design. Communication networks support may support resource coordination which may be faster than semi-static coordination.

Over-the-air (OTA) synchronization may be configured for a communication network. Communication networks may support mechanisms to adjust timing alignment of IAB-nodes. Communication networks may support detection and/or management of timing misalignment. The detection and/or management of timing misalignment may depend on a number of hops. Communication networks may implement mechanisms for timing alignment across multi-hop IAB networks. Communication networks may support TA-based synchronization between IAB-nodes. Communication networks may support TA-based synchronization across multiple backhaul hops. Communication networks may support various cases of transmission timing alignment across IAB-nodes and/or IAB-donors, for example: DL transmission timing alignment across IAB-nodes and/or IAB-donors; DL transmission and UL transmission timing alignment within an IAB-node; DL reception and UL reception timing alignment within an IAB-node; timing alignment within an IAB-node, for example, if transmitting DL signals and UL signals and receiving DL signals and UL signals; DL transmission timing alignment across IAB-nodes and/or IAB-donors for access link; and/or timing alignment within an IAB-node, for example, if transmitting DL signals and UL signals and receiving DL signals and UL signals for backhaul link timing in different time slots.

Levels of timing alignment between IAB-nodes and IAB-donors and/or within an IAB-node may comprise, for example, slot-level alignment, symbol-level alignment, and/or no alignment. IAB implementation for TDM, FDM, and/or SDM of access and backhaul links, cross-link interference, and/or access wireless devices may be supported.

Communication networks may control cross-link interference (CLI) on access links and backhaul links, for example, by providing interference measurement and management mechanisms. Communication networks may CLI across one and/or multiple hops.

IAB CLI mitigation techniques may support advanced receiver and transmitter coordination. CLI mitigation techniques may support interference mitigation mechanisms for inter-IAB-node interference scenarios. The inter-IAB-node interference scenarious, may comprise, for example: victim IAB-node receiving in DL via its MT, and interfering IAB-node transmitting in UL via its MT; victim IAB-node receiving in DL via its MT, and interfering IAB-node transmitting in DL via its DU; victim IAB-node receiving in UL via its DU, and interfering IAB-node transmitting in UL via its MT; and/or victim IAB-node receiving in UL via its DU, interfering IAB-node transmitting in DL via its DU. Communication networks may use mechanisms to resolve interference, experienced at an IAB-node, for example, in case of FDM and/or SDM reception at access links and backhaul links at an IAB-node. IAB support may support CLI measurements (e.g., short-term measurements, long term measurements, and/or multiple-antenna and beam-forming based measurements), and may support CLI mitigation in IAB-nodes and/or IAB-donors. Communication networks may support wireless backhaul links with high spectral efficiency. Communication networks may support, for example, 1024QAM, or any other modulation schemes, for the backhaul link.

A wireless device may establish RLC channels to a DU on an access IAB node corresponding to the wireless device. RLC-channels may be extended, for example, via a modified form of F1-U (which may also be referred to as F1*-U), between the wireless device's access DU and an IAB donor. Information embedded in F1*-U may be carried over RLC-channels across backhaul links. Transport of F1*-U over a wireless backhaul may be enabled by an adaptation layer. The adaptation layer may be integrated with an RLC channel An IAB-donor (which may also be referred to as fronthaul) may use F1-U stack. An IAB-donor DU may relay between F1-U on a fronthaul and/or F1*-U on a wireless backhaul.

Information carried on an adaptation layer (e.g., in architecture 1a) may support one or more functions of: indication (e.g., identification) of a wireless device-bearer for the PDU, routing across a wireless backhaul topology, QoS-enforcement by a scheduler on DL and UL on a wireless backhaul link, mapping of wireless device user-plane PDUs to backhaul RLC channels, and/or the like. Information carried on an adaptation layer (e.g., in architecture 1b) may support one or more functions of: routing across a wireless backhaul topology, QoS-enforcement by a scheduler on DL and UL on a wireless backhaul link, mapping of wireless device user-plane PDUs to backhaul RLC channels, and/or the like.

Information to be carried on an adaptation layer header may comprise, for example, one or more of: wireless device-bearer-specific ID, wireless device-specific ID, Route ID, IAB-node, IAB-donor address, QoS information, and/or the like. Information on an adaptation layer may be processed to support adaptation layer functions on an on-path IAB-node (e.g., hop-by-hop), and/or on wireless device's access-IAB-node and an IAB-donor (e.g., end-to-end).

Figure 23A:
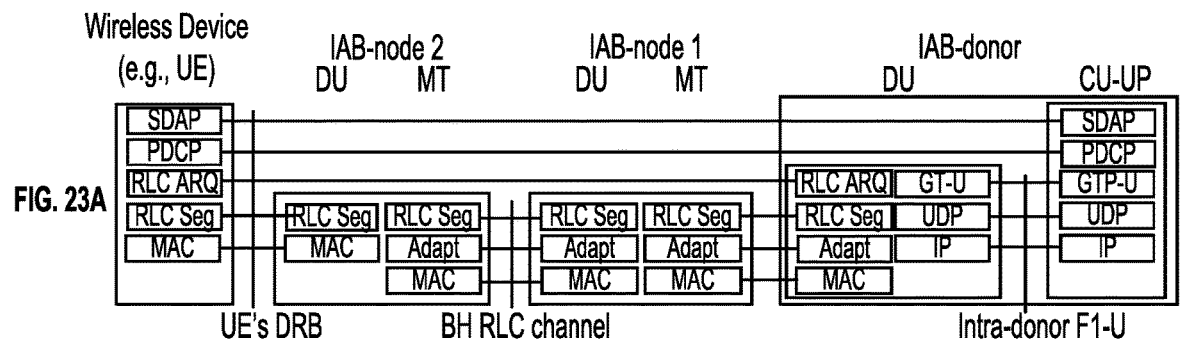
FIGS. 23A-23E show example IAB architectures from a protocol stack perspective.
Figure 23B:
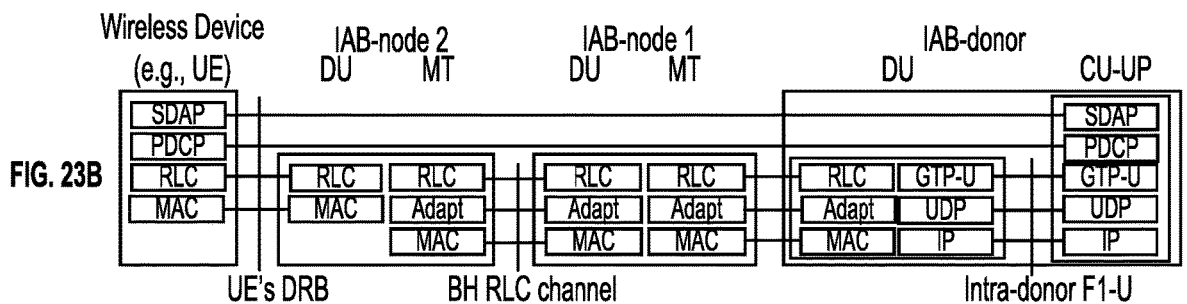
Figure 23C:
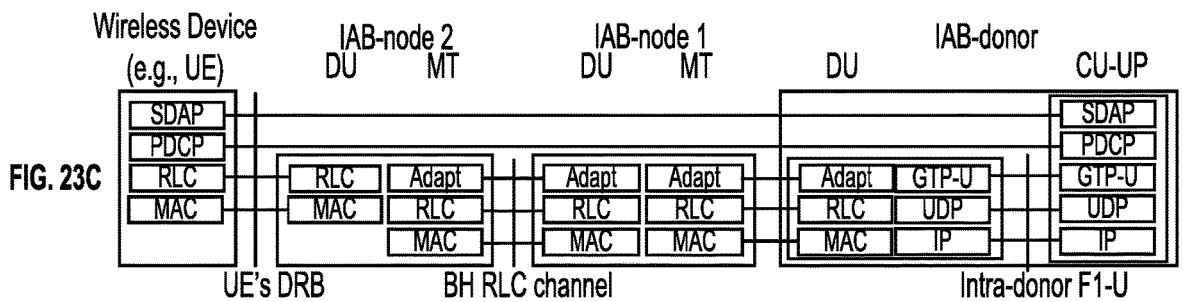
Figure 23D:
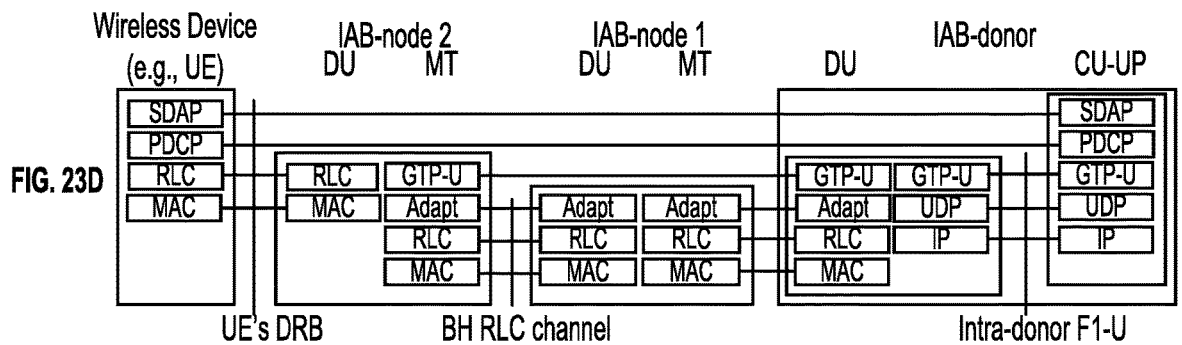
Figure 23E:
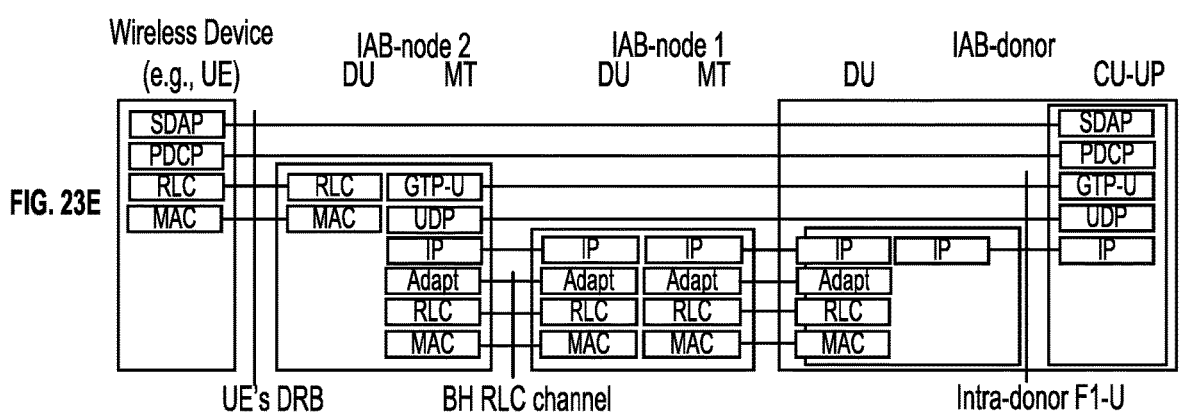
Figure 24:
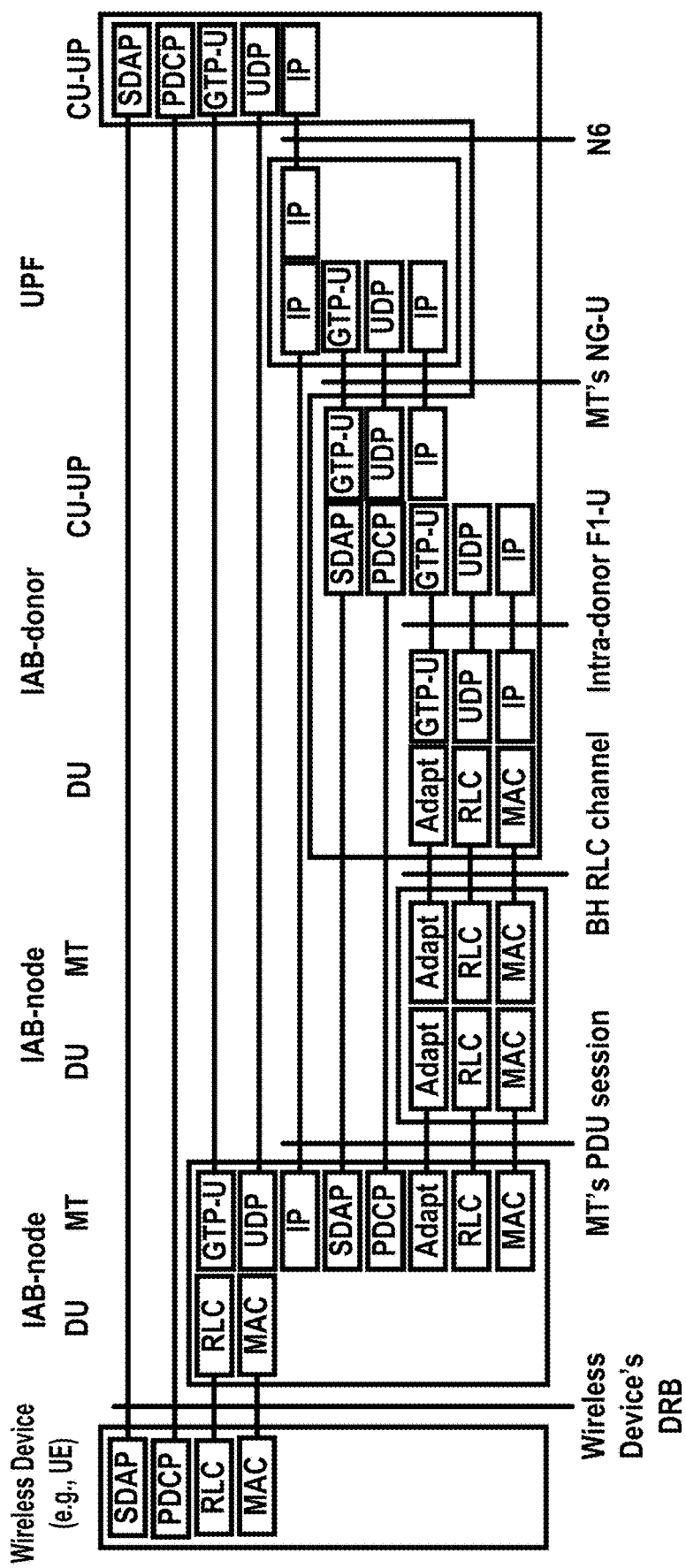
FIG. 24 shows an example IAB architecture from a protocol stack perspective.
Figure 25A:
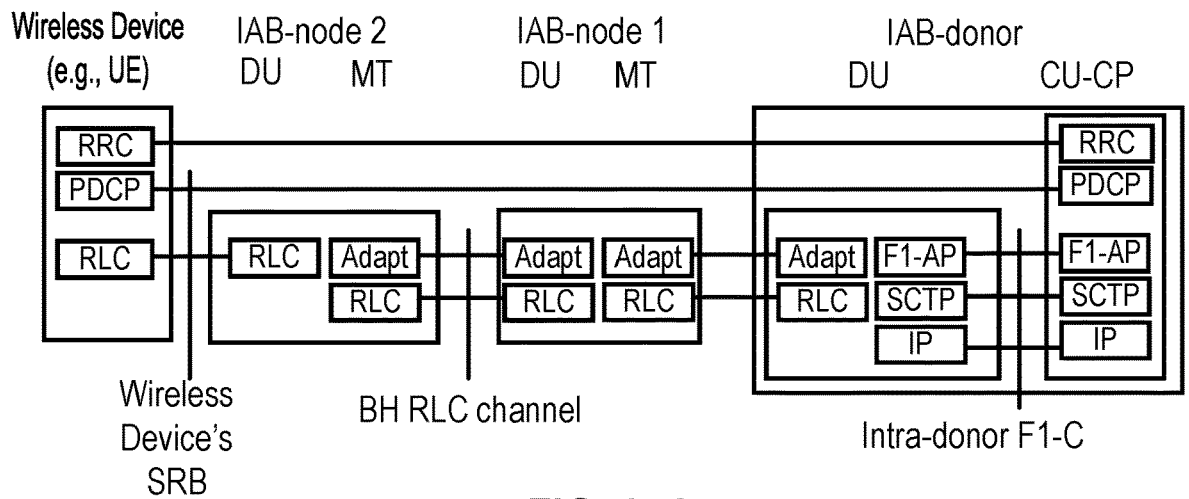
FIGS. 25A-25C show example IAB architectures from a protocol stack perspective.
Figure 25B:
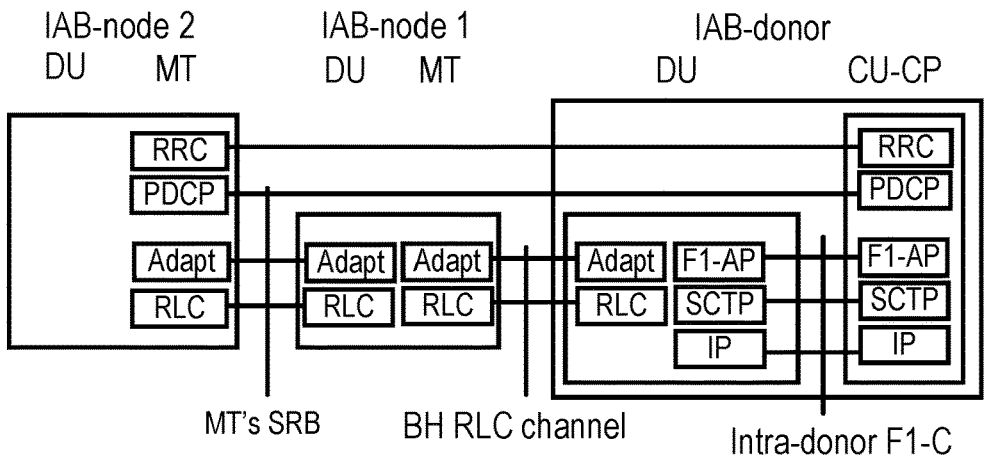
Figure 25C:
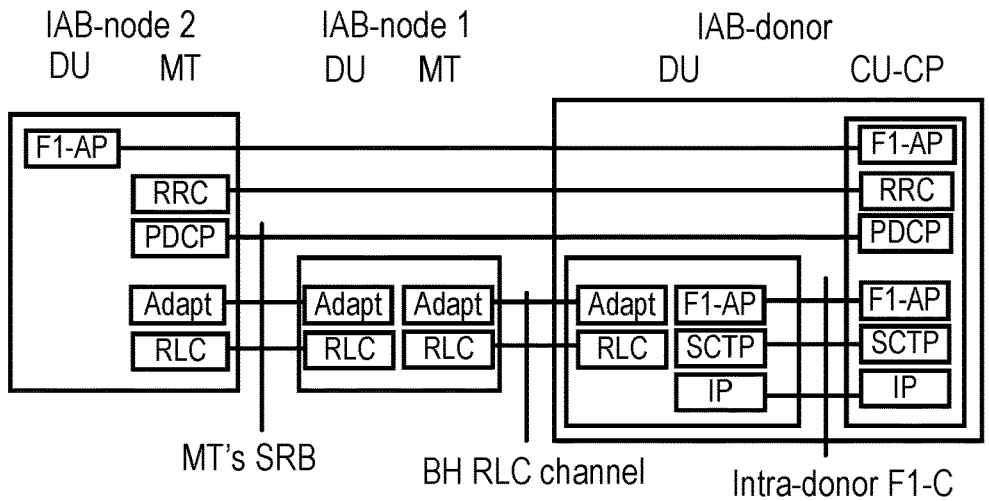

FIGS. 23A-23E, and FIG. 24 show example IAB architectures from a protocol stack perspective. An adaptation layer may be integrated with a MAC layer or a layer above the MAC layer, as shown in FIG. 23A and FIG. 23B. An adaptation layer may be integrated with a layer above an RLC layer, as shown in FIG. 23C, FIG. 23D, FIG. 23E and/or FIG. 24. RLC channels for backhauling may comprise an adaptation layer. An adaptation layer may be included in IAB-node access links.

An adaptation layer may comprise sublayers. A GTP-U header may become a part of an adaptation layer. A GTP-U header may be carried on top of an adaptation layer, for example, to carry end-to-end association between an IAB-node DU and a CU (e.g., as shown in FIG. 23D).

An IP header may be part of an adaptation layer and/or may be carried on top of an adaptation layer (e.g., as shown in FIG. 23E). An IAB-donor DU may hold an IP routing function, for example, to extend an IP-routing plane of a fronthaul to an IP-layer carried by an adaptation layer on a wireless backhaul. This may allow native F1-U to be established end-to-end (e.g., between IAB-node DUs and IAB-donor CU-UP). An IAB-node may hold an IP-address, which may be routable from a fronthaul via an IAB-donor DU. IAB-nodes' IP addresses may be used for routing on a wireless backhaul. An IP-layer on top of an adaptation layer may not represent a PDU session. MT's first hop router on an IP-layer may not hold a UPF.

An adaptation layer may be placed above an RLC and/or above a MAC. An above-RLC adaptation layer may support hop-by-hop ARQ. An above-MAC adaptation layer may support both hop-by-hop and end-to-end ARQ. Both adaptation layer placements may support aggregated routing, for example, by inserting an IAB-node address into an adaptation header. Both adaptation layer placements may support per-wireless device-bearer QoS for a large number of wireless device-bearers. An LCID space may be enhanced, for example, in protocol stacks with an above-RLC adaptation layer. This may be because a wireless device-bearer may be mapped to an independent logical channel. Wireless device-bearer-related information may be carried on an adaptation header, for example, in protocol stacks with an above-MAC adaptation layer. Both adaptation layer placements may support aggregated QoS handling, for example, by inserting an aggregated QoS ID into an adaptation header. An aggregated QoS handling may reduce the number of queues. An aggregated QoS handling may be independent of a location of an adaptation layer. Aggregation of routing and/or QoS handling, for either of the adaptation layer placements, may allow proactive configuration of intermediate on-path IAB-nodes. The configuration may be independent of wireless bearer-bearer establishment/release. RLC ARQ may be pre-processed on a transmission side for either of the adaptation layer placements.

ARQ may be conducted hop-by-hop along access and backhaul links for RLC AM. ARQ may be supported end-to-end between UE and IAB-donor. RLC segmentation may be a just-in-time process and/or may be conducted in a hop-by-hop manner A type of multi-hop RLC ARQ and an adaptation-layer placement may have interdependence, for example: for end-to-end ARQ, adaptation layer may be integrated with MAC layer or placed above MAC layer; and/or hop-by-hop ARQ may or may not have interdependence. Scheduling and/or QoS in downlink and/or uplink directions may be dependent upon an IAB architecture.

Control plane (CP) signaling across wireless backhaul-link may use, for example, the same routing and/or QoS enforcement mechanisms as used for user plane (UP) traffic. Priorities and/or QoS requirements of CP signaling may be, for example, different from UP traffic.

Signaling between an MT on an IAB-node and a central unit control plan (CU-CP) on an IAB-donor may use RRC protocol. Signaling between DU on an IAB-node and a CU-CP on an IAB-donor may use an F1-AP protocol. IAB specific enhancements to RRC and F1-AP may be supported.

RRC and F1-AP connections may be secured over wireless backhaul links. An RRC connection may have at least a same level of protection on a wireless backhaul link as on an access link. An F1-AP connection may have at least a same level of protection on a wireless backhaul link as on an RRC connection. The same level of protection for F1-AP and RRC may be supported.

For CP signaling protection, for example: PDCP may be used to protect RRC; and/or PDCP may be employed to protect F1-AP over a wireless backhaul. CP signaling protection based on using NDS may be supported.

A wireless device's and/or MT's UP and/or RRC traffic may be protected via PDCP over a wireless backhaul, for example, in architecture 1a. A CP protection mechanism may be defined to protect F1-AP traffic over a wireless backhaul.

FIGS. 25-29 show example IAB architectures from a protocol stack perspective. FIGS. 25A-25C shows protocol stacks corresponding to a wireless device's RRC, MT's RRC, and/or DU's F1-AP for alternative 1 of architecture 1a. An adaptation layer may be placed on top of RLC. An adaptation layer may or may not be included, for example, on IAB-node's access link. A wireless device's RRC and/or an MT's RRC may be carried over SRB for an example of alternative 1 of architecture 1a. SRB may use an RLC-channel on a wireless device's access link and/or an MT's access link. SRB's PDCP layer may be carried over RLC-channels with adaptation layer on wireless backhaul links. An adaptation layer placement in an RLC channel may be the same for a C-plane and a U-plane. Information carried on an adaptation layer may be different for SRB and DRB. DU's F1-AP may be encapsulated in RRC of a collocated MT. F1-AP may be protected by PDCP of an underlying SRB. An IAB-donor may use native F1-C stack.

Figure 26A:
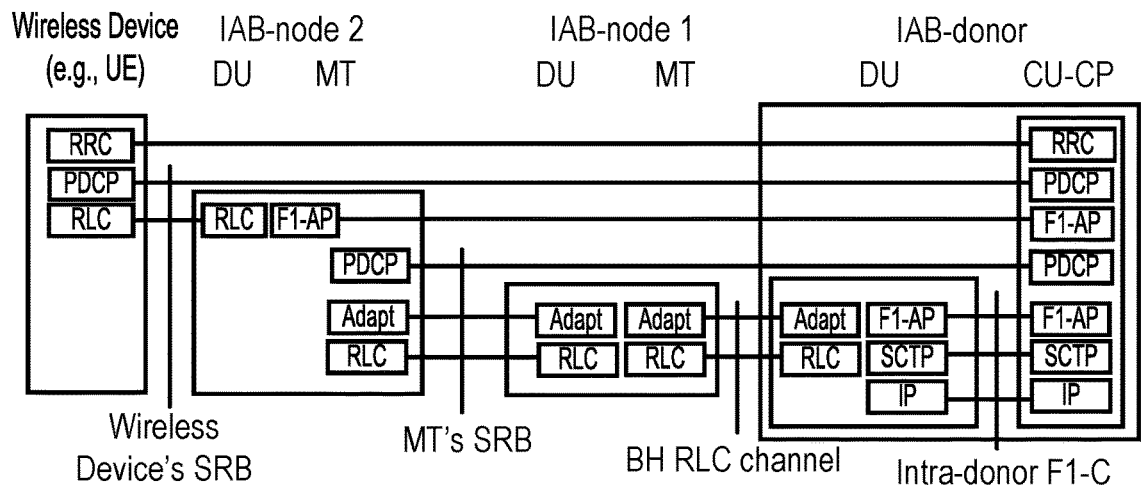
FIGS. 26A-26C show example IAB architectures from a protocol stack perspective.
Figure 26B:
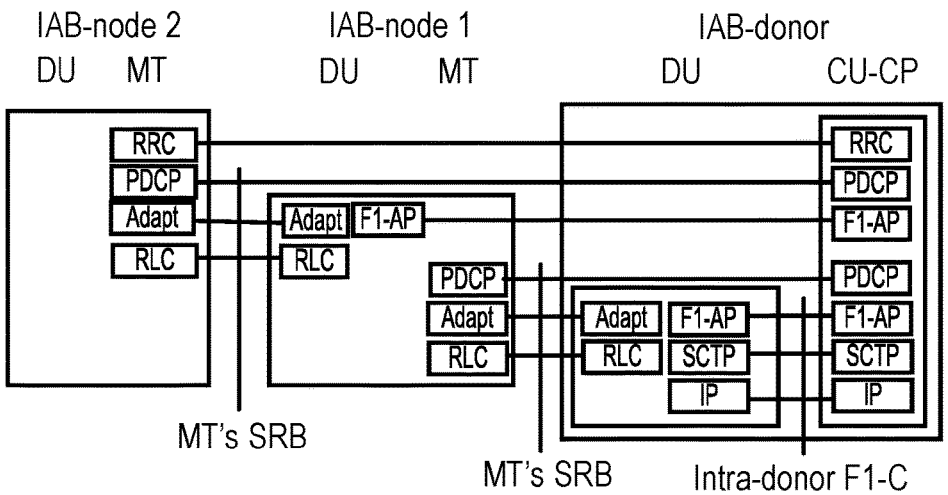
Figure 26C:
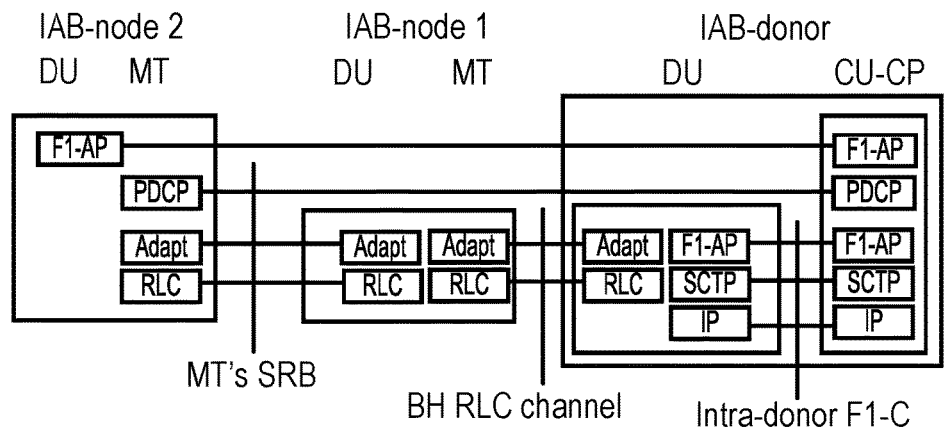

FIGS. 26A-26C show protocol stacks corresponding to a wireless device's RRC, MT's RRC, and/or DU's F1-AP for alternative 2 of architecture 1a. An adaptation layer may reside on top of RLC. An adaptation layer may or may not be included on an IAB-node's access link. A wireless device's RRC and/or an MT's RRC may be carried over an SRB for an example of alternative 2 of architecture 1a. An SRB may use an RLC-channel on a wireless device's access link and/or an MT's access link. PDCP of RRC's SRB may be encapsulated into F1-AP on a wireless backhaul link. DU's F1-AP may carried over an SRB of a collocated MT. F1-AP may be protected by this SRB's PDCP. PDCP of F1-AP's SRB may be carried over RLC-channels with adaptation layer on wireless backhaul links. An adaptation layer placement in an RLC channel may be the same for a C-plane and a U-plane. Information carried on an adaptation layer may be different for SRB and DRB. An IAB-donor may use native F1-C stack.

Figure 27A:
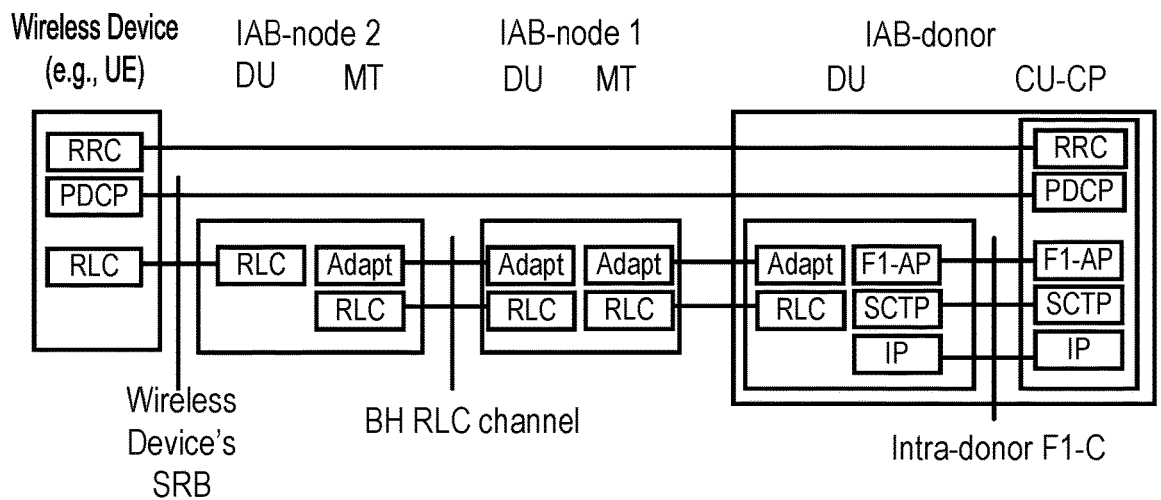
FIGS. 27A-27C show example IAB architectures from a protocol stack perspective.
Figure 27B:
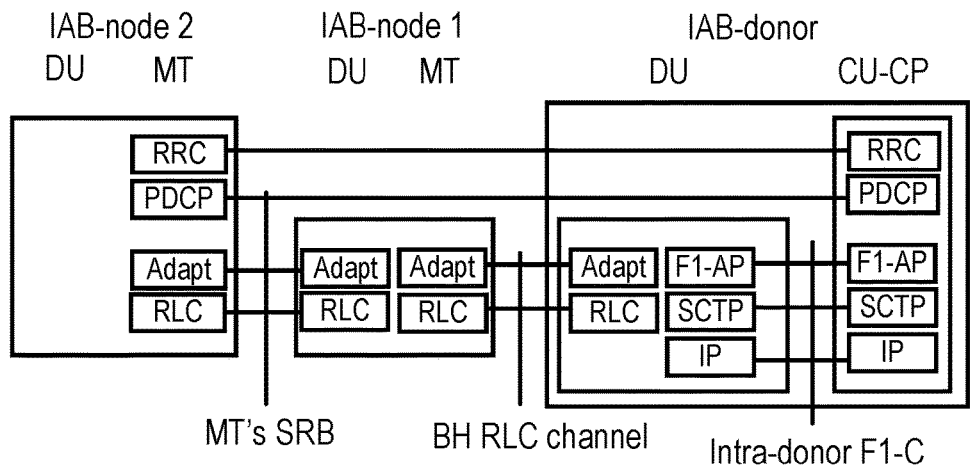
Figure 27C:
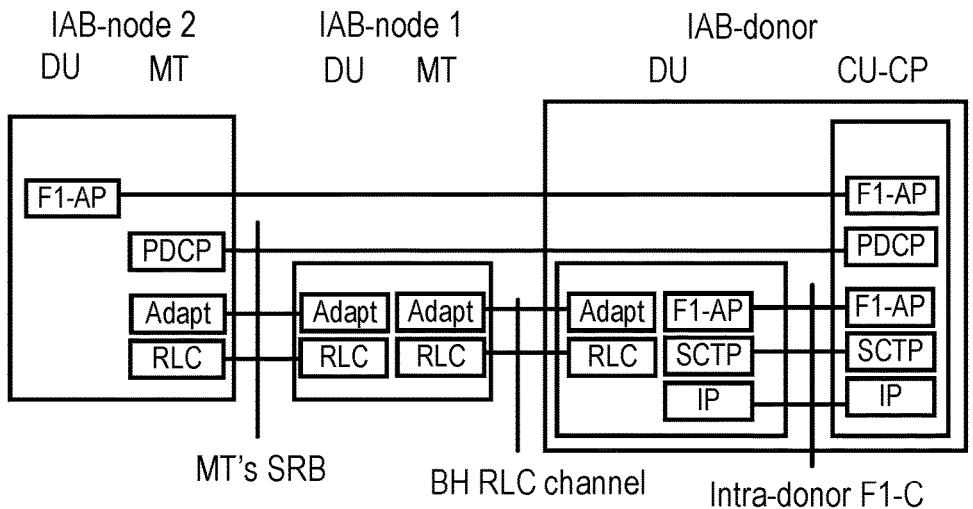

FIGS. 27A-27C show protocol stacks corresponding to a wireless device's RRC, MT's RRC, and/or DU's F1-AP for alternative 3 of architecture 1a. An adaptation layer may reside on top of RLC. An adaptation layer may or may not be included on an IAB-node's access link. A wireless device's and/or an MT's RRC may be carried over SRB in an example of alternative 3 of architecture 1a. RRC's SRB may use an RLC-channel on a wireless device's access link and/or an MT's access link. SRB's PDCP layer may be carried over RLC-channels with adaptation layer on wireless backhaul links. An adaptation layer placement in an RLC channel may be the same for a C-plane and a U-plane.

Information carried on an adaptation layer may be different for SRB and DRB. DU's F1-AP may be carried over an SRB of a collocated MT. F1-AP may be protected by SRB's PDCP. On wireless backhaul links, PDCP of an SRB may be carried over RLC-channels with adaptation layer. An IAB-donor may use native F1-C stack.

Figure 28A:
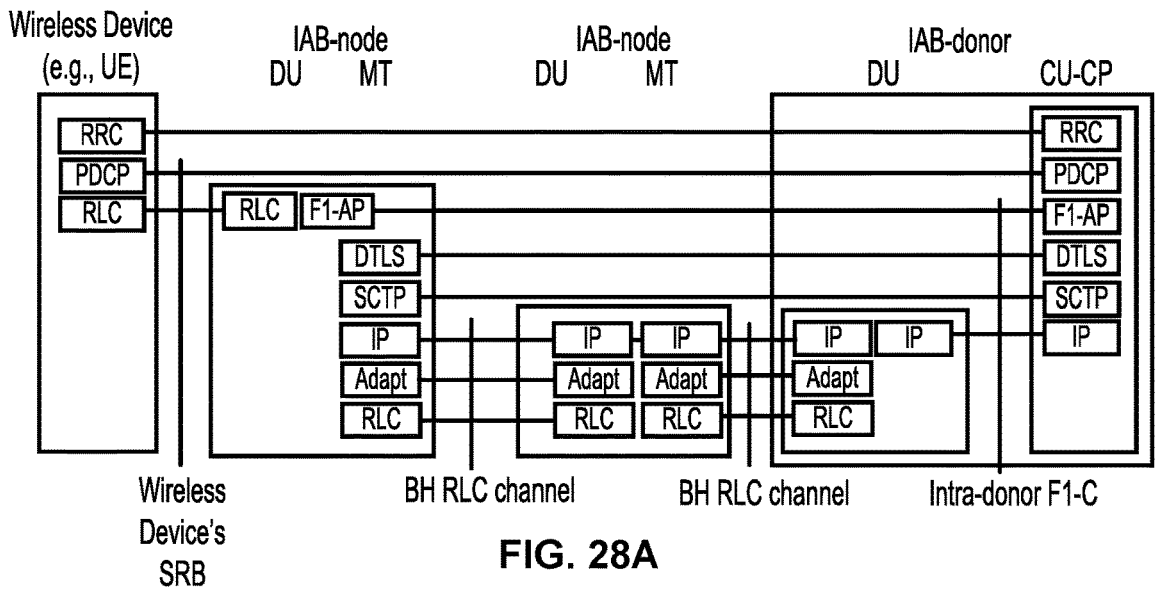
FIGS. 28A-28C show example IAB architectures from a protocol stack perspective.
Figure 28B:
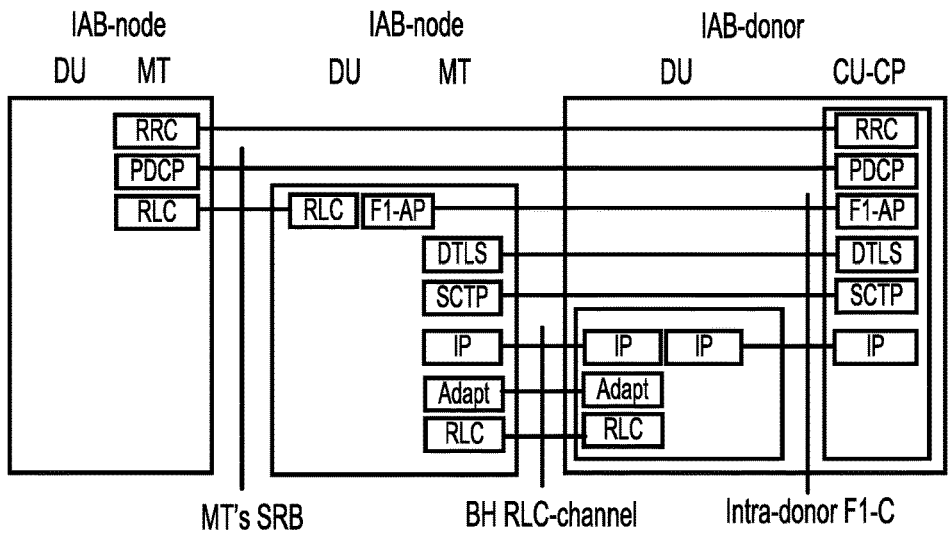
Figure 28C:
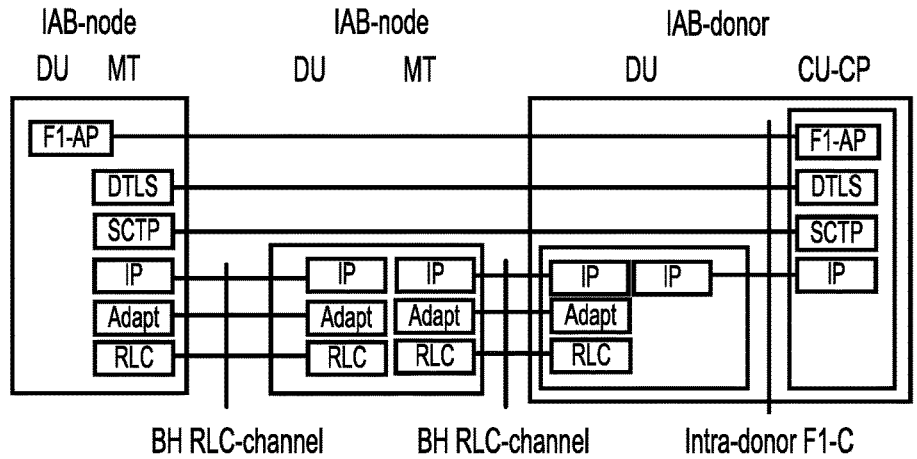

FIG. 28A-28C show protocol stacks corresponding to a wireless device's RRC, MT's RRC, and/or DU's F1-AP, for example, for alternative 4 of architecture 1a. An adaptation layer may reside on top of RLC and/or may carry an IP-layer. An IP-layer, carried by an adaptation layer, may be connected to fronthaul's IP-plane through a routing function at an IAB-donor DU in an example of alternative 4 of architecture 1a. IAB-nodes may hold IP-addresses on an IP layer. The IP-addresses may be routable from an IAB-donor CU-CP. An extended IP-plane may allow native F1-C to be used between IAB-node DU and IAB-donor CU-CP. Signaling traffic may be prioritized on an IP routing plane using DSCP markings. F1-C may be protected via NDS, for example, via D-TLS. A wireless device's and/or an MT's RRC may use SRB. The SRB may be carried over F1-C.

Figure 29A:
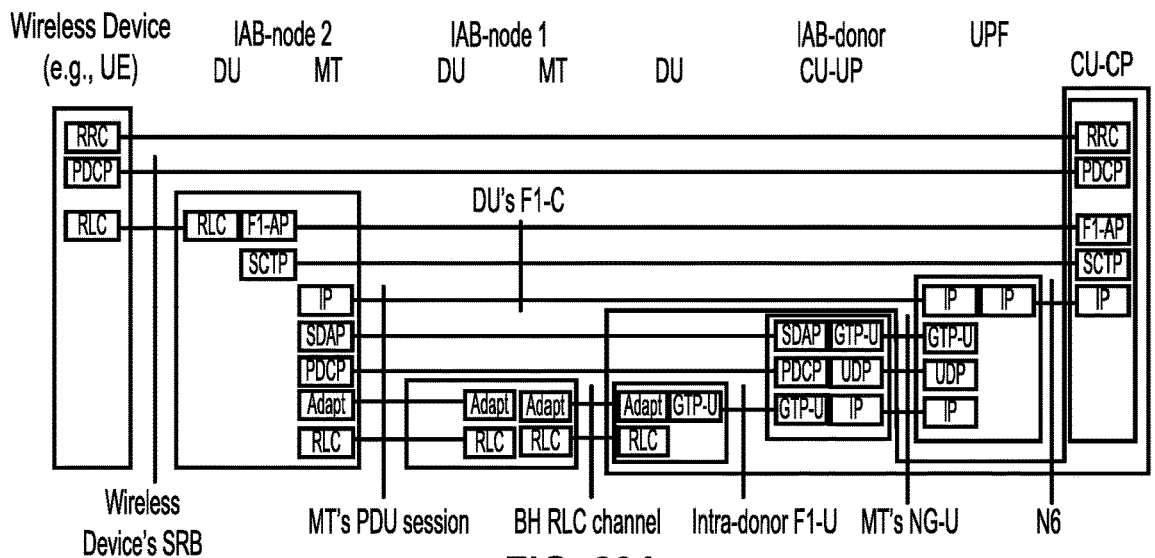
FIGS. 29A-29C show example IAB architectures from a protocol stack perspective.
Figure 29B:
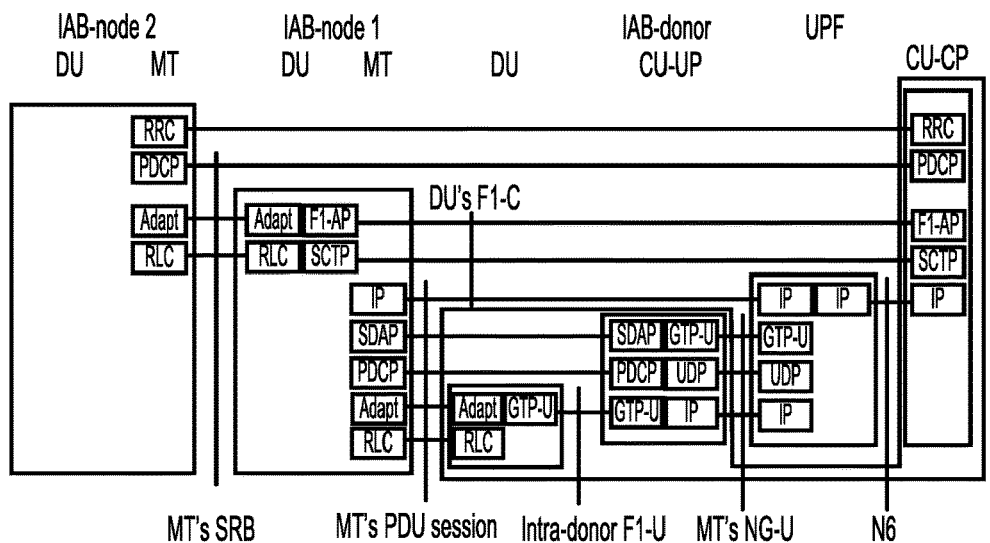
Figure 29C:
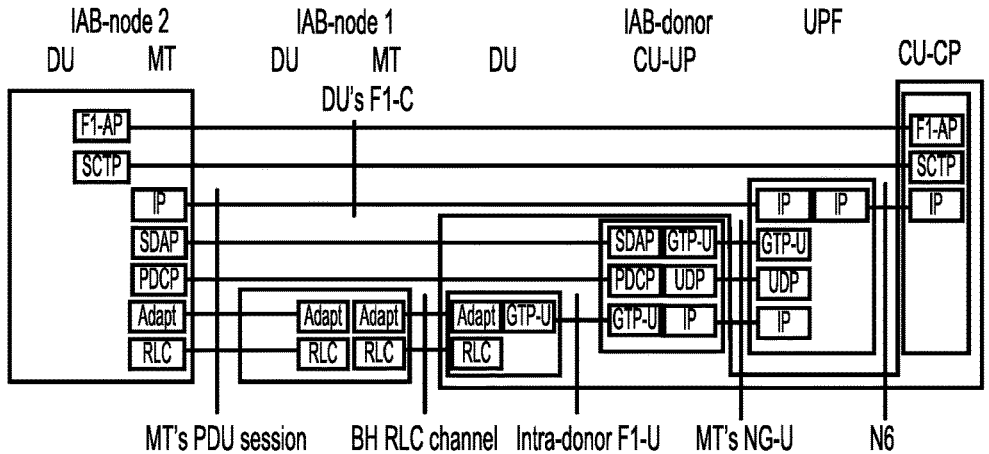

FIGS. 29A-29C shows protocol stacks corresponding to a wireless device's RRC, MT's RRC, and/or DU's F1-AP for an alternative of architecture 1b. An adaptation layer carrying DRB's PDCP may reside on top of RLC. An adaptation layer may or may not be included on an IAB-node's access link. A wireless device's and/or an MT's RRC may be carried over SRB in an example of an alternative of architecture 1b. SRB's PDCP may be carried over native F1-C on a wireless backhaul. DUs on an IAB-node and/or an IAB-donor may use native F1-C stack. An IP-layer of native F1-C stack may be provided by a PDU session over wireless backlinks. A PDU-session may be established between an MT that may be collocated with a DU and/or a UPF. A PDU session may be carried by a DRB between an MT and a CU-UP. A PDU-session may be carried, via NG-U, between CU-UP and UPF. IP transport between UPF and CU-CP may be provided by PDU-session's DN. IP transport may be protected. Protection of F1-C transport across a DN between UPF and CU-CP may be supported.

IAB topologies may comprise a spanning tree (ST) topology and/or a directed acyclic graph (DAG) topology. Directionality of Uu-backhaul link, defined by uplink and downlink, may be aligned with hierarchy of an ST topology and/or a DAG topology. An IAB-node may have one parent node in an ST topology. The parent node may be an IAB-node and/or an IAB-donor. An IAB-node may be connected to one IAB-donor at a time in an ST topology. One route may exist between IAB-node and IAB-donor in an ST topology. An IAB-node may be multi-connected in a DAG topology. An IAB-node in a DAG topology, for example, may have links to multiple parent nodes. An IAB-node in a DAG topology may have multiple routes to a node (e.g., an IAB-donor). An IAB-node in a DAG topology may have redundant routes to a node via multiple parents. Multi-connectivity (e.g. dual-connectivity) and/or route redundancy may be used. Redundant routes may be used concurrently (e.g., to achieve load balancing, reliability, etc).

Figures 30A, 30B, 30C, 30D:
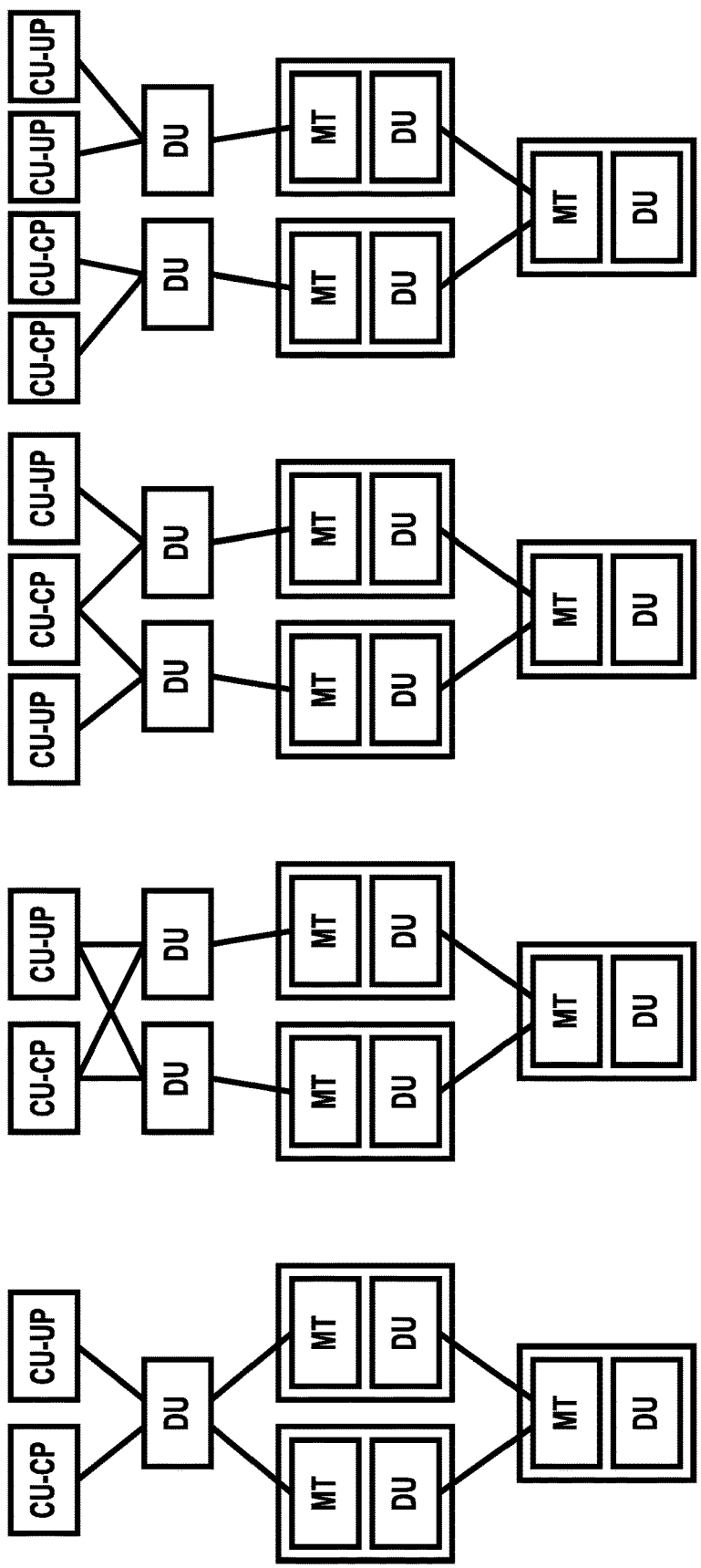
FIGS. 30A-30D show example IAB architectures.

FIGS. 30A-30D show example IAB architectures corresponding to architecture group 1. Routes for an IAB-node, in architecture group 1, may correspond to: a same IAB-donor DU, and a same IAB-donor CU-CP and CU-UP (e.g., as shown in FIG. 30A); different IAB-donor DUs, and a same IAB-donor CU-CP and CU-UP (e.g., as shown in FIG. 30B; different IAB-donor DUs, different IAB-donor CU-UP, and same IAB-donor CU-CP (e.g., as shown in FIG. 30C); different IAB-donor DUs, CU-CP and CU-UP (e.g., as shown in FIG. 30D).

Figure 31B:
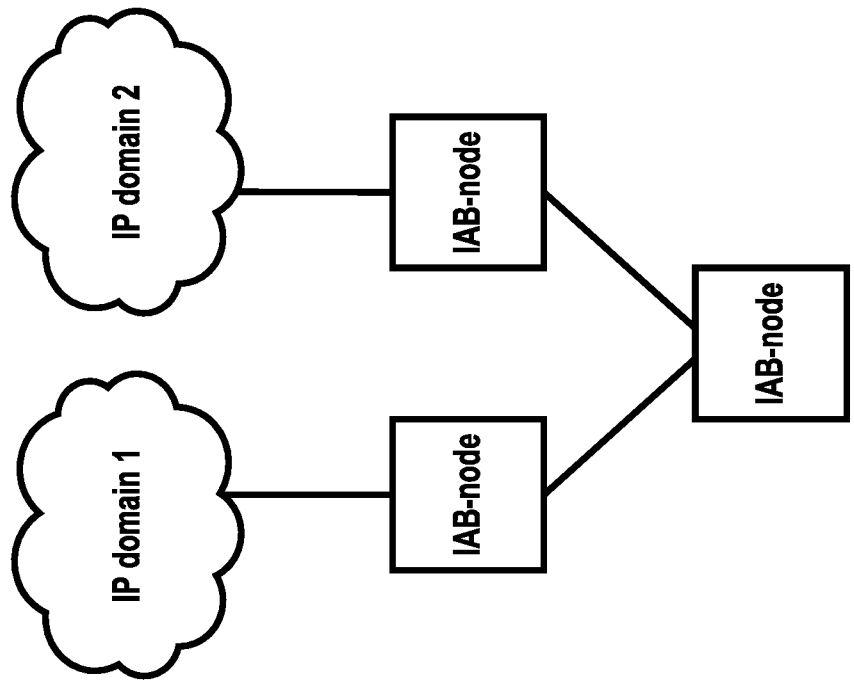
FIGS. 31A and 31B show example IAB architectures.
Figure 31A:
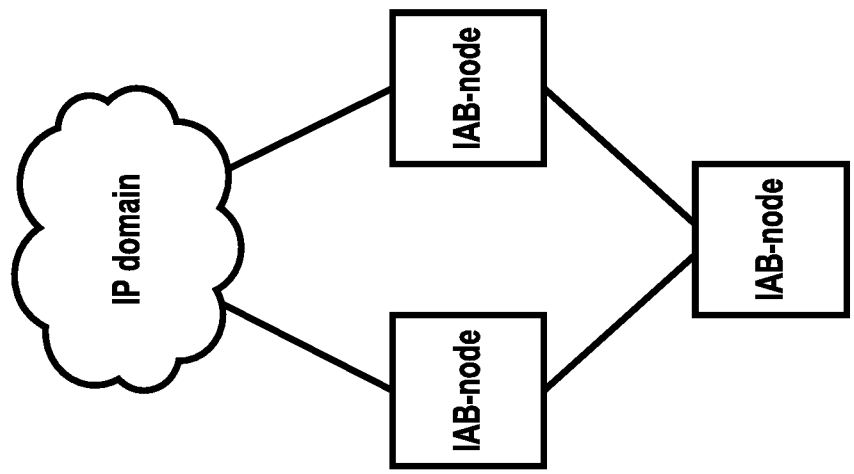

FIGS. 31A and 31B show example IAB architectures corresponding to architecture group 2. Routes for an IAB-node, in architecture group 2, may correspond to a same IP domain and/or different IP domains. IP address management and/or procedures for topology adaptation may be supported for at least some of these topologies.

An IAB-node may authenticate with an operator's network and/or may establish IP connectivity to reach OAM functionality for an OAM configuration. The authentication phase may comprise discovery and/or selection of a serving node. The serving node may be an IAB-donor and/or an IAB-node. An IAB-node may retrieve IAB information, for example, from an OAM entity and/or via RAN signaling such as OSI or RRC. The authentication phase may comprise setting up connectivity to RAN nodes and/or CN. The authentication phase may involve an MT function on an IAB-node.

An IAB-node's DU, gNB, and/or UPF may be set up together with interfaces to RAN-nodes and/or CN. The interface setting-up phase may be performed before an IAB-node starts serving wireless devices and/or before IAB-nodes connect. An interface setting-up phase (e.g., for architectures 1a and 1b) may comprise setup of IAB-node's DU and/or F1-establishment to IAB-donor's CU-CP and/or CU-UP. The interface setting-up phase may comprise (e.g., for architecture 2a) setup of IAB-node's gNB and/or UPF, and/or integration into PDU session forwarding layer across a wireless backhaul. The interface setting-up phase may comprise IAB-node's integration into topology and/or route management.

An IAB-node may provide service to wireless devices and/or to integrated IAB-nodes. Wireless devices may or may not distinguish access to the IAB-node from access to other devices, such as base stations, gNBs, eNBs, RAN, etc.

IAB architectures of IAB-donor DU and/or IAB-donor CU may be based on, for example, CU/DU architectures of a base station such as a gNB (e.g., RAN). Modifications to the IAB-node DU that supports F1*-U over a wireless backhaul may be supported.

Figure 32:
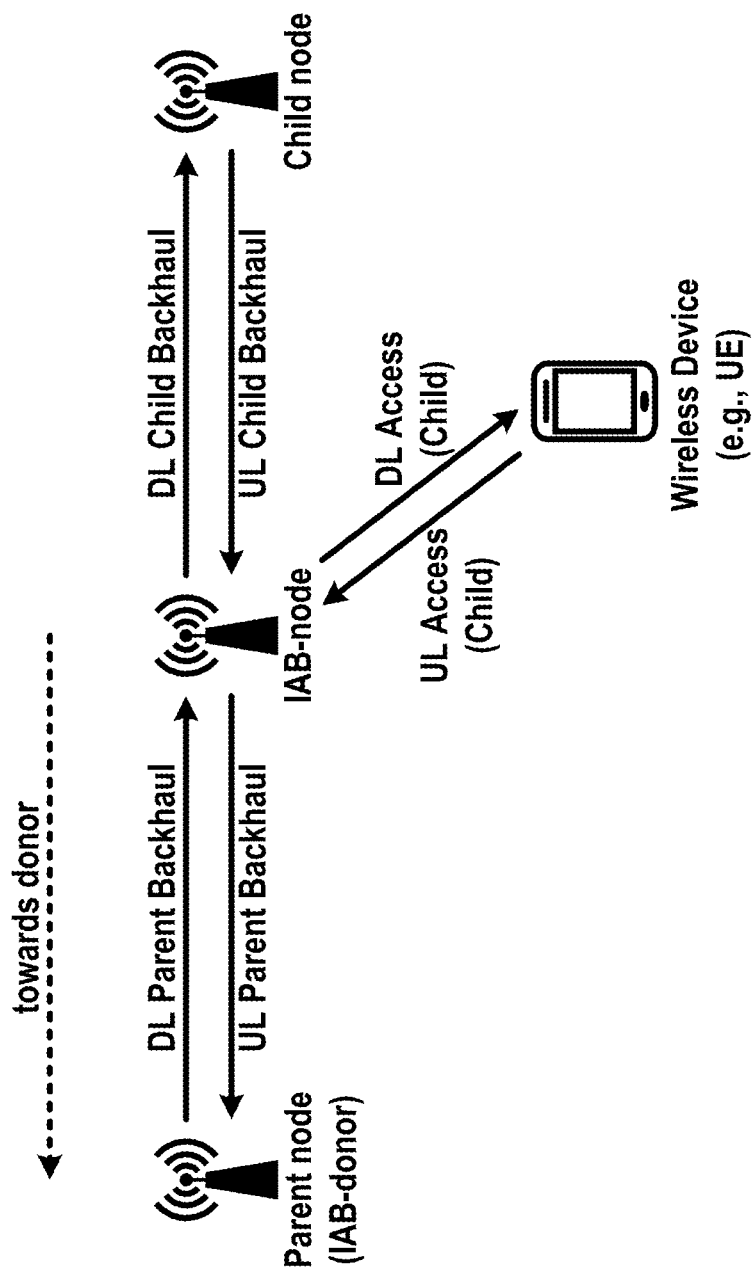
FIG. 32 shows an example IAB configuration.

FIG. 32 shows an example IAB configuration. An IAB-node may be connected to a parent node, child node and/or a wireless device (e.g., UE). An IAB-node may be connected to an IAB-donor (e.g., a parent node of the IAB-node) via a downlink parent backhaul (e.g., an F1 interface, an NG interface, an S1 interface, a Uu interface, an Xn interface, and/or the like) and/or an uplink parent backhaul (e.g., an F1 interface, an NG interface, an S1 interface, a Uu interface, an Xn interface, and/or the like). An IAB-node may be connected to a child node of the IAB-node via a downlink child backhaul (e.g., an F1 interface, an NG interface, an S1 interface, a Uu interface, an Xn interface, and/or the like) and/or an uplink child backhaul (e.g., an F1 interface, an NG interface, an S1 interface, a Uu interface, an Xn interface, and/or the like). An IAB-node may be connected to a wireless device via a downlink access (e.g., Uu interface) and/or an uplink access (e.g., Uu interface).

Figure 33:
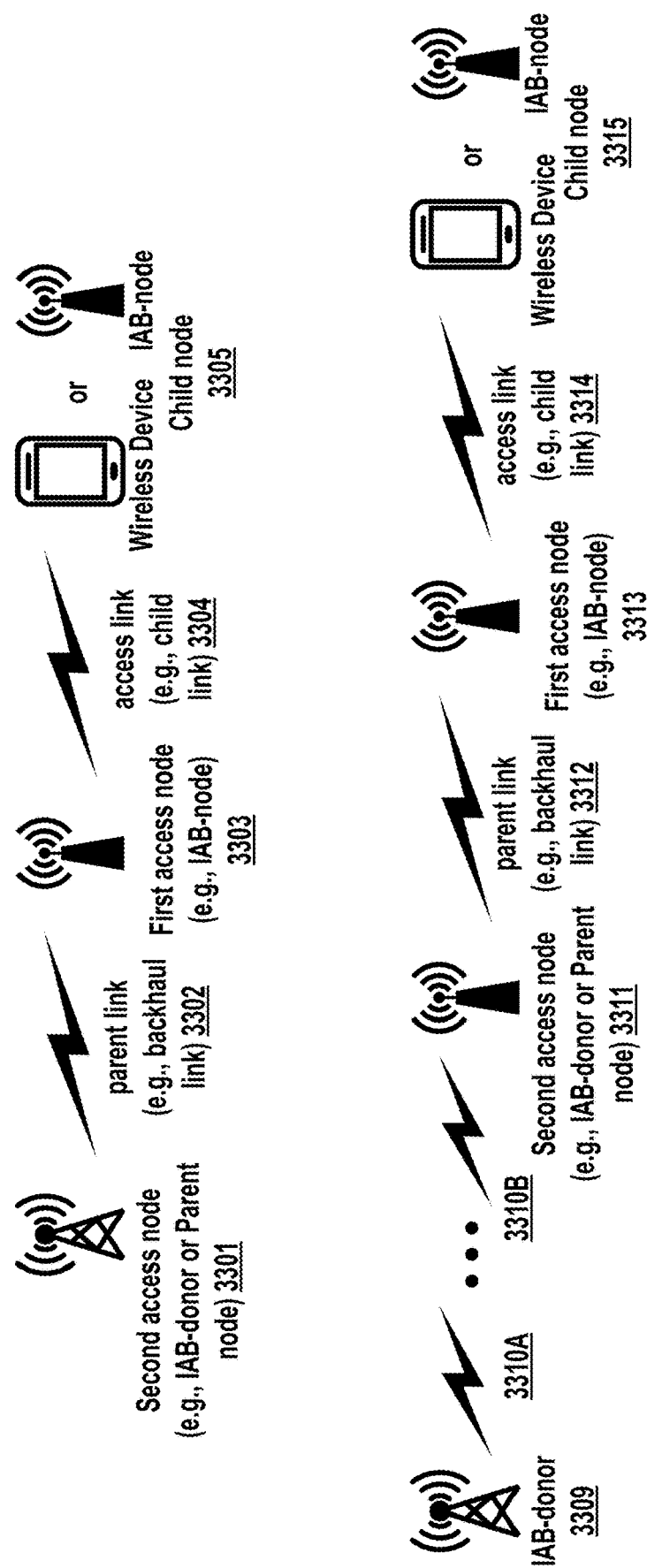
FIG. 33 shows an example IAB configurations.

FIG. 33 shows example IAB configurations. A first access node 3303 or a first access node 3313 may serve a child node 3305 or 3315 of the first access node 3303 or 3313 via an access link 3304 or 3314 (e.g., child link). The access link 3304 or 3314 may comprise one or more serving cells. The one or more serving cells may comprise a first cell. A second access node 3301 or 3311 may serve the first access node 3303 or 3313 via a parent link 3302 or 3312 (e.g., backhaul link).

The parent link 3312 may comprise one or more serving cells. The one or more serving cells may comprise a second cell. The second access node 3311 may serve at least the first access node 3313 and the child node 3315. Serving cells of the second access node 3311 may comprise the first cell and/or the second cell. A third access node 3309 may serve the second access node 3311 (e.g., via one or more access links 3310A-3310B) and the first access node 3313 (e.g., via the parent link 3312), and/or the child node 3315 (e.g., via the access link 3314). Serving cells of the third access node 3309 may comprise the first cell and/or the second cell.

Figure 34:
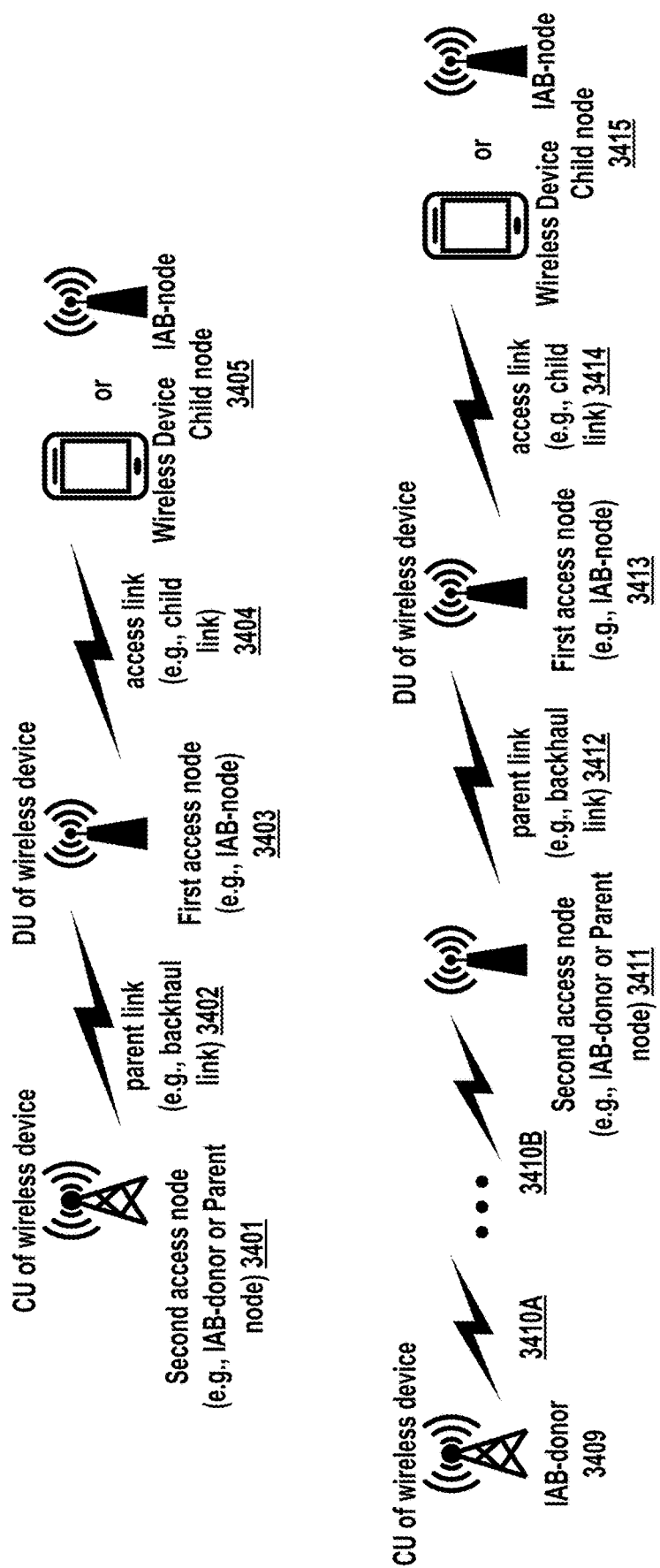
FIG. 34 shows an example IAB configurations.

FIG. 34 shows example IAB configurations. Similar elements 3401-3405 and 3409-3415 may correspond to elements 3301-3305 and 3309-3315, respectively, described above. The first access node 3403 or 3413 may be an IAB-node. The first access node 3403 or 3413 may serve a wireless device 3405 or 3415 via an access link 3404 or 3414. The first access node 3403 or 3414 may be at least one of: a base station distributed unit (e.g., gNB-DU) of the wireless device 3405 or 3415 and/or a mobile termination (MT) served by the second access node 3401 or 3411. The second access node 3401 or 3411 may be a parent node of the first access node 3403 or 3413. The second access node 3401 or 3411 may serve the first access node 3403 or 3413 via a parent link 3402 or 3411. The second access node 3401 or 3411 may be at least one of an IAB-node and/or an IAB-donor. The second access node 3401 or 3411 may be, for example, at least one of a base station central unit (e.g., gNB-CU) of the wireless device 3405 or 3415 and/or a base station distributed unit (e.g., gNB-DU) of the first access node 3404 or 3413 (e.g., MT, wireless device). The wireless device 3405 or 3415 may be a child node of the first access node 3403 or 3413. The wireless device 3403 or 3413 may be at least one of an IAB-node, a UE, and/or an MT. The second access node 3411 may be served by an IAB-donor node 3409 (e.g., a CU of a wireless device) via one or more links 3410A-3410B.

An access node, such as a first access node (e.g., any of the first access nodes described herein) may receive, from a second access node (e.g., any of the second access nodes described herein), RRC configuration parameters, of a second cell, for communication with the second access node. The first access node may receive the RRC configuration parameters from the second access node, for example, via one or more RRC messages. The one or more RRC messages may comprise at least one of an RRC reconfiguration message, an RRC reestablishment message, an RRC setup message, an RRC resume message, at least one SIB, and/or the like. The first access node may transmit, to the second access node, one or more RRC complete messages (e.g., RRC reconfiguration complete message, RRC reestablishment complete message, RRC setup complete message, RRC resume complete message, and/or the like) based on (e.g., after or in response to) receiving the one or more RRC messages. The one or more RRC complete messages may indicate, for example, that the first access node has applied the RRC configuration parameters. The first access node may transmit to and/or receive from the second access node, TBs based on the RRC configuration parameters. The first access node may transmit and/or receive the TBs, for example, via the second cell. The TBs may comprise, for example, at least one of: data packets (e.g., for data radio bearers, DRBs, etc.), control packets (e.g., for signaling radio bearers, SRBs, etc), signaling indications (e.g., for PDCCH, PUCCH, DCI, MAC CE, UCI, physical HARQ indicator channel (PHICH), physical control format indicator channel (PCFICH), physical broadcast channel (PBCH), reference signal, synchronization signal, PRACH, PDSCH, PDSCH, etc.), and/or the like.

The RRC configuration parameters may comprise, for example, at least one of a wireless device indication (e.g., TMSI, C-RNTI, F1 UE identifier, NG UE identifier, IMSI, and/or the like) of the first network node, a cell indication (e.g., physical cell identifier, PCI, global cell identifier, GCI, CGI, and/or the like) of the second cell, cell information (e.g., cell index, cell group configuration, radio link failure timers and constants, RLM in-sync/out-of-sync threshold, reconfiguration with sync comprising t304 value, RACH configuration parameters comprising a preamble index and/or RACH resources, carrier frequency information, bandwidth part configuration parameters, beam configuration parameters of SS beam and/or CSI-RS beam, transmission power configuration parameter comprising p-MAX, p-MgNB, p-SgNB, and/or the like) of the second cell, a cell indication (e.g., physical cell identifier, PCI, global cell identifier, GCI, CGI, and/or the like) of at least one cell, cell information (e.g., cell index, cell group configuration, radio link failure timers and constants, RLM in-sync/out-of-sync threshold, reconfiguration with sync comprising t304 value, RACH configuration parameters comprising a preamble index and/or RACH resources, carrier frequency information, bandwidth part configuration parameters, beam configuration parameters of SS beam and/or CSI-RS beam, transmission power configuration parameter comprising p-MAX, p-MgNB, p-SgNB, and/or the like) of the at least one cell, an indication (e.g., a bearer identifier) of a bearer, a logical channel indication (e.g., identifier, index) of the bearer, a PDU session indication of the bearer, a QoS flow indication of the bearer, an IAB-node indication of the second access node, an IAB-donor indication of the second access node, and/or the like. The RRC configuration parameters of the second cell may comprise, for example, a cell indication (e.g., identifier) of the second cell (and/or the first cell) and/or the cell information of the second cell (and/or the first cell).

The RRC configuration parameters may indicate that a bearer (e.g., a logical channel) corresponds to a priority service (e.g., a URLLC service). The RRC configuration parameters may comprise QoS information of the bearer (e.g., the logical channel). The QoS information of the bearer may indicate that the bearer requires low latency and/or high reliability. The QoS information of the bearer may comprise an indication of a maximum acceptable latency (e.g., 1 ms, or any other value), an indication of a maximum acceptable packet loss rate (e.g., 0.0001%, or any other value), an indication of required data throughput (e.g., 100 Mbps, or any other value), an indication of a priority value (e.g., highest priority, priority 0, or any other value), an indication of a maximum acceptable jitter level, and/or the like.

The one or more RRC messages may comprise, for example, one or more SIBs (e.g., an MIB, SIB type 1, SIB type 2, SIB type 3, etc.). The one or more SIBs may comprise, for example, a cell indication (e.g., identifier) of the second cell, cell information of the second cell, a cell indication (e.g., identifier) of at least one cell, cell information of at least one cell, and/or the like. The at least one cell may comprise one or more secondary cells (e.g., in master cell group and/or secondary cell group) that are served, by the second access node, for the first access node.

The one or more RRC messages may comprise at least one of a transaction indicator (e.g., an rrc-transactionidentifier IE) and a radio resource configuration dedicated IE. The radio resource configuration dedicated IE may comprise, for example, one or more radio resource configuration parameters, measurement configuration parameters, mobility control information parameters, one or more NAS layer parameters, security parameters, antenna information parameters, secondary cell addition and/or modification parameters, secondary cell release parameters, WLAN configuration parameters, WLAN offloading configuration parameters, LTE-WLAN aggregation (LWA) configuration parameters, LTE-WLAN Radio Level Integraton with IPsec Tunnel (LWIP) configuration parameters, RAN Controlled LTE-WLAN Integraton (RCLWI) configuration parameters, sidelink configuration parameters, V2X configuration parameters, uplink transmission power configuration parameters (e.g., p-MAX, p-MeNB, p-SeNB), a power control mode information element, secondary cell group configuration parameters, and/or the like. Parameter p-MAX may be used to limit the wireless device's uplink transmission power on a carrier frequency. Parameter p-MeNB may indicate guaranteed power for MeNB. Parameter p-SeNB may indicate guaranteed power for SeNB.

The one or more RRC complete messages may comprise at least one RRC acknowledge message and/or response message. The one or more RRC complete messages may comprise, for example, at least one of: an uplink RRC message, a relay node reconfiguration complete message, an RRC reconfiguration complete message, an RRC reestablishment complete message, an RRC resume complete message, an RRC setup complete message, and/or the like. The one or more RRC complete messages may indicate, for example, whether one or more elements (e.g., one or more of the RRC configuration parameters of the second cell) of the one or more RRC messages are successfully configured by the first access node. The one or more RRC complete messages may indicate, for example, whether the bearer is successfully established by the first access node.

The first access node may transmit TBs (e.g., packets, uplink packets) to the second access node. The first access node may transmit the TBs, for example, via the second cell and/or via the at least one cell. The first access node may transmit the TBs, for example, based on the RRC configuration parameters and/or one or more elements (e.g., RLC configuration parameters, PDCP configuration parameters, MAC configuration parameters, and/or physical layer configurations received via the one or more RRC messages) of the one or more RRC messages received from the second access node. The first access node may transmit TBs, for example, with a power level corresponding to the p-MAX as indicated in the RRC configuration parameters. The first access node may transmit, for example, based on the RRC configuration parameters, TBs via a bearer to the second access node. The first access node may receive (e.g., via the first cell) data corresponding to the TBs from the wireless device. The second access node may forward and/or transmit data corresponding to the TBs to one or more UPFs and/or to one or more serving gateways.

The first access node may receive TBs (e.g., packets, downlink packets) from the second access node. The first access node may receive the TBs, for example, via the second cell and/or via the at least one cell. The first access node may receive the TBs, for example, based on the RRC configuration parameters and/or one or more elements of the one or more RRC messages (e.g., RLC configuration parameters, PDCP configuration parameters, MAC configuration parameters, and/or physical layer configurations received via the one or more RRC messages, PDSCH configuration parameters, etc.) received from the second access node. The first access node may forward/transmit (e.g., via the first cell) data corresponding to the TBs to the wireless device. The first access node may receive, from the second access node, TBs via the bearer. The first access node may receive the TBs, for example, based on the RRC configuration parameters.

The first access node may receive, from the second access node, configuration parameters indicating first resources of the first cell to be used for communication with the wireless device. The first resources may correspond to resources to be used for a non-priority (e.g., non-URLLC) service. The first access node may use, for example, the first resources for transmitting data corresponding to a non-priority service. The first access node may receive the configuration parameters, for example, via the second cell. The first access node may receive the configuration parameters indicating the first resources, for example, via one or more F1 interface messages (e.g., N2 interface messages, RAN configuration update acknowledge message, AMF configuration update message, NG setup response message, Xn interface message, Xn setup request message, Xn setup response message, NG-RAN node configuration update message, NG-RAN node configuration update acknowledge message). The configuration messages may comprise, for example, at least one of: an F1 setup response message, a gNB-DU configuration update acknowledge message, a gNB-CU configuration update message, a gNB-DU resource coordination request message, a UE context setup request message, a UE context modification request message, and/or a UE context modification confirm message. The first access node may transmit, to the second access node (e.g., after or in response to the one or more F1 interface messages), a response message (e.g., an F1 message). The response message may indicate that the first access node has applied the configuration parameters. The first access node may transmit/receive, to/from the wireless device, TBs based on the configuration parameters.

The configuration parameters for the first resources of the first cell may comprise at least one of a cell indication (e.g., cell identifier, physical cell identifier, cell global identifier) of the first cell, a tracking area code indicator, a registration area indicator (e.g., code, identifier), a RAN area code indicator, a RAN area indicator (e.g., identifier), a public land mobile network (PLMN) indicator (e.g., identifier) of the first cell, network slice information (e.g., NSSAI, S-NSSAI) supported by the first cell, frequency resource information (e.g., frequency and/or bandwidth for uplink and/or downlink) of the first resources, time resource information (e.g., periodicity, resource size, and/or timing offset for uplink and/or downlink) of the first resources, reference signal configuration parameters, synchronization signal configuration parameters, and/or the like.

The configuration parameters may comprise wireless device configuration information (e.g., UE configuration information) corresponding to the wireless device. The wireless device configuration information may comprise, for example, at least one of: a downlink RRC message, and/or one or more elements for a downlink RRC message associated with the wireless device. The wireless device configuration information may be transmitted from the second access node to the first access node, for example, via at least one of a DL RRC message transfer message, an initial UE context setup response message, an initial UE context message, a UE context setup request message, a UE context release command message, a UE context modification request message, a UE context modification confirm message, an F1 message, and/or the like.

The wireless device configuration information may comprise, for example, at least one of: a downlink RRC message; an indication (e.g., identifier) of the wireless device (e.g., gNB-CU UE F1-AP ID, gNB-DU UE F1AP ID, old gNB-DU UE F1 AP ID, IMSI, TMSI, S-TMSI, C-RNTI, and/or the like); an SRB indication (e.g., identifier) associated with the response message; an RRC container (e.g., comprising the response message and/or one or more elements of the response message); CU to DU RRC information; one or more bearer indications (e.g., identifiers) of one or more bearers (e.g., DRBs, SRBs) comprising the bearer (e.g. the logical channel) to setup and/or modify; one or more uplink tunnel endpoint identifiers (e.g., TEID, GTP TEID) for the one or more bearers; one or more release bearer indications (e.g., identifiers) of one or more release bearers (e.g., DRBs, and/or SRBs) to release; cause information of the one or more release bearers; one or more cell indications (e.g., identifiers) of one or more cells (e.g., secondary cells, secondary cell group, an SpCell, a master cell, PUCCH secondary cells, a PUCCH cell, and/or the like) to setup and/or modify; one or more release cell identifiers of one or more release cells (e.g., secondary cells, secondary cell group, a SpCell, a master cell, PUCCH secondary cells, a PUCCH cell, and/or the like) to release; cause information of the one or more release cells; a resource coordination transfer container; and/or the like.

The wireless device configuration information may comprise one or more RRC messages for the wireless device. The wireless device configuration information may comprise, for example, at least one of: a counter check message, a downlink information transfer message, a handover from NR/EUTRA preparation request message, a logged measurement configuration message, an MIB message, an MIB MBMS message, an MBMS counting request, an MBSFN area configuration message, a mobility from NR/EUTRA command message, a paging message, a relay node reconfiguration message, an RRC reconfiguration message, an RRC reestablishment message, an RRC reestablishment reject message, an RRC release message, an RRC resume message, an RRC setup message, a single cell point-to-multipoint (SCPTM) configuration (e.g., bandwidth reduced, BR) message, a security mode command message, an SIB, an SIB type 1, an SIB type 1 MBMS, a wireless device capability inquiry message (e.g., UE capability inquiry message), a wireless device information request message (e.g., UE information request message), and/or an RRC message associated with the wireless device. The distributed unit (e.g., gNB-DU) may transmit and/or forward the response message and/or one or more elements of the response message (e.g., the downlink RRC message) to the wireless device, for example, via a radio interface.

The wireless device configuration information may comprise, for example, at least one of: an rrc-transactionidentifier IE and a radio resource configuration dedicated IE. The radio resource configuration dedicated IE may comprise, for example, one or more radio resource configuration parameters, measurement configuration parameters, mobility control information parameters, one or more NAS layer parameters, security parameters, antenna information parameters, secondary cell addition/modification parameters, secondary cell release parameters, WLAN configuration parameters, WLAN offloading configuration parameters, LWA configuration parameters, LWIP configuration parameters, RCLWI configuration parameters, sidelink configuration parameters, V2X configuration parameters, uplink transmission power configuration parameters (e.g., p-MAX, p-MeNB, p-SeNB), a power control mode information element, secondary cell group configuration parameters, and/or the like.

The first access node may configure one or more elements of the configuration parameters and/or the wireless device configuration information for the first cell and/or the wireless device. The first access node may transmit, for example, based on the configuration parameters and/or the wireless device configuration information, at least one RRC message to the wireless device. The first access node may transmit the at least one RRC message, for example, to configure one or more radio configuration parameters for the wireless device (e.g., physical layer resource configuration parameters, power configuration parameters, cell configuration parameters, and/or RLC/MAC layer configuration parameters associated with resource, power, and/or cell).

The first access node may configure/apply, for example, based on the configuration parameters and/or the wireless device configuration information, one or more parameters corresponding to the wireless device. The one or more parameters corresponding to the wireless device may comprise, for example, at least one of: configuration parameters for an F1 bearer/logical channel, radio resource parameters (e.g., for SDAP parameters, RRC parameters, RLC parameters, MAC parameters, PHY parameters, and/or the like), security parameters, NG interface session parameters (e.g., PDU sessions, QoS flows, network slices, and/or the like), resource scheduling parameters, priority management parameters, service policy related parameters, and/or the like. The first access node and/or the second access node may serve the wireless device, for example, based on the one or more parameters. The first access node and/or the second access node may transmit (e.g., forward) and/or receive packets (e.g., PDCP packets) to/from the wireless device via a radio interface (e.g., the access link, child link) and/or the F1 interface (e.g., the parent link, backhaul link). The first access node and/or the second access node may use, for example, an F1 user plane interface (e.g., configured bearers/logical channels), F1 control plane interface, and/or the like.

The wireless device may receive, from the second access node and via the first access node (e.g., via the access link and/or the parent link), at least one RRC message (e.g., an RRC reconfiguration message). The RRC message comprising cell configuration parameters of the first cell. The wireless device may transmit, to the second access node via the first access node (e.g., via the access link and/or the parent link), at least one RRC complete message (e.g., an RRC reconfiguration complete message). The RRC complete message may indicate that the wireless device has applied the cell configuration parameters of the first cell. The wireless device may transmit and/or receive (e.g., based on the cell configuration parameters), to and/or from the first access node, TBs via the first cell. The TBs may comprise at least one of data packets (e.g., for DRBs, the bearer, the logical channel), control packets (e.g., for SRBs, the bearer, the logical channel), signaling indications (e.g., for PDCCH, PUCCH, DCI, MAC CE, UCI, PHICH, PCFICH, PBCH, reference signal, synchronization signal, PRACH, PDSCH, PDSCH), and/or the like.

The at least one RRC message may comprise at least one of an RRC reconfiguration message, an RRC reestablishment message, an RRC setup message, an RRC resume message, at least one SIB, and/or the like. The at least one RRC complete message may comprise at least one of RRC reconfiguration complete message, RRC reestablishment complete message, RRC setup complete message, RRC resume complete message, and/or the like. The one or more RRC complete messages may indicate application of the cell configuration parameters (e.g., at the wireless device).

The cell configuration parameters may comprise at least one of a indicator (e.g., device identifier, TMSI, C-RNTI, F1 UE identifier, NG UE identifier, IMSI) of the wireless device, a cell indicator (e.g., cell identifier, physical cell identifier, PCI, global cell identifier, GCI, CGI) of the first cell, cell information (e.g., cell index, cell group configuration, radio link failure timers and constants, RLM in-sync/out-of-sync threshold, reconfiguration with sync comprising t304 value, RACH configuration parameters comprising a preamble index and/or RACH resources, carrier frequency information, bandwidth part configuration parameters, beam configuration parameters of SS beam and/or CSI-RS beam, transmission power configuration parameter comprising p-MAX/p-MgNB/p-SgNB, and/or the like) of the first cell, a cell indicator (e.g., cell identifier, physical cell identifier, PCI, global cell identifier, GCI, CGI) of at least one cell, cell information (e.g., cell index, cell group configuration, radio link failure timers and constants, RLM in-sync/out-of-sync threshold, reconfiguration with sync comprising t304 value, RACH configuration parameters comprising a preamble index and/or RACH resources, carrier frequency information, bandwidth part configuration parameters, beam configuration parameters of SS beam and/or CSI-RS beam, transmission power configuration parameter comprising p-MAX/p-MgNB/p-SgNB, and/or the like) of the at least one cell, a bearer indicator (e.g., identifier) of the bearer, a logical channel indicator (e.g., identifier, index) of the bearer, a PDU session indicator (e.g., identifier) of the bearer, a QoS flow indicator (e.g., identifier) of the bearer, an IAB-node indicator (e.g., identifier) of the first access node, an IAB-donor indicator (e.g., identifier) of the second access node, and/or the like. The cell configuration parameters of the first cell may comprise the cell indicator (e.g., identifier) of the first cell (and/or the second cell) and/or the cell information of the first cell (and/or the second cell).

The cell configuration parameters may indicate that the bearer (e.g., the logical channel) is for a priority service (e.g., URLLC) service. The cell configuration parameters may comprise QoS information of the bearer (e.g., the logical channel). The QoS information of the bearer may indicate that the bearer requires low latency and/or high reliability. The QoS information of the bearer may comprise an indication of a maximum acceptable latency (e.g., 1 ms, or any other value), an indication of a maximum acceptable packet loss rate (e.g., 0.0001%, or any other value), an indication of a required data throughput (e.g., 100 Mbps, or any other value), a priority value (e.g., highest priority, priority 0, or any other value), an indication of a maximum acceptable jitter level, and/or the like.

The at least one RRC message may comprise, for example, one or more SIBs (e.g., MIB, SIB type 1, SIB type 2, SIB type 3, etc.). The one or more SIBs may comprise, for example, the cell indicator (e.g., identifier) of the second cell, the cell information of the first cell, the cell indicator (e.g., identifier) of the at least one cell, the cell information of the at least one cell, and/or the like. The at least one cell may comprise, for example, one or more secondary cells (e.g., from a master cell group and/or from a secondary cell group) that are served by the first access node for the wireless device.

The at least one RRC message may comprise, for example, at least one of an rrc-transactionidentifier information element IE, and/or a radio resource configuration dedicated IE. The radio resource configuration dedicated IE may comprise, for example, one or more radio resource configuration parameters, measurement configuration parameters, mobility control information parameters, one or more NAS layer parameters, security parameters, antenna information parameters, secondary cell addition/modification parameters, secondary cell release parameters, WLAN configuration parameters, WLAN offloading configuration parameters, LWA configuration parameters, LWIP configuration parameters, RCLWI configuration parameters, sidelink configuration parameters, V2X configuration parameters, uplink transmission power configuration parameters (e.g., p-MAX, p-MeNB, p-SeNB), a power control mode information element, secondary cell group configuration parameters, and/or the like.

The at least one RRC complete message may comprise, for example, at least one RRC acknowledge/response message. The at least one RRC complete message may comprise, for example, at least one of: an uplink RRC message, a relay node reconfiguration complete message, an RRC reconfiguration complete message, an RRC reestablishment complete message, an RRC resume complete message, an RRC setup complete message, and/or the like. The at least one RRC complete message may indicate, for example, whether one or more elements (e.g., one or more of the cell configuration parameters of the first cell) of the at least one RRC message are successfully configured by the wireless device. The at least one RRC complete message may indicate, for example, whether the bearer is successfully established by the wireless device.

The wireless device may transmit, to the first access node (and/or to the second access node), TBs (e.g., packets, uplink packets). The wireless device may transmit the TBs, for example, via the first cell and/or via the at least one cell. The wireless device may transmit TBs based on, for example, the cell configuration parameters and/or one or more elements of the at least one RRC message received from the second access node via the first access node. The wireless device may transmit the TBs based on, for example, RLC/PDCP/MAC configuration parameters and/or physical layer configurations received via the at least one RRC message. The wireless device may transmit the TBs, for example, with a power level corresponding to the p-MAX indication in the uplink transmission power configuration parameters. The first access node may forward/transmit data, corresponding to the packets, to the second access node. The first access node may forward/transmit data, corresponding to the TBs, to one or more UPFs and/or one or more serving gateways. The first access node may transmit, to the second access node, the data via the bearer (e.g., via the second cell).

The wireless device may receive, from the first access node, TBs (e.g., packets, downlink packets). The wireless device may receive the TBs, for example, via the first cell and/or via the at least one cell. The wireless device may receive the TBs, for example, based on the cell configuration parameters and/or one or more elements of the at least one RRC message received from the second access node via the first access node. The wireless device may receive the TBs, for example, based on RLC configuration parameters, PDCP configuration parameters, MAC configuration parameters, and/or physical layer configurations received via the at least one RRC message received from the second access node via the first access node. The wireless device may receive the TBs, for example, based on PUSCH configuration parameters. The first access node may receive data corresponding to the TBs from the second access node (e.g., via the second cell). The first access node may receive, from the second access node, packets via the bearer (e.g., via the second cell).

Figure 35:
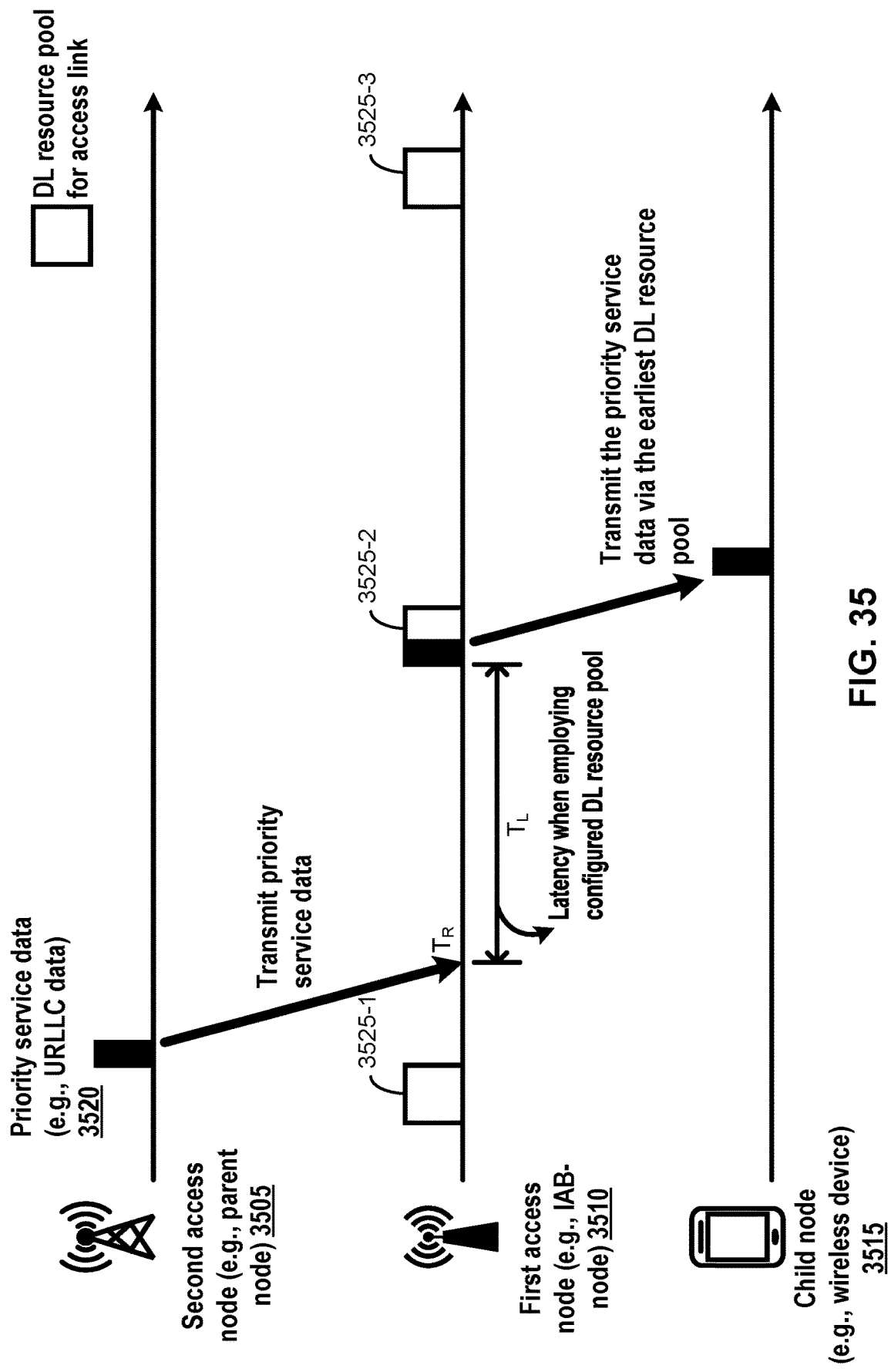
FIG. 35 shows an example timing diagram corresponding to a data transmission mechanism.

FIG. 35 shows an example timing diagram corresponding to a data transmission mechanism. A second access node 3505 may send (e.g., transmit) data 3520 to a first access node 3510. The data 3520 may correspond to a priority service (e.g., URLLC service). The data 3520 may correspond to data for transmission to a child node 3515 (e.g., a wireless device). The first access node 3510 may receive the data 3520 at time $T_R$.

The first access node 3510 may share radio resources with other devices in a communication system using, for example, TDM (e.g., time slot-based resource partitioning). Time slots 3525 (e.g., 3525-2, 3525-2, 3525-3 . . . ) may correspond to time slots assigned to the first access node 3510 for transmission. The first access node 3510 may or may not have radio resources for data transmission depending on a timing of transmission attempt. The first access node 3510 may receive the data 3520, for example, at time $T_R$. The first access node 3510 may have to wait for a next assigned time slot 3525-2, assigned to the wireless device 3510, for example, if the first access node 3510 does not have radio resources for data transmission at time $T_R$. The first access node 3510 may have to wait for a duration corresponding to a latency $T_L$ in order to transmit the data 3520, for example, at the time slot 3525-2. This waiting may result in transmission delays and system inefficiencies for priority services.

Figure 36:
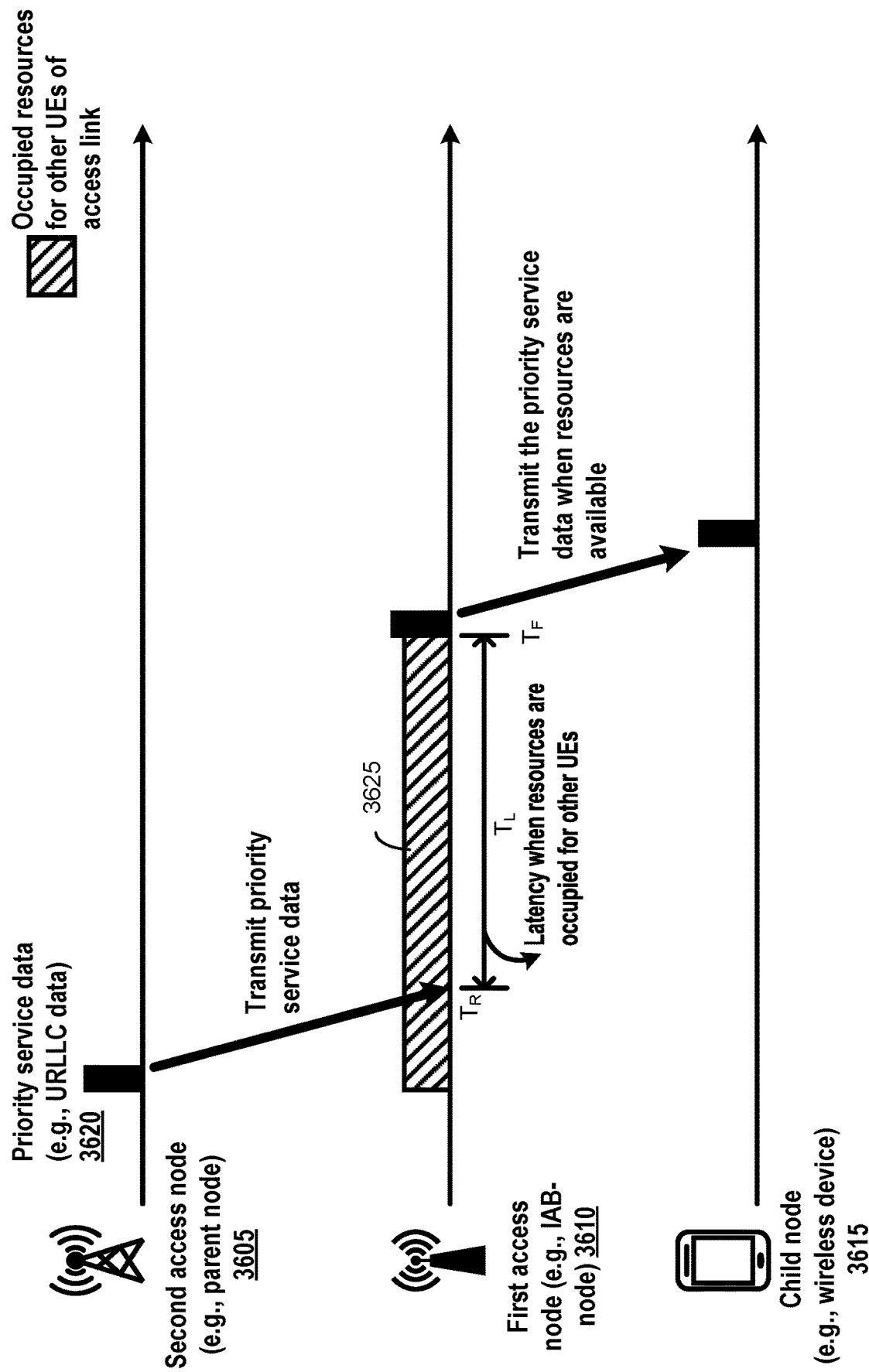
FIG. 36 shows an example timing diagram corresponding to a data transmission mechanism.

FIG. 36 shows an example timing diagram corresponding to a data transmission mechanism. A second access node 3605 may send (e.g., transmit) data 3620 to a first access node 3610. The data 3620 may correspond to a priority service (e.g., URLLC service). The data 3620 may correspond to data for transmission to a child node 3615 (e.g., a wireless device). The first access node 3610 may receive the data 3620 at time $T_R$.

The first access node 3610 may share radio resources with other devices in a communication system using, for example, FDM (e.g., frequency-based resource partitioning) and/or SDM. The first access node 3610 may receive the data 3620, for example, at time $T_R$. The first access node 3610 may not have radio resources for data transmission, for example, if the shared radio resources are employed for higher priority data transmission 3625. The first access node 3610 may have to wait for time $T_L$ for the shared radio resources to be available. The first access node 3610 may transmit the data 3620 at time $T_F$, for example, if radio resources become available for use by the first access node 3610. The latency may result in transmission delays and system inefficiencies for services.

In various examples described herein, a parent node may transmit, to an IAB node, downlink resource information along with data corresponding to the wireless device. The IAB node may use the downlink resource information for transmitting the data to the wireless device. The IAB node may need not wait for an available resource for transmission of the data to the wireless device. The IAB node may not be required transmit a request for resource allocation (e.g., buffer status report and/or a scheduling request) to the parent node.

With reference to FIGS. 33 and 34, the second access node (e.g., 3301, 3311, 3401, 3411) may receive (e.g., from the third access node, the IAB-donor, and/or the UPF) data for the wireless device (e.g., 3305, 3315, 3405, 3415) (and/or for the first access node). The data may be associated with the bearer (e.g., the logical channel) for a priority service (e.g., URLLC service). The second access node (e.g., 3301, 3311, 3401, 3411) may determine that the data corresponds to the priority service, for example, based on determining that the data is associated with the bearer for the priority service. The data may be associated with the bearer (e.g., the logical channel) employing the QoS information. The QoS information of the bearer may indicate that the bearer requires low latency and/or high reliability. The QoS information of the bearer may comprise an indication of a maximum acceptable latency (e.g., 1 ms, or any other value), an indication of a maximum acceptable packet loss rate (e.g., 0.0001%, or any other value), the required data throughput (e.g., 100 Mbps, or any other value), priority value (e.g., highest priority, priority 0, or any other value), an indication of a maximum acceptable jitter level, and/or the like. The data may be for a priority service.

The second access node (e.g., 3301, 3311, 3401, 3411) may allocate (e.g., grant, assign) second resources for the first cell. The second access node (e.g., 3301, 3311, 3401, 3411) may allocate the second resources, for example, based on (e.g., after or in response) to receiving the data and/or based on (e.g., after or in response to) the data being associated with the bearer (e.g., for the priority service, with the QoS information). The second access node (e.g., 3301, 3311, 3401, 3411) may allocate the second resources for the first cell to enable transmission of the data from the first access node (e.g., 3303, 3313, 3403, 3413) to the wireless device (e.g., 3305, 3315, 3405, 3415). The second access node (e.g., 3301, 3311, 3401, 3411) may allocate the second resources for the first cell to enable uplink transmission of uplink data from the wireless device (e.g., 3305, 3315, 3405, 3415) to the first access node (e.g., 3303, 3313, 3403, 3413).

Figure 37:
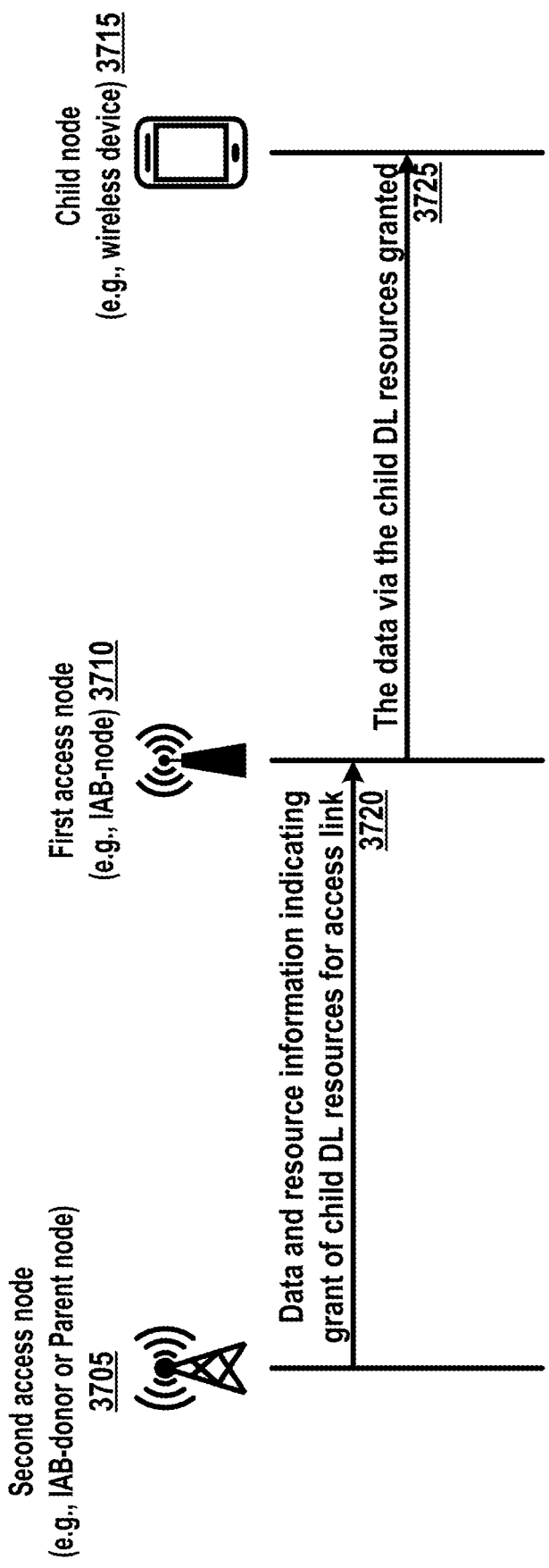
FIG. 37 shows an example transmission mechanism.

FIG. 37 shows an example transmission mechanism. The transmission mechanism may correspond to a communication network comprising a second access node 3705, a first access node 3710, and a child node 3715. The first access node 3710 may receive, from the second access node 3705, data and downlink resource information 3720. The downlink resource information may indicate the second resources for the first cell. The downlink resource information may be indicated via MAC CE and/or PDCCH. The first access node 3710 may receive, from the second access node 3705, the data, for example, via the bearer and/or the logical channel. The first access node 3710 may receive the data, for example, via the second cell (e.g., based on the RRC configuration parameters of the second cell). The second resources may provide resources other than the first resources of the first cell. The first access node 3710 may send (e.g., transmit), to the wireless device, the data via the second resources 3725. The data may be for a priority service (e.g., a URLLC service).

The downlink resource information may comprise, for example, at least one of: an LCID of the logical channel (or of the bearer), an LCG ID of the logical channel (or of the bearer), a bearer identifier of the bearer (or of the logical channel), a number of slots for the second resources, a number of subframes for the second resources, a timing offset (e.g., starting timing, a number of slots/subframes from a system frame such as a first system frame) of the second resources, a periodicity (e.g., occasion periodicity) of the second resources, a number of slots/subframes in one period (e.g., in one occasion period) of the second resources, a number of occasion repetitions (e.g., for periodic resources) of the second resources, frequency information (e.g., frequency domain resource block information) of the second resources, bandwidth information (e.g., frequency domain resource block information) of the second resources, and/or the like.

Figure 38A:
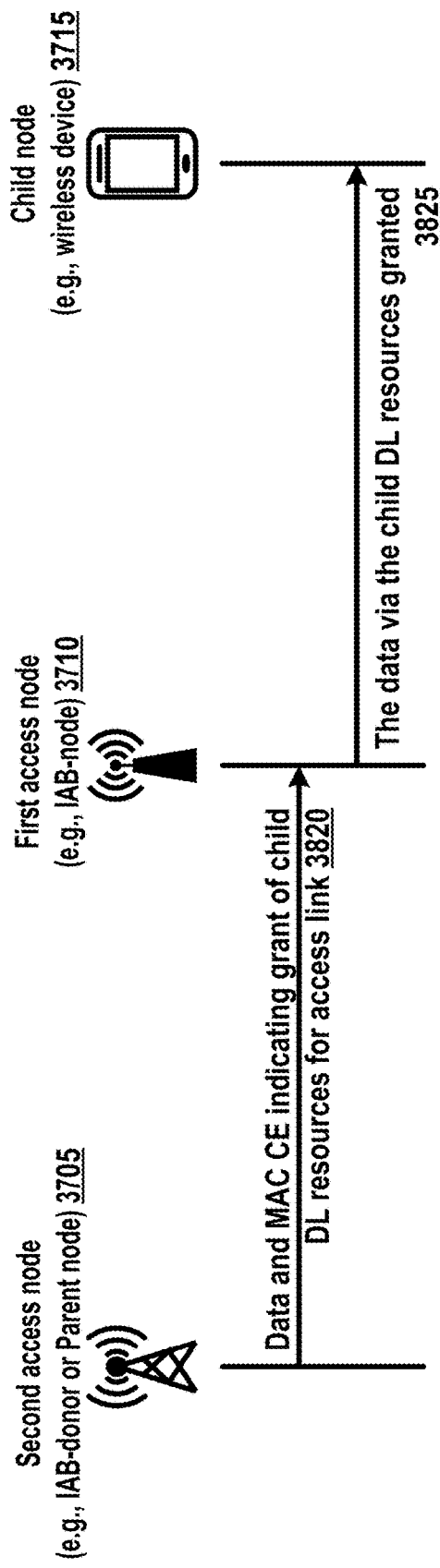
FIGS. 38A and 38B shows example transmission mechanisms.
Figure 38B:
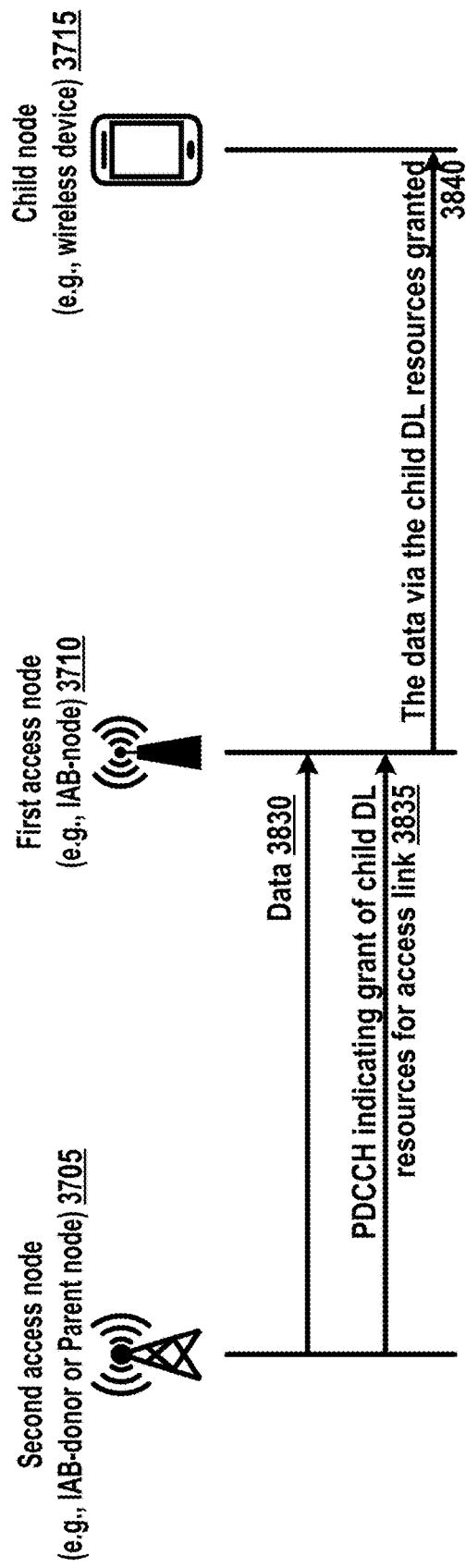

FIGS. 38A and 38B shows example transmission mechanisms. With reference to FIG. 38A, the first access node 3710 (e.g., an IAB-node) may receive, from the second access node 3705 (e.g., a parent node, an IAB-donor), a MAC PDU comprising the data and one or more MAC CEs 3820. The first access node 3710 may receive the downlink resource information via at least one MAC CE in the MAC PDU. The first access node 3710 may send, to the wireless device, the data via child DL resources granted 3825. With reference to FG. 38B, the first access node 3710 (e.g., an IAB-node) may receive data (e.g., via a PDSCH) 3830. The first access node 3710 may receive, from the second access node 3705 (e.g., a parent node, IAB-donor), at least one DCI (e.g., via PDCCH) 3835. The at least one DCI may comprise the downlink resource information. The first access node 3710 may send (e.g., transmit), to the wireless device, the data based on (e.g., via), for example, the second resources corresponding to the downlink resource information 3840.

The at least one DCI may comprise, for the second resources, for example, at least one of: a carrier indicator (e.g., 0 or 3 bits), a DCI format (e.g., 1 bit), a BWP indicator (e.g., 0-2 bits), a frequency domain resource allocation (e.g., for PDSCH of the first cell) (e.g., for type 1, type 0, or dynamic switching), a time domain resource allocation (e.g., 1-4 bits, or more bits), a VRB to PRB mapping indicator (e.g., 0 or 1 bit), a PRB size indicator (e.g., 0 or 1 bit), reserved resources (e.g., 0-2 bits), a zero-power CSI-RS trigger (e.g., 0-2 bits), a modulation and coding scheme (e.g., 5 bits), a new data indicator (e.g., 1 bit), a redundancy version (e.g., 2 bits), a HARQ process number (e.g., 4 bits), a downlink assignment index (DAI, e.g., 0, 2, or 4 bits), a HARQ feedback timing (e.g., 3 bits), a CBG transmission indicator (CBGTI, e.g., 0, 2, 4, 6, or 8 bits), CBG flush information (CBGFI, e.g., 0-1 bit), antenna ports (e.g., 4-6 bits), a transmission configuration indication (TCI, e.g., 0 or 3 bits), an SRS request (e.g., 2 bits), a DM-RS sequence initialization (e.g., 0 or 1 bit), a PUCCH power control (e.g., 2 bits), PUCCH resource indicator (e.g., 3 bits), and/or the like.

The first access node 3710 may receive the downlink resource information, for example, via at least one of: an F1 message, a RRC (RRC) message, a header of at least one SDAP packet, a header of at least PDCP packet, a header of at least one adaptation layer (ADAPT) packet, and/or a header of at least one RLC packet. The second resources may be a subset of radio resources of the second cell.

The configuration parameters (e.g., RRC configuration parameters, wireless device configuration information) corresponding to the second cell and/or the first cell may comprise configuration information for a resource grant of the second access node for data transmission via the first cell. The configuration information may comprise, for example, at least one of a MAC configuration (e.g., MAC-config) and/or a PDCCH configuration (e.g., PDCCH-config). The first access node may receive the downlink resource information, for example, based on the configuration information.

The second access node 3705 may send (e.g., transmit) the downlink resource information, for example, without a request from the first access node 3710 (e.g., for transmission of the data). The first access node 3710 may receive the downlink resource information from the second access node 3705 without transmitting a request, to the second access node 3705, for transmission of the data (e.g., to the wireless device). The request may be, for example, at least one of a buffer status report for data transmission via the first cell and/or a scheduling request for data transmission via the first cell.

Figure 39:
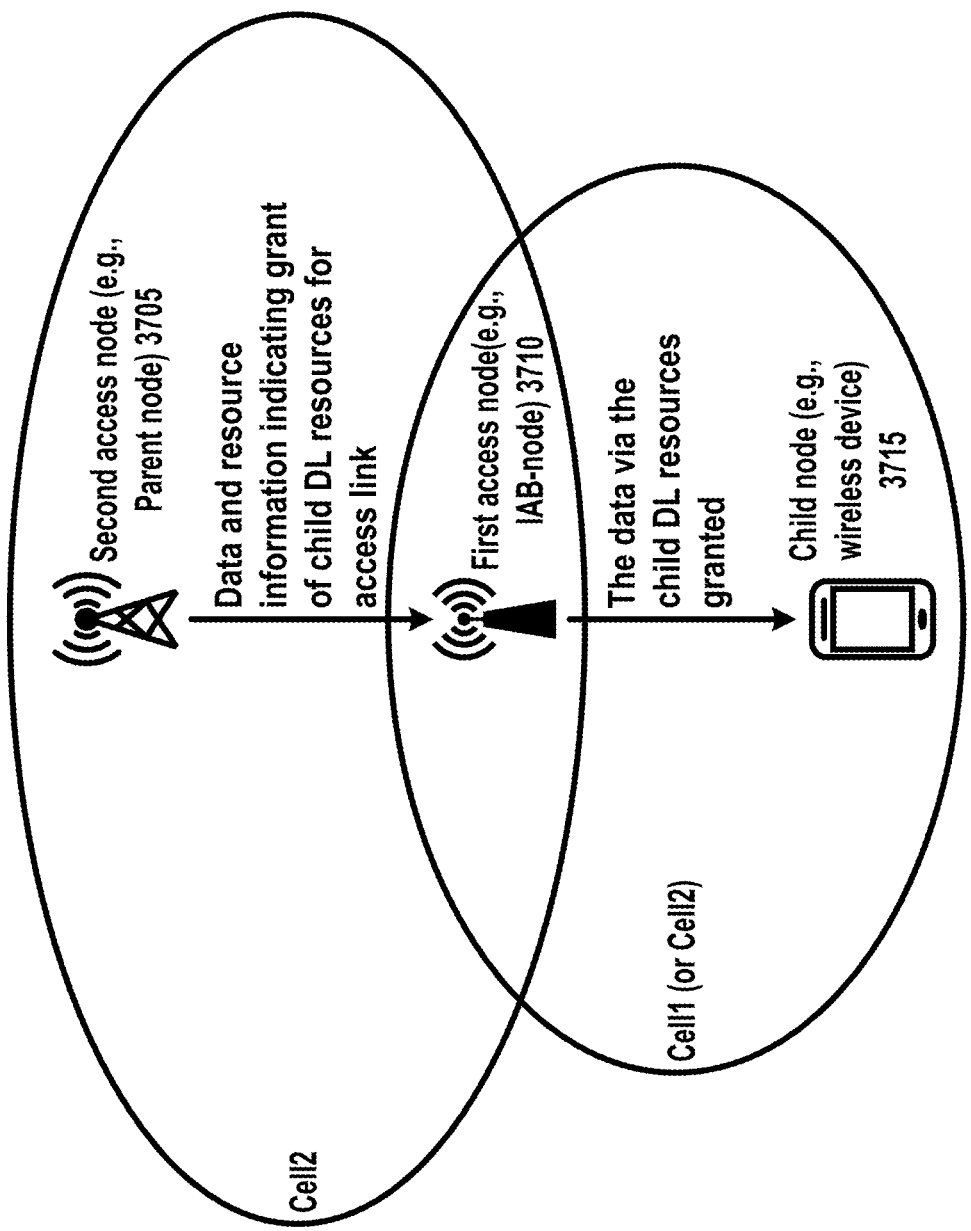
FIG. 39 shows an example transmission mechanism.

FIG. 39 shows an example transmission mechanism. The transmission mechanism may correspond to transmission mechanisms described with reference to FIGS. 37, 38A, and 38B. The second access node 3705 (e.g., a parent node, an IAB-donor), the first access node 3710 (e.g., an IAB-node), and the child node (e.g., a wireless device) 3715 may be in same or different cells. The second access node 3705 and the first access node 3710 may serve cell 1 and cell 2, and the child node may serve the cell 2.

A second access node (e.g. parent IAB-node, base station) may preempt one or more scheduled downlink and/or uplink transmissions to schedule a first wireless device (e.g., UE, IAB-node, first access node) for priority service data (e.g., URLLC data) transmission. Uplink and/or downlink transmission of one or more wireless devices may be impacted by the preemption.

Figure 40:
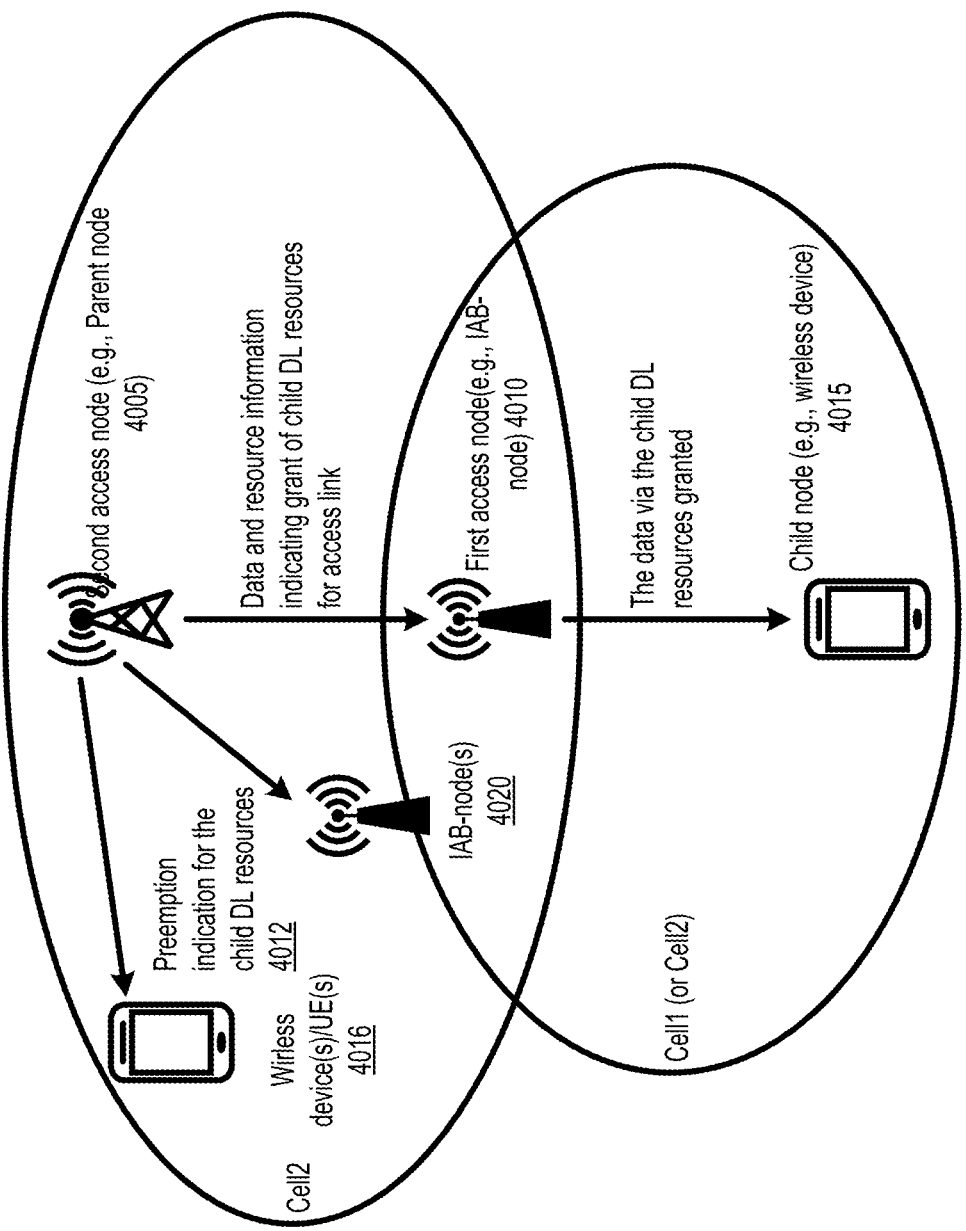
FIG. 40 shows an example transmission mechanism that uses a preemption protocol.

FIG. 40 shows an example transmission mechanism that uses a preemption protocol. A second access node 4005 (e.g., a parent node or an IAB-donor node) may send (e.g., transmit), to one or more preempted device(s) (e.g., serving wireless device(s) 4016, serving IAB-node(s) 4020 served via the second cell by the second access node 4005), a preemption indication 4012 requesting preemption of the second resources. The preemption indication 4012 may correspond to a common DCI. The prempted device(s) may not transmit (e.g., may refrain from transmitting) TB(s) via at least a portion of the second resources, for example, based on receiving the preemption indication 4012. The prempted device(s) may not decode (e.g., may refrain from decoding) any TB(s) that may be received via at least a portion of the second resources, for example, based on receiving the preemption indication 4012. A first access node 4010 (e.g., an IAB-node) may send (e.g., transmit) the data to the wireless device 4015 via the second resources. The first access node 4010 may transmit the data with reduced interference because the preempted devices refrain from transmitting via the second resources.

Figure 41:
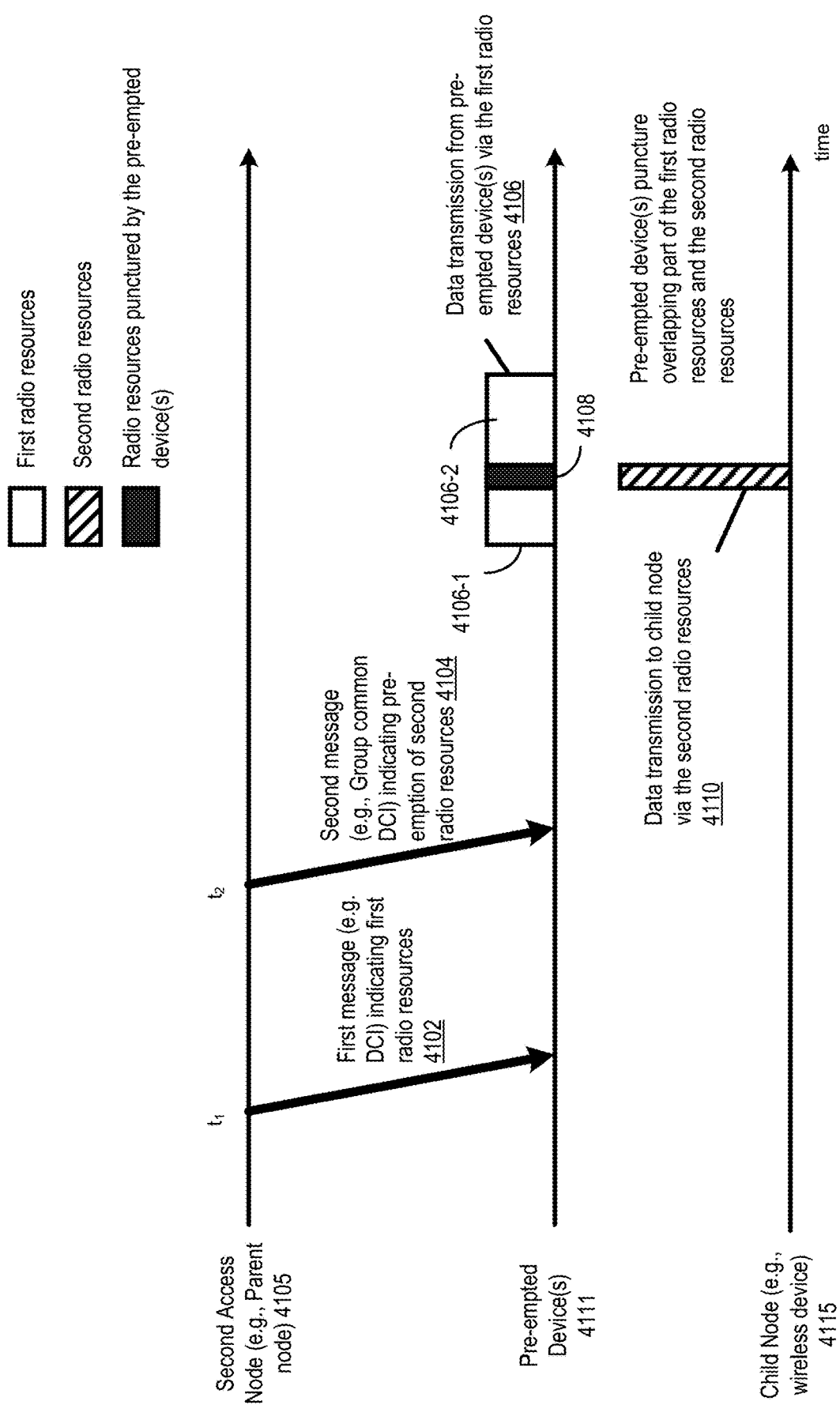
FIG. 41 shows an example transmission mechanism that uses a preemption protocol.

FIG. 41 shows an example transmission mechanism that uses a preemption protocol. A second access node 4105 (e.g., a parent node or an IAB-donor) may send (e.g., transmit) a first message (e.g., DCI) 4102 to the preempted device(s) 4111 (e.g., serving wireless device(s), serving IAB-node(s)), for example at time $t_1$. The first message 4102 may indicate first radio resources corresponding to the preempted device(s). The second access node 4105 may send (e.g., transmit) a second message (e.g., a group common DCI) 4104 to the preempted device(s), for example at time $t_2$. The second message 4104 may be an indication of preemption of second radio resources. The second message 4104 may comprise an indication of second radio resources. The second radio resources may correspond to resources to be used for transmission of data corresponding to a priority service (e.g., URLLC) from a first access node (e.g., an IAB-node) to the child node 4115 (e.g., the data 3825 in FIG. 38A and the data 3840 in FIG. 38B). The second radio resources may overlap at least a portion of the first radio resources, for example, in time, frequency, and/or space. The second access node 4105 may transmit the second message, for example, based on determining that the second radio resources overlap at least a portion of the first radio resources. The second access node 4105 may transmit the second message, for example, based on determining that the second radio resources have been assigned for transmission of data associated with a priority service.

The preempted device(s) 4111 may send (e.g., transmit) data 4106 based on the first radio resources. The preempted device(s) 4111 may transmit the data 4106 to the second access node 4105 and/or to any other communication devices. The preempted device(s) 4111 may transmit a first portion of data 4106-1, for example, based on the first radio resources. The preempted device(s) 4111 may transmit a second portion of data 4106-2, for example, based on the first radio resources. The preempted device(s) 4111 may puncture any transmissions in an overlapping portion 4108 of the first radio resources and the second radio resources. The preempted device(s) 4111 may remove any data that was intended for transmission in the overlapping portion 4108 of the first radio resources and the second radio resources. The preempted device(s) 4111 may postpone transmission of data that was intended for transmission in the overlapping portion 4108 of the first radio resources and the second radio resources. The second access node 4106 may receive data, from the preempted device(s) 4111, over portion(s) of the first radio resources that do not overlap the second radio resources. The second access node 4106 may refrain from decoding and processing any data received over the overlapiing portion 4108. The first access node may transmit data 4110 to the child node, for example, via the second radio resources.

Figure 42:
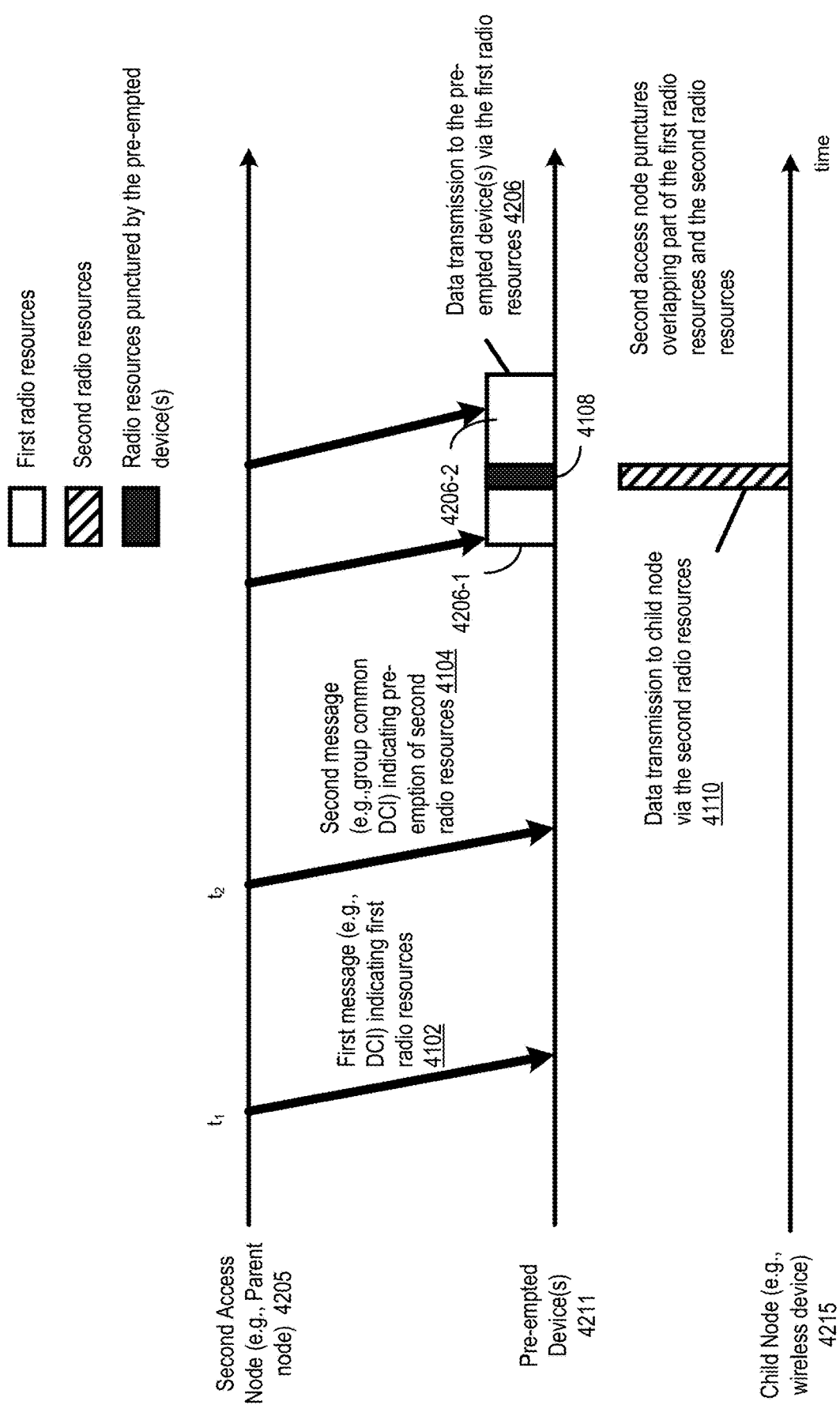
FIG. 42 shows an example transmission mechanism that uses a preemption protocol.

FIG. 42 shows an example transmission mechanism that uses a preemption protocol. The transmission mechanism of FIG. 42 is similar to the transmission mechanism of FIG. 41 except the transmission mechanism of FIG. 42 corresponds to puncturing of transmissions (e.g., from the second access node) addressed to the preempted device(s).

The preempted device(s) 4211 may receive data 4206 based on the first radio resources. The preempted device(s) 4211 may receive data 4206 to the second access node 4205 (e.g., a parent node, an IAB-donor) and/or to any other communication devices. The preempted device(s) 4211 may receive a first portion of data 4206-1, for example, based on the first radio resources. The preempted device(s) 4211 may receive a second portion of data 4206-2, for example, based on the first radio resources. The second access node 4205 may not transmit any data using the second resources. The second access node 4205 may puncture any transmissions to the preempted device(s) in an overlapping portion 4208 of the first radio resources and the second radio resources. The second access node 4205 may remove any data that was intended for transmission in the overlapping portion 4208 of the first radio resources and the second radio resources. The second access node 4205 may postpone transmission of data that was intended for transmission in the overlapping portion 4208 of the first radio resources and the second radio resources. A first access node (e.g., an IAB-node) may send (e.g., transmit) data 4110 to the child node 4215, for example, via the second radio resources.

Puncturing transmission of data, from the second access node 4205, to the preempted device(s) 4211 may prevent errors in reception of data 4206 at the pre-empeted device(s) 4211. The preempted device(s) 4211, for example, may avoid decoding data in the overlapping portion 4208. The preempted device(s) 4211 may only decode the first portion of the data 4206-1 and the second portion of the data 4206-2.

The second access node 4205 need not transmit an indication of preemption of second radio resources (e.g., the second message 4104). The preempted device(s) 4211 may monitor radio resources to detect any data corresponding to priority services (e.g., URLLC services). The preempted device(s) 4211 may, for example, detect transmissions from the second access node that are (i) addressed to the first access node, and (ii) correspond to priority services. With reference to FIGS. 37, 38A, and 38B, for example, the preempted device(s) 4211 may receive the downlink resource information, corresponding to the second radio resources, transmitted from the second access node the first access node 3720. With reference to FIG. 38A, the preempted device(s) 4211 may receive the MAC CE indicating the second resources 3820. With reference to FIG. 38B, the preempted device(s) 4211 may receive DCI indicating the second resources 3825. The preempted device(s) 4211 may puncture any transmissions in an overlapping portion 4108 of the first radio resources and the second radio resources. The preempted device(s) 4211 may avoid decoding any received data in the overlapping portion 4208 of the first radio resources and the second radio resources.

A base station may indicate preempted resources (e.g., the preempted second resources in FIGS. 41 and 42) by transmitting a preemption indication. The preemption indication may be explicitly transmitted before an Ack/Nack (A/N) feedback. The A/N feedback timing may be indicated in the DCI that scheduled transmission to be preempted (e.g., the data 4106 and/or the data 4206). Wireless device(s) (e.g., the wireless device(s)/UE(s) 4016) may be configured to receive a downlink control indication (e.g., signaling, group common DCI) that indicates the preemption indication. The preemption indication may be transmitted, for example, after or in response to the A/N feedback.

Information, corresponding to DL code block group (CBG)-based (re)transmission, that may be configured in a same DCI, may comprise, for example: indication(s) of CBG(s) that is/are (re)transmitted, and/or indications of CBG(s) that is/are handled differently for soft-buffer/HARQ combining. Part/whole of soft-buffer of indicated CBG(s) may be flushed. The flushing behavior may be configurable. Preemption indication may indicate which DL physical resources have been preempted. The preemption indication may be transmitted using a PDCCH and/or group common PDCCH. The preemption indication may not be included in the DCI that may schedule the (re)transmission of the data transmission.

Preempted resource(s) within a certain time/frequency region (e.g., reference downlink resource), and within the periodicity to monitor group common DCI for preemption indication, may be indicated by a group common DCI carrying the preemption indication. The frequency region of the reference downlink resource may be configured semi-statically, for example, using explicit RRC signaling. The frequency region of the reference downlink resource may be implicitly derived, for example, by other RRC signaling. The time region of the reference downlink resource may be configured semi-statically, for example, using explicit RRC signaling. The time region of the reference downlink resource may be implicitly derived, for example, using other RRC signaling. Frequency granularity of preemption indication may be configured to be y RBs within the reference downlink resource for the given numerology. The frequency granularity of the preemption indication may be configured (e.g., using explicit signaling), or may be implicitly derived (e.g., using other RRC signaling). The y RBs may correspond to the whole frequency region of the downlink reference resource. Time granularity of preemption indication may be configured to be x symbols within the reference downlink resource for the given numerology. The time granularity may be configured (e.g., using explicit signaling), or may be implicitly derived (e.g., using other RRC signaling). The time/frequency granularities of preemption indication may be determined, for example, based on the payload size of the group common DCI carrying the preemption indication.

Wireless device(s) (e.g., the wireless device(s)/UE(s) 4016) may be configured to monitor group common PDCCH (e.g., to determine SFI), and monitor the group common DCI (e.g., to determine DL preemption indication) within same or different CORESETs. Time duration of reference downlink resource for preemption indication may be equal to the monitoring periodicity of the group-common DCI carrying the preemption indication. The frequency region of the reference downlink resource may be configured explicitly by RRC, for example, for determination of the frequency region of the reference downlink resource for preemption indication. The frequency region of the reference downlink resource may be implicitly derived by the active DL BWP, for example, for determination of the frequency region of the reference downlink resource for preemption indication.

Minimum periodicity for a wireless device (e.g., IAB-node, first access node, UE, the wireless device(s)/UE(s) 4016) of monitoring group common DCI for DL preemption indication may be one slot or less than one slot. A wireless device may be configured to monitor group common CSS for at least a preemption indication on an SCell. A wireless device may be configured to monitor SFI in group common PDCCH for a Scell at least on the same SCell, or on a different cell.

A wireless device (e.g., UE, IAB-node, first access node) and/or a base station may use CBG-based transmission with single/multi-bit HARQ-ACK feedback. A wireless device and/or a base station may use CBG-based re-transmission for the same TB of a HARQ process. CBG may comprise CBs of a TB regardless of a size of the TB. The wireless device may report single HARQ ACK bits for the TB. CBG may comprise one (or more) CB(s). CBG granularity may be configurable.

A wireless device (e.g., IAB-node, first access node, UE) may be semi-statically configured by RRC signaling to enable CBG-based retransmission. The semi-static/RRC configuration, to enable CBG-based retransmission, may be separate for DL and UL. CBGs may be semi-statically configured according to the configured quantity (e.g., number) of CB Gs, for example, for grouping CB(s) into CBG(s). A quantity (e.g., number) of CBs per CBG may be configured (e.g., RRC configured), for example, for grouping CB(s) into CBG(s). The quantity (e.g., number) of CBG and the size of CBG may be variable according to the TB size.

A quantity (e.g., number) of CBG(s) may be configured and CB(s) may be grouped into CBG(s). The quantity (e.g., number) of CBs in a CBG may change according to transport block size (TBS). With a configured quantity (e.g., number) of CBs per CBG, a quantity of CBGs may change according to TBS. The quantity (e.g., number) of CBGs and/or the quantity (e.g., number) of CBs per CBG may be defined according to TBS.

A quantity (e.g., number) of CBG HARQ ACK bits for a TB may be at least equal to the quantity (e.g., number) of CB Gs, for example, for downlink data transmission with CBG based (re)transmission. The quantity (e.g., number) of CBGs for transmission may be indicated or implied. A wireless device may transmit HARQ ACK bits for CBGs based on an indication (e.g., using RRC, MAC, L1 signaling). A wireless device may implicitly determine whether to transmit HARQ ACK bits for CBGs.

A wireless device may be dynamically informed to report one HARQ-ACK bit for that TB for CBG-based (re)transmission, for example, even if the wireless device the wireless device is configured with CBG-based transmission. Information, corresponding to DL CBG-based (re)transmission, that may be configured in the same DCI: indication(s) of CBG(s) that is/are (re)transmitted, indication(s) of CBG(s) that is/are handled differently for soft-buffer/HARQ combining.

A preemption indication may indicate, for example, wireless device(s) for which DL physical resources have been preempted. The preemption indication may be transmitted using a PDCCH. The preemption indication may not be included in a DCI that schedules the (re)transmission of the data transmission.

An access node (e.g., a first access node or any other access node) may send (e.g., transmit) one or more control messages (e.g., DCIs, PDCCH) (e.g., to and/or for the wireless device) indicating a downlink scheduling for transmission of the data. The access node (e.g., first access node) may transmit one or more DCI, for example, based on receiving the data and/or the downlink resource information from a second access node. The one or more DCIs may be configured based on the downlink resource information received from the second access node. The one or more DCIs may comprise, for example, at least one of: a carrier indicator (e.g., 0 or 3 bits), a DCI format indicator (e.g., 1 bit), a BWP indicator (e.g., 0-2 bits), a frequency domain resource allocation indicator (e.g., for PDSCH of the first cell) (e.g., for type 1, type 0, or dynamic switching), a time domain resource allocation indicator (e.g., 1-4 bits, or more bits), a virtual resource block (VRB) to physical resource block (PRB) mapping indicator (e.g., 0 or 1 bit), a PRB size indicator (e.g., 0 or 1 bit), reserved resources (e.g., 0-2 bits), a zero-power CSI-RS trigger indicator (e.g., 0-2 bits), a modulation and coding scheme indicator (e.g., 5 bits), a new data indicator (e.g., 1 bit), a redundancy version indicator (e.g., 2 bits), a HARQ process number indicator (e.g., 4 bits), a downlink assignment index (DAI, e.g., 0, 2, or 4 bits), a HARQ feedback timing indicator (e.g., 3 bits), a CBG transmission indicator (CBGTI, e.g., 0, 2, 4, 6, or 8 bits), CBG flush information (CBGFI, e.g., 0-1 bit), antenna ports indicator (e.g., 4-6 bits), a transmission configuration indication (TCI, e.g., 0 or 3 bits), an SRS request (e.g., 2 bits), a DM-RS sequence initialization indicator (e.g., 0 or 1 bit), a PUCCH power control indicator (e.g., 2 bits), PUCCH resource indicator (e.g., 3 bits), and/or the like.

The access node (e.g., first access node) may send (e.g., transmit) the data to the wireless device, for example, via the second resources. The second resources may be based on the one or more control messages (e.g., DCIs). The wireless device may receive the data from the first access node via the second resources based on the one or more control messages.

The second resources may be configured/determined (e.g., by the second access node) to occur based on (e.g., after) a reception (e.g., an arrival) of the data at the first access node. The second resources may be determined, for example, to be at a certain time duration from the reception (e.g., start of the reception, completion of the reception, arrival) of the data at the first access node. The second resources may be determined to be, for example, to be within a certain number of time slots (e.g., 0 to n slots, within 3 slots, etc.) from the reception of the data at the first access node. The second resources may be configured to occur based on (e.g., after or in response to) completion of transmission of the data to the first access node. The second resources may be determined to be, for example, to be within a certain number of time slots (e.g., 0 to n slots, within 3 slots, etc.) from the completion of transmission of the data to the first access node.

An access node (e.g., second access node) may receive (e.g., from the first access node) channel status information of a link between the first access node and the wireless device. The access node (e.g., first access node) may receive the channel status information from the wireless device, for example, via one or more CSI reports. An access node (e.g., second access node) may determine the downlink resource information, for example, based on the channel status information of a link between the first access node and the wireless device.

An access node (e.g., second access node) may send (e.g., transmit) the downlink resource information to the first access node based on (e.g., after or in response to) the data being associated with a channel. The channel may be a logical channel that specifies, for example, at least one of: a network slice for a high reliable and low latency service (e.g., a priority service), a latency lower than a time value, a packet loss rate lower than a first value, and/or a packet error rate lower than a second value. The bearer, the logical channel, and/or the data may be, for example, for a priority service (e.g., a URLLC service) network slice.

An access node (e.g., first access node) may receive (e.g., from the second access node) bearer configuration parameters for the logical channel. The bearer configuration parameters may comprise, for example, at least one of: a radio bearer indicator (e.g., identifier); network slice information; quality-of-service information; a notification control indication for quality-of-service monitoring; and/or an uplink configuration parameter. The quality-of-service information may indicate, for example, at least one of: a dynamic quality-of-service, a non-dynamic quality-of-service, an allocation and retention priority, a guaranteed flow bit rate for uplink or downlink, a maximum flow bit rate for uplink or downlink, a maximum packet loss rate for uplink or downlink, reflective quality-of-service attribute information, and/or an uplink session aggregated maximum bit rate. The uplink configuration parameter may indicate whether an uplink scheduling: may not be performed by the first access node, may be performed by both the first access node and a third access node, or may be performed solely by the first access node.

An access node (e.g., second access node) may receive (e.g., from the third access node, an IAB-donor, etc.), an RRC message (or an F1 message) comprising resource configuration parameters. The resource configuration parameters may indicate resources for the second cell. The resource configuration parameters may indicate that the resources are allowed to be allocated for the first cell of the first access node. The third access node may be a donor node (e.g., parent node, CU, etc.) corresponding to the second access node.

Radio resources may be partitioned between the first cell and the second cell, for example, based on at least one a multiplexing mechanism. The radio resources may be partitioned, for example, based on TDM, FDM, and/or SDM (e.g., spatial multiplexing, beam based multiplexing, etc.).

An access node (e.g., first access node) may receive (e.g., from the second access node) second downlink resource information indicating radio resources for transmission via the first cell. The second access node may transmit the second downlink resource information, for example, based on (e.g., after or in response to) a resource request from the first access node. The resource request may correspond to, for example, at least one of a buffer status report and/or a scheduling request. The first access node may transmit the resource request to the second access node, for example, based on (e.g., after or in response to) receiving data, corresponding to the wireless device, in a buffer of the first access node. The first access node may transmit the resource request to the second access node, for example, to receive a resource grant for transmission of the data to the wireless device.

Figure 43:
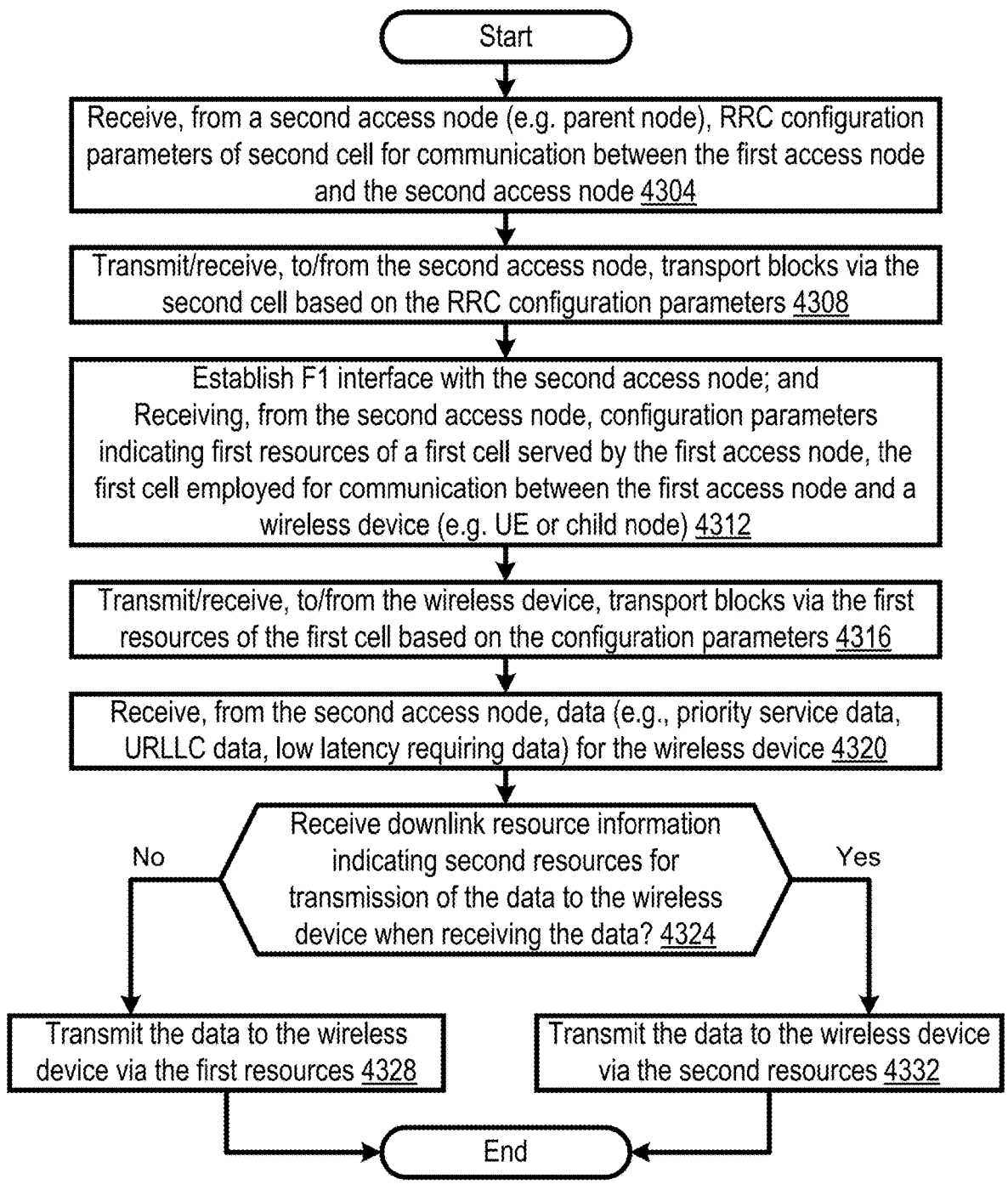
FIG. 43 shows an example method of data transmission.

FIG. 43 shows an example method of data transmission. The example method may be performed by a device such as a first access node (e.g., IAB-node). At step 4304, a first access node may receive, from a second access node, configuration parameters (e.g., RRC configuration parameters) of a second cell. The configuration parameters may correspond to parameters for communication with the second access node. At step 4308, the first access node may send (e.g., transmit) to and/or receive TBs from the second access node. The first access node may transmit and/or receive TBs based on the configuration parameters of the second cell. At step 4312, the first access node may receive, from the second access node and via the second cell, configuration parameters indicating first resources (e.g., corresponding to a first cell) for communication with a wireless device. At step 4316, the first access node may send (e.g., transmit) to and/or receive TBs from the wireless device, for example, based on the first resources. At step 4320, the first access node may receive, from the second access node, data for the wireless device. At step 4324, the first access node may determine whether it has received downlink resource information indicating second resources for transmission of the data to the wireless device when receiving the data. At step 4332, the first access node may send (e.g., transmit) the data to the wireless device, for example, via second resources, for example, if the first access node receives, from the second access node, the data and downlink resource information (e.g., via MAC CE and/or PDCCH) indicating the second resources for the first cell. The second resources may provide additional resources other than the first resources. At step 4328, the first access node may transmit the data to the wireless device, for example, via the first resources, for example, if the first access node does not receive, from the second access node, downlink resource information indicating other resources.

Figure 44:
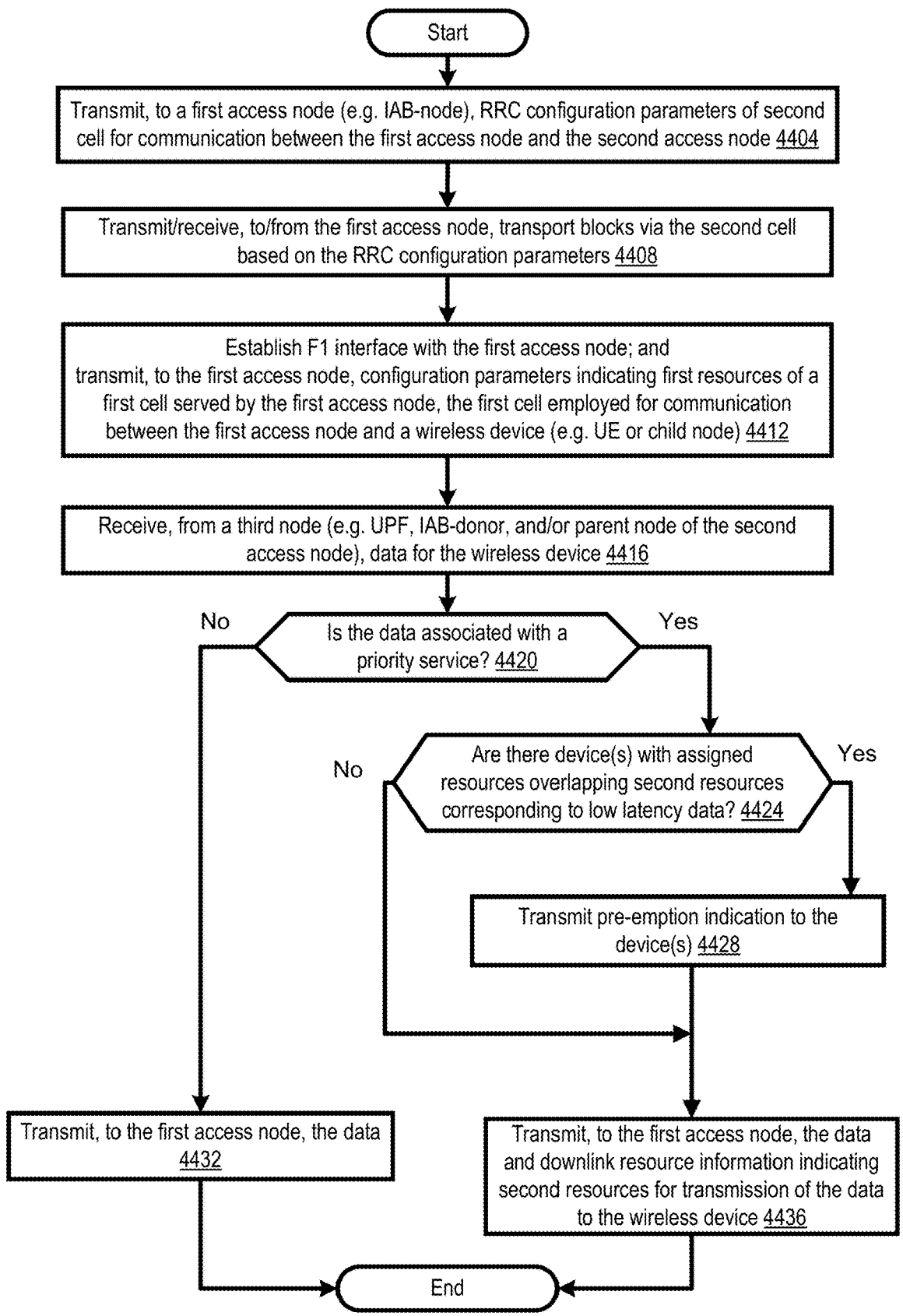
FIG. 44 shows an example method of data transmission.

FIG. 44 shows an example method of data transmission. The example method may be performed by a device such as a second access node (e.g., parent node). At step 4404, the second access node may send (e.g., transmit), to the first access node, configuration parameters (e.g., RRC configuration parameters) of the second cell. The configuration parameters may correspond to parameters for communication with the second access node. At step 4408, the second access node may transmit to and/or receive TBs from the first access node. The second access node may transmit and/or receive the TBs based on the configuration parameters of the second cell. At step 4412, the second access node may transmit, to the first access node, configuration parameters indicating first resources (e.g., corresponding to a first cell) for communication with a wireless device. The second access node may establish an F1 interface with the first access node. The second access node may establish an F1 interface with the first access node, for example, prior to transmitting the configuration parameters to the first access node. The configuration parameters may indicate first resources of a first cell served by the first access node. The first cell may be employed for communication between the first access node and a wireless device (e.g., UE or child node). At step 4416, the second access node may receive (e.g., from a third access node), data corresponding to the wireless device. The third access node may comprise, for example, a UPF, an IAB-donor, and/or a parent node of the second access node. At step 4420, the second access node may determine whether the data is associated with a priority service. At step 4424, the second access node may determine whether there are one or more devices with assigned resources overlapping with second resources corresponding to low latency data (e.g., priority service data, URLLC data). At step 4428, the second access node may transmit preemption indication(s) to one or more device(s), for example, if the data corresponds to a priority service (e.g., URLLC data), and if the device(s) are assigned resources that overlap with the second resources. The second resources may correspond to resources to be used for transmission of the data to the wireless device. The second access node may not transmit (e.g., refrain from transmitting) preemption indication(s) to one or more device(s), for example, if the data corresponds to a priority service, but the device(s) are not assigned resources that overlap with the second resources. At step 4436, the second access node may transmit, to the first access node, the data and downlink resource information, for example, if the data corresponds to the priority service and/or if there are no other devices with assigned resources overlapping with the second resources corresponding to low latency data (e.g., URLLC data). The downlink resource information may indicate, for example, the second resources. At step 4432, the second access node may transmit the data to the first access node (e.g., without transmitting the downlink resource information), for example, if the data does not correspond to the priority service.

An access node (e.g., first access node) may receive the downlink resource information via at least one MAC CE corresponding to packets comprising the data. The access node (e.g., first access node) may receive the downlink resource information via at least one DCI (e.g., via PDCCH). The access node (e.g., first access node) may receive the downlink resource information via at least one of, for example: an F1 message, an RRC message, a header of at least one SDAP packet, a header of at least one PDCP packet, a header of at least one ADAPT packet, and/or a header of at least one RLC packet. The second resources may be a subset of radio resources corresponding to the second cell.

The access node (e.g., first access node) may be an IAB node. The access node (e.g., first access node) may be at least one of a base station distributed unit (e.g., gNB-DU) of the wireless device and/or an MT served by the second access node. The second access node may be a parent node of the first access node. The second access node may be at least one of an integrated access and backhaul (IAB) node and/or an integrated access and backhaul (IAB) donor node. The second access node may be at least one of a base station central unit (e.g., gNB-CU) of the wireless device and/or a base station distributed unit (e.g., gNB-DU) of the first access node (e.g., MT, UE). The wireless device may be a child node of the first access node. The wireless device may be at least one of an IAB node, a UE, and/or an MT.

The access node (e.g., first access node) may receive the downlink resource information, for example, without transmitting a request to the second access node, for example, for transmission of data to the wireless device. The request may comprise at least one of a buffer status report and/or a scheduling request.

The access node (e.g., first access node) may receive RRC configuration parameters from the second access node via an RRC reconfiguration message. The first access node may transmit, to the second access node, an RRC reconfiguration complete message indicating completion of applying the RRC configuration parameters. The first access node may transmit/receive, to/from the second access node, TBs based on the RRC configuration parameters (e.g., via the second cell).

An access node (e.g., second access node) may send (e.g., transmit), to one or more wireless devices, an indication requesting preemption of the second resources. Downlink resource information (e.g., as transmitted by the second access node to the first access node) may comprise at least one of a frequency domain resource assignment and/or a time domain resource assignment. The downlink resource information may comprise mapping information of a VRB and a PRB for the second resources (e.g., for radio resource interleaving). The mapping information may comprise information of an interleaved mapping. The downlink resource information may comprise a BWP of the second resources.

An access node (e.g., first access node) may receive the configuration parameters indicating the first resources via one or more F1 interface messages comprising at least one of: a wireless device context setup request message, a wireless device context modification request message, and/or a wireless device context modification confirm message. The access node (e.g., first access node) may transmit, to the second access node (e.g., in response to the one or more F1 interface messages), a response message indicating completion of applying the configuration parameters. The access node (e.g., first access node) may transmit/receive, to/from the wireless device, TBs based on the configuration parameters.

The wireless device may receive, from the second access node via the first access node, an RRC reconfiguration message comprising cell configuration parameters of the first cell. The wireless device may transmit, to the second access node via the first access node, an RRC reconfiguration complete message indicating a completion of applying the cell configuration parameters. The wireless device may transmit/receive, to/from the first access node, TBs based on the cell configuration parameters via the first cell.

An access node (e.g., second access node) may receive, from the first access node, CSI corresponding to a link between the first access node and the wireless device. The first access node may receive the CSI from the wireless device via one or more CSI reports. The second access node may determine the downlink resource information based on the CSI of a link between the first access node and the wireless device.

Data (e.g., data transmitted from the second access node 3705 to the first access node 3710 in FIGS. 37, 38A, and 38B) may correspond to an ultra-reliable and low-latency service (e.g., a priority service, URLLC data, etc.). The second access node may transmit the downlink resource information to the first access node, for example, if the data is associated with a logical channel that requires at least one of: a network slice for a high reliable and low latency service, a latency lower than a time value, a packet loss rate lower than a first value, and/or a packet error rate lower than a second value. The first access node may receive, from the second access node, for example, bearer configuration parameters for the logical channel. The bearer configuration parameters may comprise at least one of, for example: a radio bearer indicator; a network slice information indicator; quality-of-service information; a notification control indication for quality-of-service monitoring; and/or an uplink configuration parameter. The quality-of-service information may comprise, at least one of, for example: a dynamic quality-of-service indicator, a non-dynamic quality-of-service indicator, an allocation and retention priority indicator, a guaranteed flow bit rate for uplink or downlink indicator, a maximum flow bit rate for uplink or downlink indicator, a maximum packet loss rate for uplink or downlink indicator, reflective quality-of-service attribute information, and/or an uplink session aggregated maximum bit rate indicator. The uplink configuration may indicate, for example, whether an uplink scheduling: may not be performed by the first access node, may be performed by both the first access node and a third access node, or may be performed solely by the first access node.

An access node (e.g., second access node) may receive from a third access node, for example, an RRC message. The RRC message may comprise resource configuration parameters that indicate resources corresponding to the second cell. The resource configuration parameters may indicate that the resources are allowed to be allocated for the first cell corresponding to the first access node. The third access node may be a donor node of the second access node. The third access node may be a parent node of the second access node.

Radio resources may be partitioned between the first cell and the second cell. The radio resources may be partitioned, for example, based on at least one of a TDM, an FDM, and/or an SDM (e.g., spatial multiplexing, beam based multiplexing).

The RRC configuration parameters of the second cell and/or the configuration parameters of the first cell may comprise configuration information corresponding to a resource grant, of the second access node, for transmission via the first cell. The configuration information may comprise at least one of a MAC configuration (e.g., MAC-config) and/or a PDCCH configuration (e.g., PDCCH-config). The first access node may receive the downlink resource information, for example, based on the configuration information.

An access node (e.g., first access node) may receive, from the second access node and based on a resource request from the first access node, second downlink resource information. The second downlink resource information may indicate radio resources for transmission via the first cell. The resource request may be at least one of a buffer status report and/or a scheduling request.

An access node (e.g., first access node) may receive, from a second access node, RRC configuration parameters for a second cell corresponding to the second access node. The first access node may receive, from the second access node (e.g., via the second cell), configuration parameters. The configuration parameters may indicate first resources for a first cell of the first access node. The first access node may receive, from the second access node, at least one packet for the wireless device. The at least one packet may comprise a MAC CE. The MAC CE may comprise downlink scheduling information indicating second resources. The second resources may be different from the first resources. The second resources may be for transmission via the first cell. The downlink scheduling information may comprise a frequency domain resource assignment and/or a time domain resource assignment. The at least one packet may comprise data for the wireless device. The first access node may transmit, to the wireless device, the data via the second resources.

An access node (e.g., first access node) may receive, from a second access node, RRC configuration parameters for a second cell of the second access node. The first access node may receive, from the second access node (e.g., via the second cell), configuration parameters indicating first resources for a first cell of the first access node. The first access node may transmit, to a wireless device, TBs via the first resources. The first access node may receive, from the second access node, at least one packet for the wireless device. The at least one packet may comprise a MAC CE. The MAC CE may comprise downlink scheduling information indicating second resources. The second resources may be different from the first resources. The second resources may be for transmission via the first cell. The downlink scheduling information may comprise at least one of a frequency domain resource assignment and/or a time domain resource assignment. The at least one packet may data for the wireless device. The first access node may transmit, to the wireless device, the data via the second resources.

An access node (e.g., first access node) may receive, from a second access node, RRC configuration parameters for a second cell of the second access node. The first access node may receive, from the second access node (e.g., via the second cell), configuration parameters. The configuration parameters may indicate first resources for a first cell of the first access node. The first access node may receive, from the second access node, data for the wireless device. The first access node may receive, from the second access node, a configuration indication. The configuration indication may comprise downlink scheduling information of second resources for the data. The first access node may receive the configuration indication, for example, without transmitting a buffer status report corresponding to the first access node. The downlink scheduling information may comprise at least one of a frequency domain resource assignment and/or a time domain resource assignment. The first access node may transmit, to the wireless device, the data via the second resources. The second resources may be different from the first resources.

An access node (e.g., first access node) may receive, from a second access node, configuration parameters. The configuration parameters may indicate first resources for a first cell of the first access node. The first access node may transmit, to a wireless device, TBs via the first resources. The first access node may receive, from the second access node, at least one packet for the wireless device. The at least one packet may comprise a MAC CE. The MAC CE may comprise downlink scheduling information. The downlink scheduling information may indicate second resources. The second resources may be different from the first resources. The downlink scheduling information may comprise at least one of a frequency domain resource assignment corresponding to the second resources and/or a time domain resource assignment corresponding to the second resources. The at least one packet may comprise data for the wireless device. The first access node may transmit, to the wireless device, the data via the second resources.

An access node (e.g., second access node) may perform a method comprising multiple operations. The second access node may send, to a first access node, one or more parameters indicating first resources of the first access node. The second access node may receive data for a first wireless device. The data may be associated with the priority service. The second access node may send, to the first access node and at least based on the first data being associated with the priority service: the data, and downlink resource information indicating the second resources for transmission of the data to the wireless device, wherein the second resources are different from the first resources.

An access node (e.g., second access node) may perform one or more additional operations or include additional elements in conjunction with the described method. The downlink resource information may comprise at least one of: a medium access control control element associated with the data, or downlink control information. The sending the downlink resource information may not be responsive to a request from the first access node for the downlink resource information. The second access node may determine that the data is for the priority service, based on the data being associated with a logical channel that requires at least one of: a network slice for a high reliable and low latency service; a latency lower than a time value; a packet loss rate lower than a first value; or a packet error rate lower than a second value. The second access node may send, to a second wireless device, a preemption indication, wherein the preemption indication comprises an indication of the second resources. The second access node may send the preemption indication based on determining that the second resources overlap at least a portion of third resources, wherein the third resources are associated with the second wireless device.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the data to the first wireless device. A computer-readable medium may store instructions that, when executed, cause performance of the described method, additional operations and/or include the additional elements.

An access node (e.g., first access node) may perform a method comprising multiple operations. A first access node may receive, from a second access node, radio resource control configuration parameters for communication with the second access node. The first access node may receive, from a second access node, configuration parameters indicating first resources for communication with a wireless device. The first access node may receive, from a second access node, data for the wireless device. The first access node may send, to the wireless device, the data. The first wireless may send the data via the first resources, if the data is received without downlink resource information, the transmitting is via the first resources. The first wireless may send the data via second resources that are different from the first resources, if the data is received with downlink resource information, indicating second resources.

An access node (e.g., second access node) may perform one or more additional operations or include additional elements in conjunction with the described method. The downlink resource information may comprise at least one of: a medium access control control element associated with the data, or downlink control information. The second access node may be a parent node of the first access node, and the wireless device may be a child node of the first access node. The downlink resource information may comprise at least one of: a frequency domain resource assignment; or a time domain resource assignment. The receiving the radio resource control configuration parameters may comprise receiving the radio resource control configuration parameters in a radio resource control reconfiguration message. The second access node may transmit, to the second access node, a radio resource control reconfiguration complete message indicating completion of applying the radio resource control configuration parameters. The second access node may receive, from the second access node and based on the radio resource control configuration parameters, at least one message. The first access node may be associated with a first cell and the second access node may be associated with a second cell. The radio resources may be partitioned between the first cell and the second cell based on at least one of: a time division multiplexing; a frequency division multiplexing; or a space division multiplexing.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the radio resource control configuration and the configuration parameters indicating first resources for communication with the wireless device. A computer-readable medium may store instructions that, when executed, cause performance of the described method, additional operations and/or include the additional elements.

An access node (e.g., second access node) may perform a method comprising multiple operations. A second access node may receive first data for a first wireless device. The first data may be associated with a priority service. The second access node may transmit, to the first access node: the data, and downlink resource information indicating the first resources for transmission of the data to the wireless device. The second access node may transmit, to a second wireless device, a first message, wherein the first message may indicate second resources assigned to the second wireless device. The second access node may transmit, to a second wireless device, a second message, wherein the second message may comprise an indication of preemption of a first portion of the second resources that overlaps the first resources. The second access node may receive, from the second wireless device, second data in a second portion of the second radio resources that does not overlap the first resources.

An access node (e.g., second access node) may also perform one or more additional operations or include additional elements in conjunction with the described method. The first message may comprise downlink control information, and the second message may comprise group common downlink control information. The transmitting the second message may be based on determining that the second resources overlap at least a portion of the first resources. The second resources may overlap at least a portion of the first resources in at least one of time, frequency, or space. The second access node may transmit, to the second wireless device, third data in the second portion of the second radio resources that does not overlap the first resources. The second access node may drop fourth data scheduled for transmission in the first portion of second first resources that overlaps the first resources. The second access node may delay transmission of fourth data scheduled for transmission in the first portion of the second resources that overlaps the first resources.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to receive the first message and the second message. A computer-readable medium may store instructions that, when executed, cause performance of the described method, additional operations and/or include the additional elements.

An access node (e.g., second access node) may perform a method comprising multiple operations. A second access node may send, to a first access node, one or more parameters indicating first resources for a first cell of the first access node. The second access node may receive data for a wireless device. The second access node may determine, based on a traffic type of the data, to assign second resources, for the first cell, in addition to the first resources. The second access node may send, to the first access node: the data, and downlink resource information indicating the second resources for transmission of the data by the first access node.

An access node (e.g., first access node) may perform a method comprising multiple operations. The first access node may receive, from a second access node, radio resource control configuration parameters of a second cell for communication with the second access node. The first access node may receive, from the second access node via the second cell, configuration parameters indicating first resources of a first cell for communication with a wireless device. The first access node may receive, from the second access node: data for the wireless device, and downlink resource information indicating second resources for the first cell. The second resources may be resources other than the first resources. The first access node may transmit, to the wireless device, the data via the second resources.

An access node (e.g., first access node) may perform a method comprising multiple operations. The first access node may receive, from a second access node, radio resource control configuration parameters for a second cell of the second access node. The first access node may receive, from the second access node via the second cell, configuration parameters indicating first resources for a first cell of the first access node. The first access node may receive, from the second access node, data for the wireless device. The first access node may receive, from the second access node and without a buffer status report of the first access node, a configuration indication comprising downlink scheduling information of second resources for the data. The downlink scheduling information may comprise: a frequency domain resource assignment; and a time domain resource assignment. The second resources may be resources other than the first resources. The first access node may transmit, to the wireless device, the data via the second resources.

An access node (e.g., first access node) may perform a method comprising multiple operations. The first access node may receive, from a second access node, radio resource control configuration parameters for a second cell of the second access node. The first access node may receive, from the second access node via the second cell, configuration parameters indicating first resources for a first cell of the first access node. The first access node may transmit, to a wireless device, transport blocks via the first resources. The first access node may receive, from the second access node, at least one packet for the wireless device. The at least one packet may comprise a medium access control control element comprising downlink scheduling information indicating second resources other than the first resources for transmission via the first cell. The downlink scheduling information may comprise a frequency domain resource assignment; and a time domain resource assignment. The at least one packet may comprise data for the wireless device. The first access node may transmit, to the wireless device, the data via the second resources.

An access node (e.g., first access node) may perform a method comprising multiple operations. The first access node may receive, from a second access node, radio resource control configuration parameters for a second cell of the second access node. The first access node may receive, from the second access node via the second cell, configuration parameters indicating first resources for a first cell of the first access node. The first access node may receive, from the second access node, at least one packet for the wireless device. The at least one packet may comprise a medium access control control element comprising downlink scheduling information indicating second resources other than the first resources. The downlink scheduling information may comprise a frequency domain resource assignment; and a time domain resource assignment. The at least one packet may comprise data for the wireless device. The first access node may transmit, to the wireless device, the data via the second resources.

An access node (e.g., first access node) may perform a method comprising multiple operations. The first access node may receive, from a second access node, configuration parameters indicating first resources for a first cell of the first access node. The first access node may transmit, to a wireless device, transport blocks via the first resources. The first access node may receive, from the second access node, at least one packet for the wireless device. The at least one packet may comprise a medium access control control element comprising downlink scheduling information indicating second resources other than the first resources. The downlink scheduling information may comprise a frequency domain resource assignment; and a time domain resource assignment. The at least one packet may comprise data for the wireless device. The first access node may transmit, to the wireless device, the data via the second resources.

Figure 45:
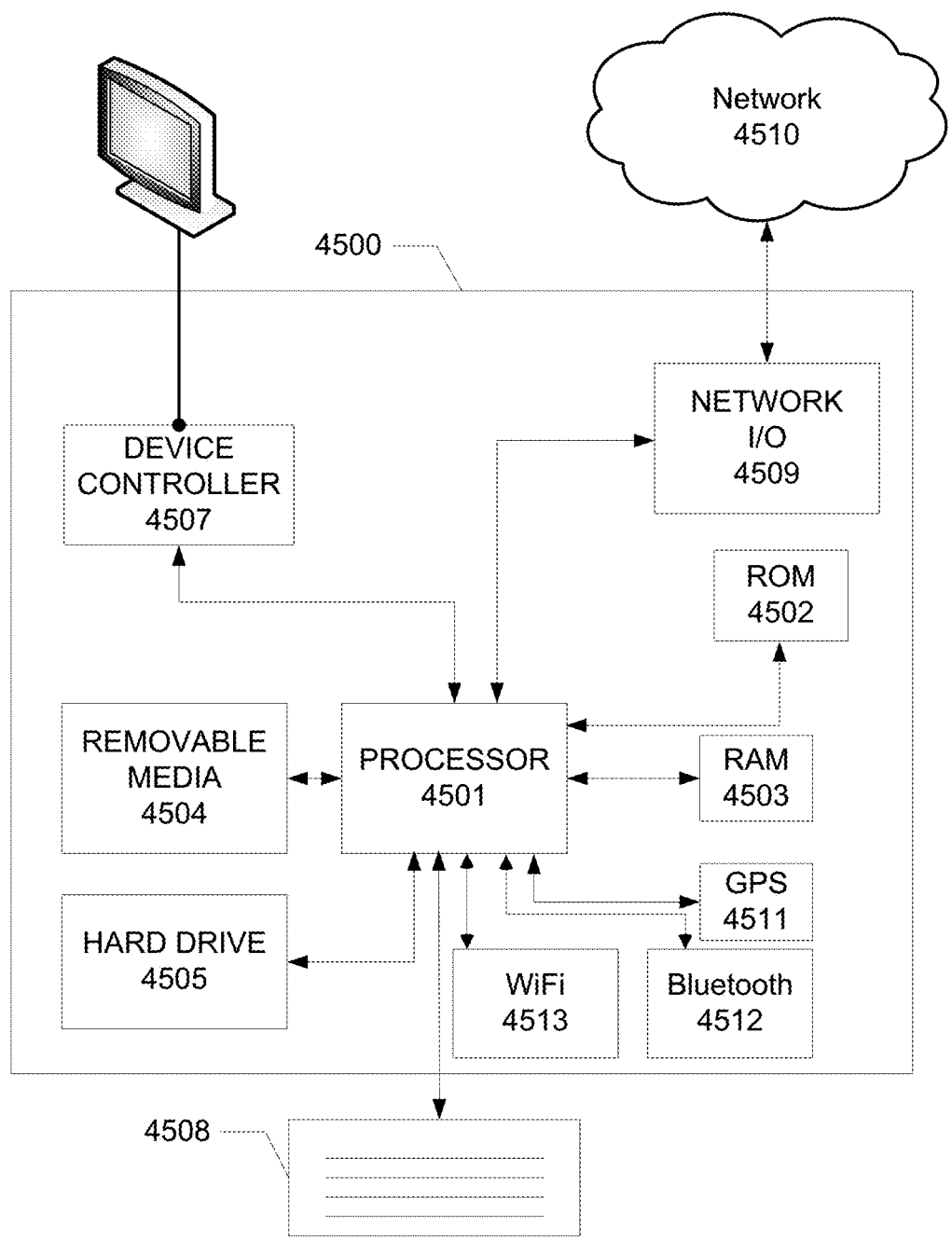
FIG. 45 shows example elements of a computing device that may be used to implement any of the various devices described herein.

FIG. 45 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 4500 may include one or more processors 4501, which may execute instructions stored in the random-access memory (RAM) 4103, the removable media 4504 (such as a Universal Serial Bus (USB) drive, compact disk (CD) or digital versatile disk (DVD), or floppy disk drive), or any other desired storage medium. Instructions may also be stored in an attached (or internal) hard drive 4505. The computing device 4500 may also include a security processor (not shown), which may execute instructions of one or more computer programs to monitor the processes executing on the processor 4501 and any process that requests access to any hardware and/or software components of the computing device 4500 (e.g., ROM 4502, RAM 4503, the removable media 4504, the hard drive 4505, the device controller 4507, a network interface 4509, a GPS 4511, a Bluetooth interface 4512, a WiFi interface 4513, etc.). The computing device 4500 may include one or more output devices, such as the display 4506 (e.g., a screen, a display device, a monitor, a television, etc.), and may include one or more output device controllers 4507, such as a video processor. There may also be one or more user input devices 4508, such as a remote control, keyboard, mouse, touch screen, microphone, etc. The computing device 4500 may also include one or more network interfaces, such as a network interface 4509, which may be a wired interface, a wireless interface, or a combination of the two. The network interface 4509 may provide an interface for the computing device 4500 to communicate with a network 4510 (e.g., a RAN, or any other network). The network interface 4509 may include a modem (e.g., a cable modem), and the external network 4510 may include communication links, an external network, an in-home network, a provider's wireless, coaxial, fiber, or hybrid fiber/coaxial distribution system (e.g., a DOCSIS network), or any other desired network. Additionally, the computing device 4500 may include a location-detecting device, such as a global positioning system (GPS) microprocessor 4511, which may be configured to receive and process global positioning signals and determine, with possible assistance from an external server and antenna, a geographic position of the computing device 4500.

The example in FIG. 45 may be a hardware configuration, although the components shown may be implemented as software as well. Modifications may be made to add, remove, combine, divide, etc. components of the computing device 4500 as desired. Additionally, the components may be implemented using basic computing devices and components, and the same components (e.g., processor 4501, ROM storage 4502, display 4506, etc.) may be used to implement any of the other computing devices and components described herein. For example, the various components described herein may be implemented using computing devices having components such as a processor executing computer-executable instructions stored on a computer-readable medium, as shown in FIG. 45. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   sending, by a second access node to a first access node, one or more parameters indicating first resources of the first access node;
   receiving, by the second access node, data for a first wireless device;
   determining that the data is associated with a priority service;
   assigning, based on the determining that the data is associated with the priority service, second resources to the first access node, wherein the second resources are different from the first resources; and
   sending, by the second access node, to the first access node:
   the data, and
   downlink resource information indicating the second resources for transmission of the data to the first wireless device.
2. The method of claim 1, wherein the downlink resource information comprises at least one of:
   a medium access control control element associated with the data, or
   downlink control information.
3. The method of claim 1, wherein the second access node is a parent node of the first access node, and the first wireless device is a child node of the first access node.
4. The method of claim 1, wherein the sending the downlink resource information is not responsive to a request from the first access node for the downlink resource information.
5. The method of claim 1, further comprising determining, by the second access node, that the data is for the priority service, based on the data being associated with a logical channel that requires at least one of:
   a network slice for a high reliable and low latency service;
   a latency lower than a time value;
   a packet loss rate lower than a first value; or
   a packet error rate lower than a second value.
6. The method of claim 1, further comprising, sending, to a second wireless device, a preemption indication, wherein the preemption indication comprises an indication of the second resources.
7. The method of claim 6, wherein the sending the preemption indication is based on determining that the second resources overlap at least a portion of third resources, wherein the third resources are associated with the second wireless device.
8. A method comprising:
   receiving, by a first access node from a second access node, radio resource control configuration parameters for communication with the second access node;
   receiving, by the first access node from the second access node, configuration parameters indicating first resources for communication with a wireless device;
   receiving, by the first access node from the second access node, data for the wireless device; and
   transmitting, by the first access node to the wireless device, the data, wherein:
   if the data is received without downlink resource information, the transmitting is via the first resources; or
   if the data is received with downlink resource information indicating second resources that are different from the first resources, the transmitting is via the second resources.
9. The method of claim 8, wherein the downlink resource information comprises at least one of:
   a medium access control control element associated with the data, or
   downlink control information.
10. The method of claim 8, wherein the second access node is a parent node of the first access node, and the wireless device is a child node of the first access node.
11. The method of claim 8, wherein the downlink resource information comprises at least one of:
    a frequency domain resource assignment; or
    a time domain resource assignment.
12. The method of claim 8, wherein the receiving the radio resource control configuration parameters comprises receiving the radio resource control configuration parameters in a radio resource control reconfiguration message.
13. The method of claim 12, further comprising:
    transmitting, by the first access node to the second access node, a radio resource control reconfiguration complete message indicating completion of applying the radio resource control configuration parameters; and
    receiving, by the first access node from the second access node and based on the radio resource control configuration parameters, at least one message.
14. The method of claim 8, wherein the first access node is associated with a first cell and the second access node is associated with a second cell, and wherein radio resources are partitioned between the first cell and the second cell based on at least one of:
    a time division multiplexing;
    a frequency division multiplexing; or
    a space division multiplexing.
15. A method comprising:
    receiving, by a second access node, data for a first wireless device;
    determining that the data is associated with a priority service;
    assigning, based on the determining that the data is associated with the priority service, first resources to a first access node; and transmitting, by the second access node, to the first access node:
  the data, and
  downlink resource information indicating the first resources for transmission of the data to the first wireless device;
transmitting, by the second access node to a second wireless device, a first message, wherein the first message indicates second resources assigned to the second wireless device;
transmitting, by the second access node to the second wireless device, a second message, wherein the second message comprises an indication of preemption of a first portion of the second resources that overlaps the first resources; and
receiving, at the second access node from the second wireless device, first data in a second portion of the second resources that does not overlap the first resources.

16. The method of claim 15, wherein the first message comprises downlink control information, and the second message comprises group common downlink control information.

17. The method of claim 15, wherein the transmitting the first message is based on determining that the second resources overlap at least a portion of the first resources.

18. The method of claim 15, wherein the first resources overlap at least a portion of the second resources in at least one of time, frequency, or space.

19. The method of claim 15, further comprising:
transmitting, by the second access node to the second wireless device, second data in the second portion of the second resources that does not overlap the first resources; and
dropping, by the second access node, third data scheduled for transmission in the first portion of the second resources that overlaps the first resources.

20. The method of claim 15, further comprising:
transmitting, by the second access node to the second wireless device, second data in the second portion of the second resources that does not overlap the first resources; and
delaying, by the second access node, transmission of third data scheduled for transmission in the first portion of the second resources that overlaps the first resources.

* * * * *

UNITED STATES PATENT AND TRADEMARK OFFICE
CERTIFICATE OF CORRECTION

| | |
|---|---|
| PATENT NO. | : 11,343,812 B2 |
| APPLICATION NO. | : 16/672116 |
| DATED | : May 24, 2022 |
| INVENTOR(S) | : Kyungmin Park et al. |

It is certified that error appears in the above-identified patent and that said Letters Patent is hereby corrected as shown below:

On the Title Page

In the List of References:

Other Publications, Page 2, Column 1, Line 37:
Please delete "A3rchitecture" and insert --Architecture--

In the Drawings

Sheet 40 of 45, Fig. 40, Reference Numeral 4016, Line 1:
Delete "Wirless" and insert --Wireless--

In the Specification

Detailed Description, Column 13, Line 53:
After "2", insert --120B--

Detailed Description, Column 28, Line 16:
Delete "1119)." and insert --1118).--

Detailed Description, Column 32, Line 61:
Delete "1250," and insert --1240,--

Detailed Description, Column 38, Line 19:
Delete "accessnode," and insert --access node,--

Detailed Description, Column 39, Line 50:
Delete "timeFlexibility" and insert --time Flexibility--

Detailed Description, Column 39, Line 51:

Signed and Sealed this
Fifteenth Day of August, 2023

Katherine Kelly Vidal
*Director of the United States Patent and Trademark Office*

CERTIFICATE OF CORRECTION (continued)
U.S. Pat. No. 11,343,812 B2

Delete "scenarious" and insert --scenarios--

Detailed Description, Column 40, Line 15:
Delete "scenarious." and insert --scenarios.--

Detailed Description, Column 41, Line 34:
After "GTP-U/UDP/IP.", delete "¶"

Detailed Description, Column 41, Line 56:
Delete "channel An" and insert --channel. An--

Detailed Description, Column 46, Line 8:
Delete "scenarious," and insert --scenarios,--

Detailed Description, Column 46, Lines 37-38:
Delete "channel An" and insert --channel. An--

Detailed Description, Column 47, Line 52:
After "manner", insert --.--

Detailed Description, Column 51, Line 21:
Delete "3403 or 3414" and insert --3403 or 3413--

Detailed Description, Column 51, Line 28:
Delete "3402 or 3411." and insert --3402 or 3412.--

Detailed Description, Column 51, Line 34:
Delete "3404 or 3413" and insert --3403 or 3413--

Detailed Description, Column 53, Line 13:
Delete "Integraton" and insert --Integration--

Detailed Description, Column 53, Line 15:
Delete "Integraton" and insert --Integration--

Detailed Description, Column 59, Line 14:
Delete "3525-2, 3525-2, 3525-3 . . . )" and insert --3525-1, 3525-2, 3525-3 . . . )--

Detailed Description, Column 59, Line 22:
Delete "3510," and insert --3515,--

Detailed Description, Column 63, Line 18:
Delete "4106" and insert --4105--

Detailed Description, Column 63, Line 21:
Delete "4106" and insert --4105--

CERTIFICATE OF CORRECTION (continued)
U.S. Pat. No. 11,343,812 B2

Detailed Description, Column 63, Line 23:
Delete "overlapiing" and insert --overlapping--

Detailed Description, Column 63, Line 56:
Delete "pre-empeted" and insert --pre-empted--

Detailed Description, Column 64, Line 6:
Delete "3720." and insert --3710.--

Detailed Description, Column 65, Line 42:
Delete "CB Gs," and insert --CBGs,--

Detailed Description, Column 65, Lines 57-58:
Delete "CB Gs," and insert --CBGs,--

Detailed Description, Column 78, Line 37:
Delete "Lab VIEWMathScript." and insert --LabVIEWMathScript.--

Detailed Description, Column 79, Lines 19-20:
After "manner", insert --.--